United States Patent
Yasu

(10) Patent No.: US 10,990,182 B2
(45) Date of Patent: Apr. 27, 2021

(54) FORCE SENSE PRESENTING OBJECT

(71) Applicant: NIPPON TELEGRAPH AND TELEPHONE CORPORATION, Chiyoda-ku (JP)

(72) Inventor: Kentaro Yasu, Atsugi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/490,135

(22) PCT Filed: Feb. 26, 2018

(86) PCT No.: PCT/JP2018/008194
§ 371 (c)(1),
(2) Date: Aug. 30, 2019

(87) PCT Pub. No.: WO2018/159856
PCT Pub. Date: Sep. 7, 2018

(65) Prior Publication Data
US 2020/0050273 A1    Feb. 13, 2020

(30) Foreign Application Priority Data

Mar. 3, 2017 (JP) ............................. JP2017-040129
Oct. 6, 2017 (JP) ............................. JP2017-195926

(51) Int. Cl.
*G06F 3/041* (2006.01)
*G06F 3/045* (2006.01)
*G06F 3/01* (2006.01)

(52) U.S. Cl.
CPC ............ *G06F 3/016* (2013.01); *G06F 3/0414* (2013.01); *G06F 2203/04103* (2013.01)

(58) Field of Classification Search
CPC ..................................................... B64C 39/024
See application file for complete search history.

(56) References Cited

U.S. PATENT DOCUMENTS

2008/0024464 A1* 1/2008 West .................... G06F 3/03548
                                                                        345/184
2008/0129705 A1   6/2008 Kim et al.
(Continued)

FOREIGN PATENT DOCUMENTS

JP    2000-207114 A    7/2000
JP    2001-187155 A    7/2001
(Continued)

OTHER PUBLICATIONS

International Search Report dated Apr. 10, 2018 in PCT/JP2018/008194 filed on Feb. 26, 2018.

*Primary Examiner* — Nan-Ying Yang
(74) *Attorney, Agent, or Firm* — Oblon, McClelland, Maier & Neustadt, L.L.P.

(57) ABSTRACT

A force sense is presented to a person who has operated an input device, without using an electromagnet. A force sense presenting object includes a first object and a second object. The first object includes a first surface, which is preliminarily magnetized with a first texture including an S-pole region and an N-pole region, and is disposed on an input surface of a touch panel. The second object includes a second surface, which is preliminarily magnetized with a second texture including an S-pole region and an N-pole region, and is worn, gripped, or supported by an acting subject performing an input operation with respect to the touch panel.

14 Claims, 43 Drawing Sheets

(56) References Cited

U.S. PATENT DOCUMENTS

2008/0297489 A1* 12/2008 Funo ..................... G06F 3/041
                                                      345/175
2016/0282944 A1    9/2016  Haga et al.

FOREIGN PATENT DOCUMENTS

| JP | 2002-41208 A  | 2/2002  |
| JP | 2008-146649 A | 6/2008  |
| JP | 2016-184391 A | 10/2016 |

* cited by examiner

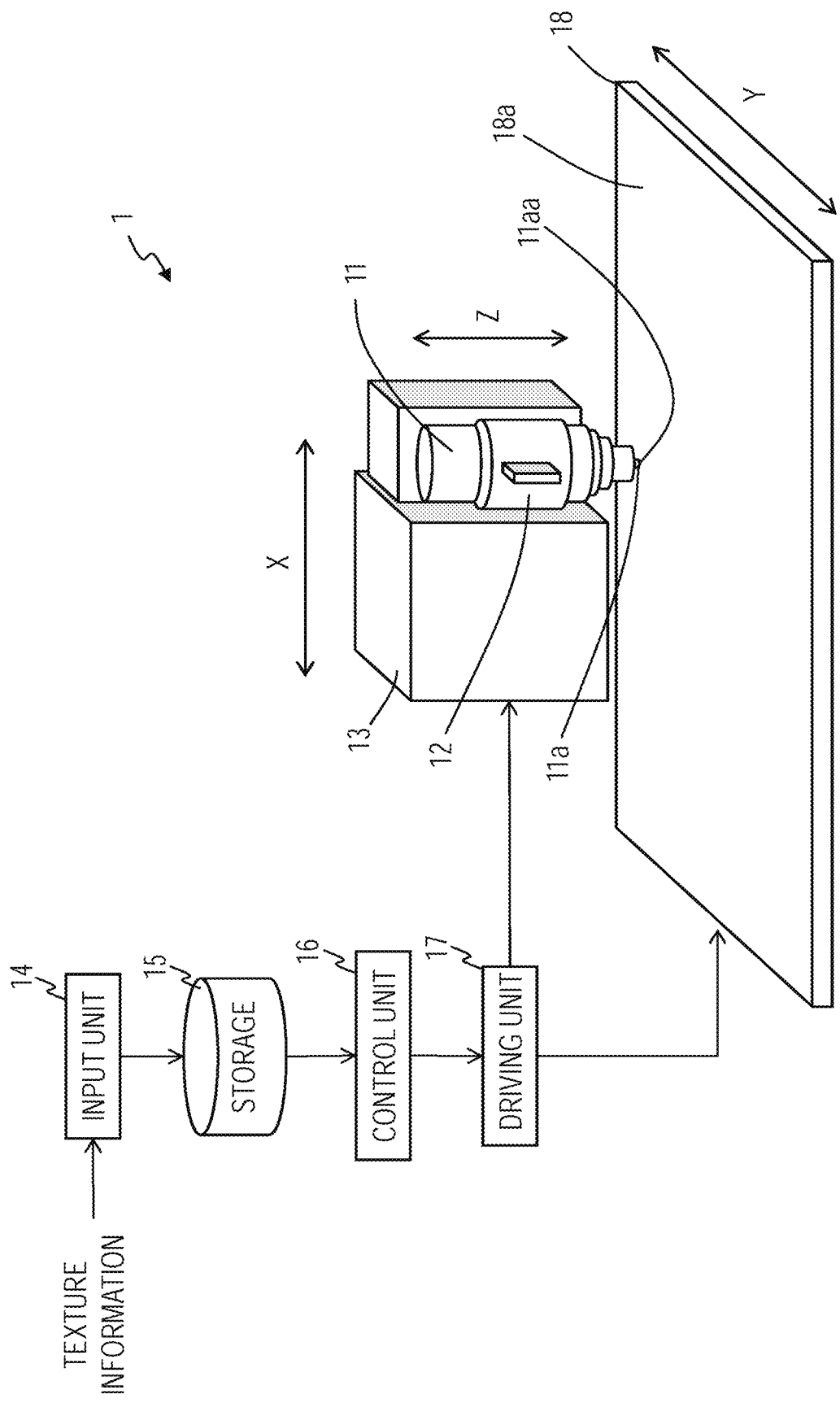

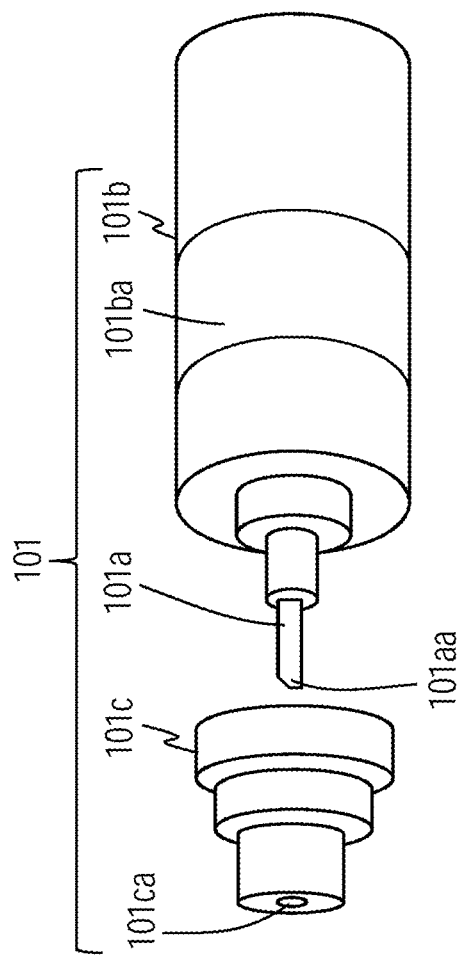
FIG. 3A
FIG. 3B
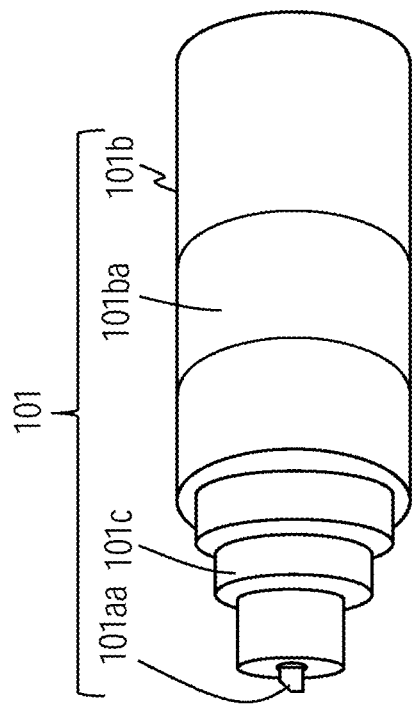
FIG. 3C
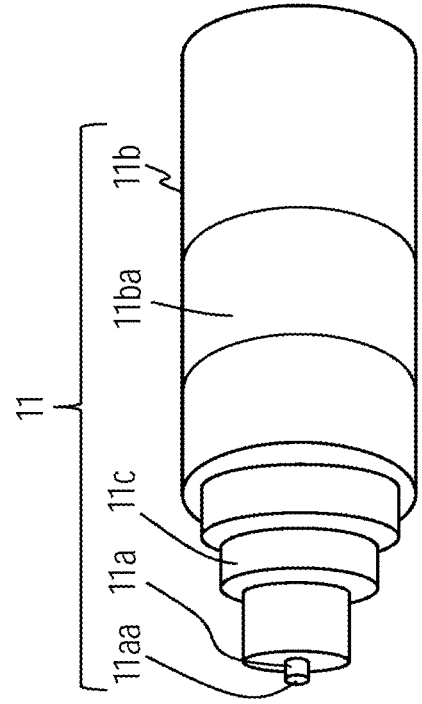
FIG. 3D

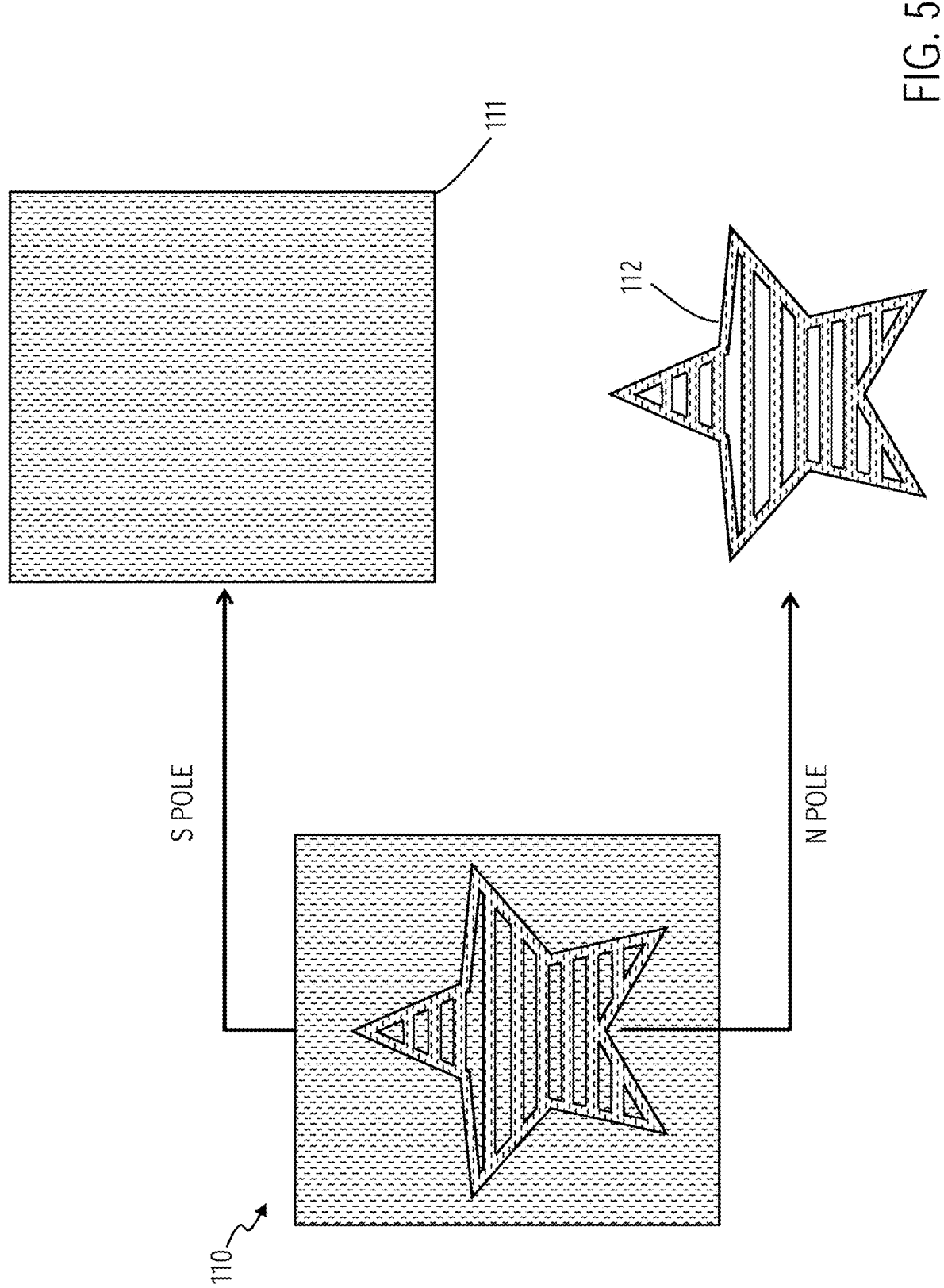

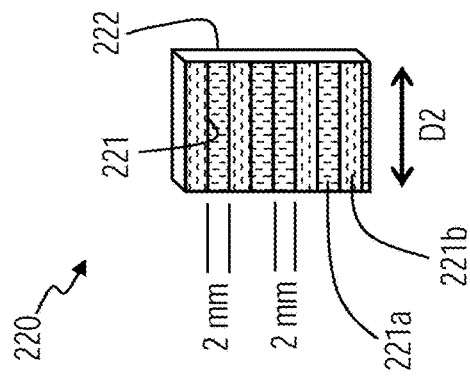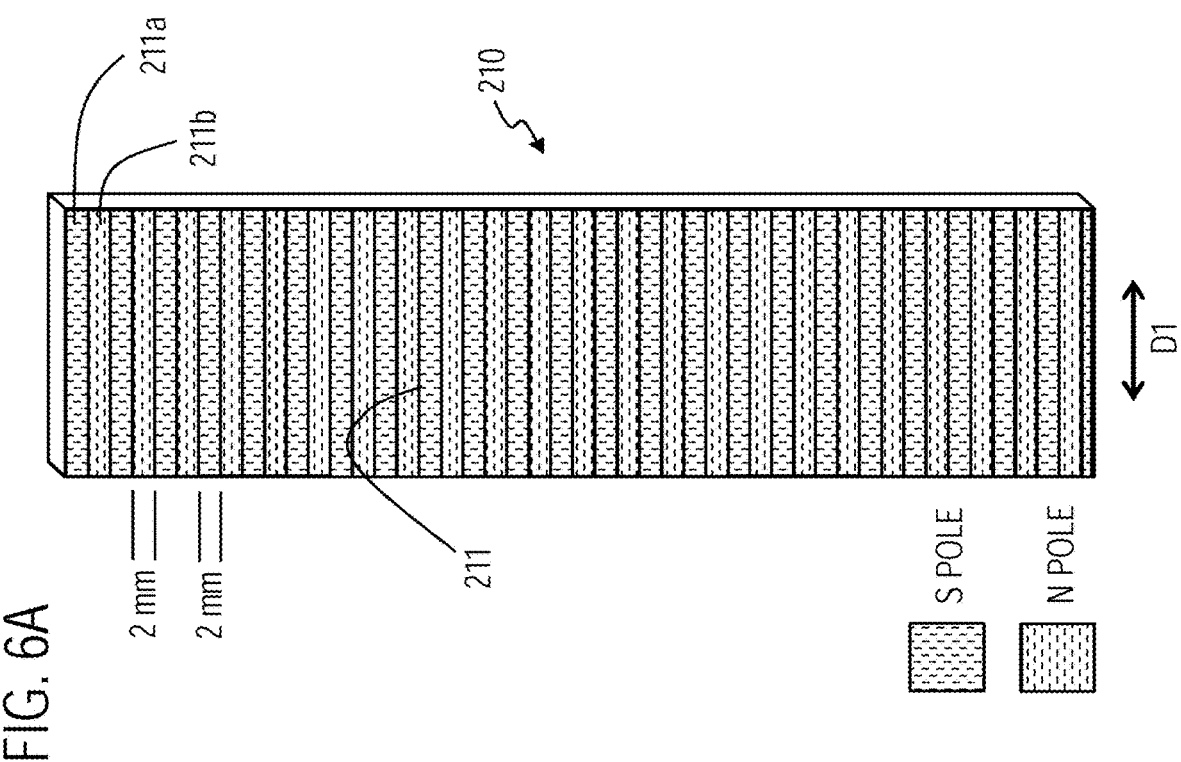

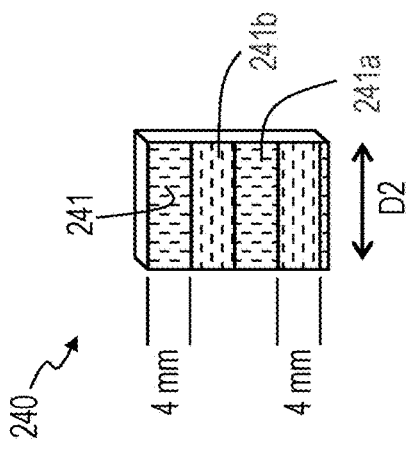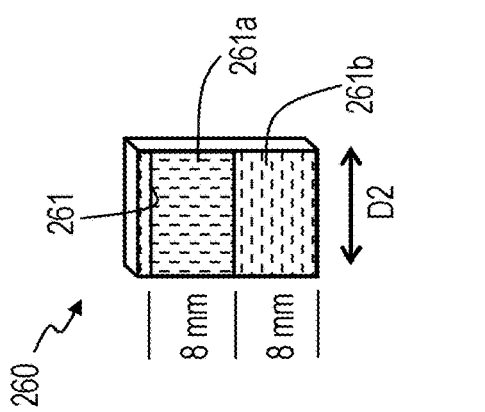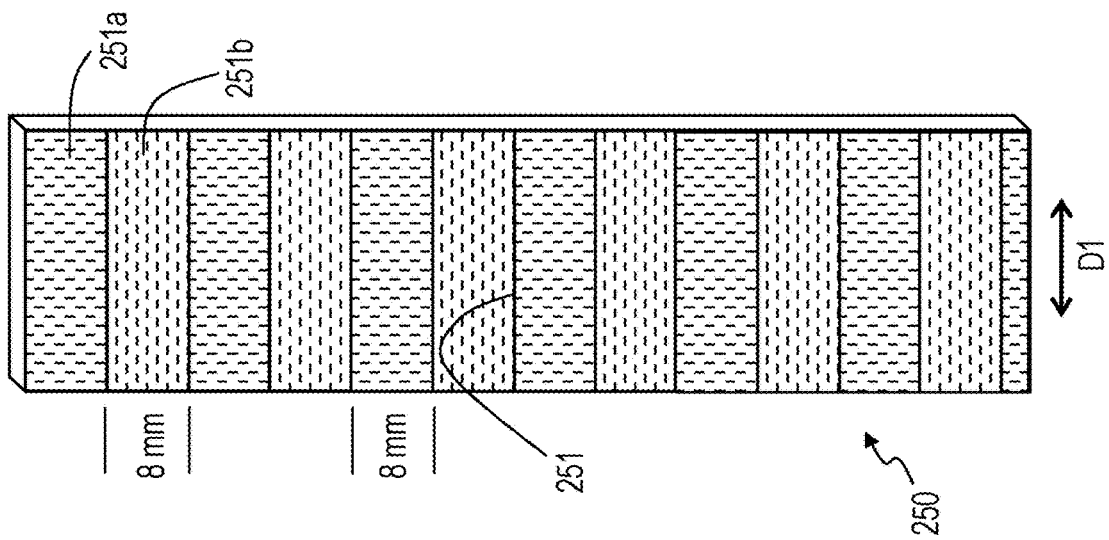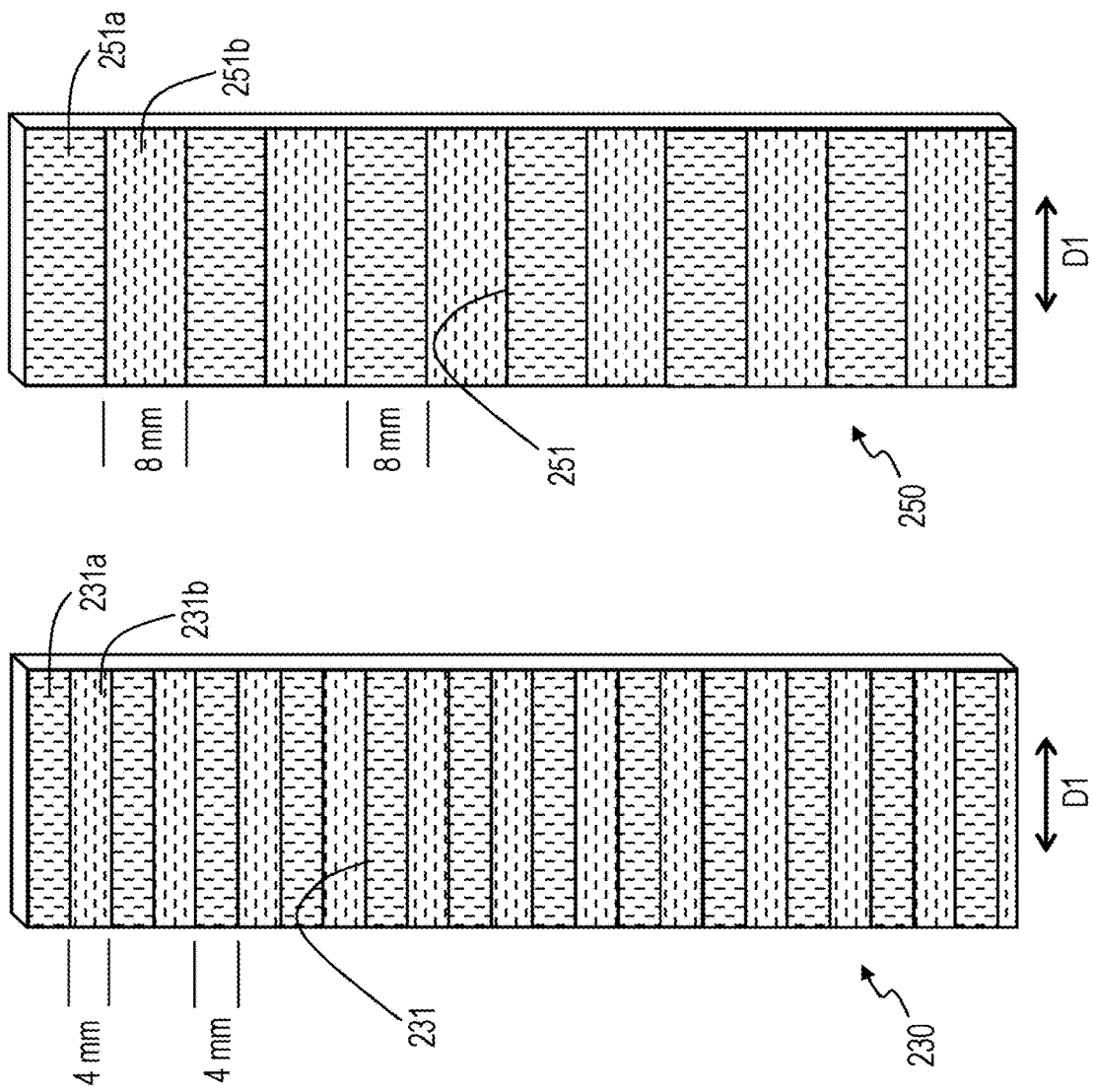

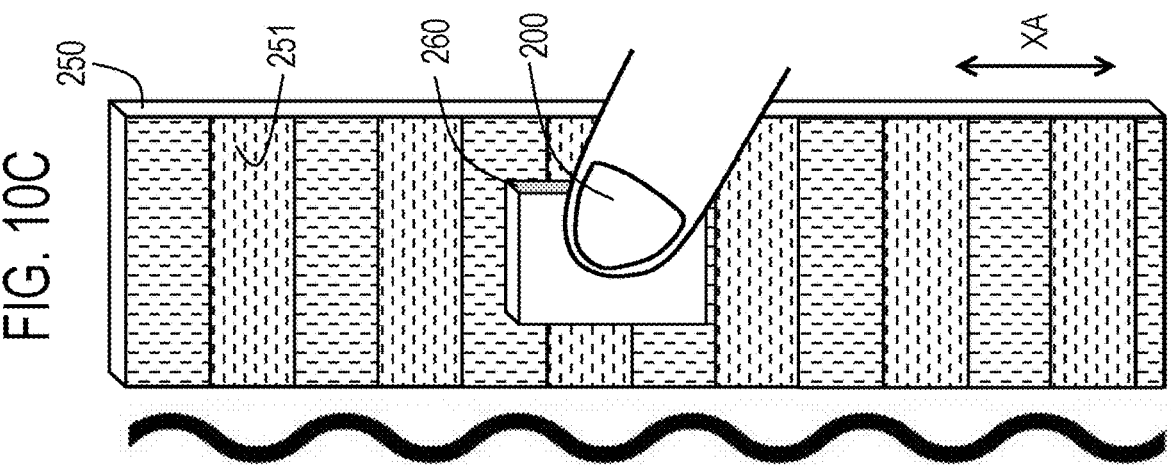
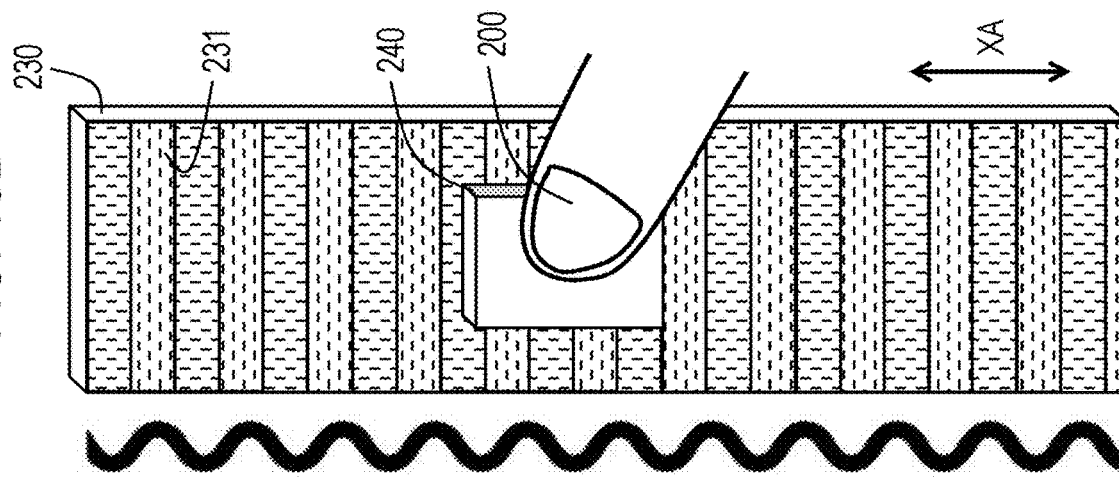
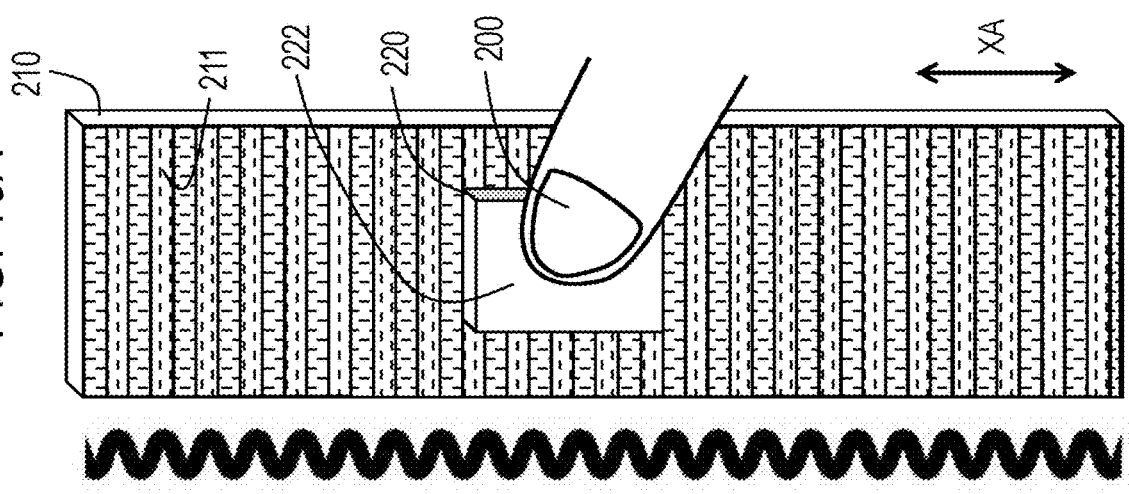

FIG. 21A
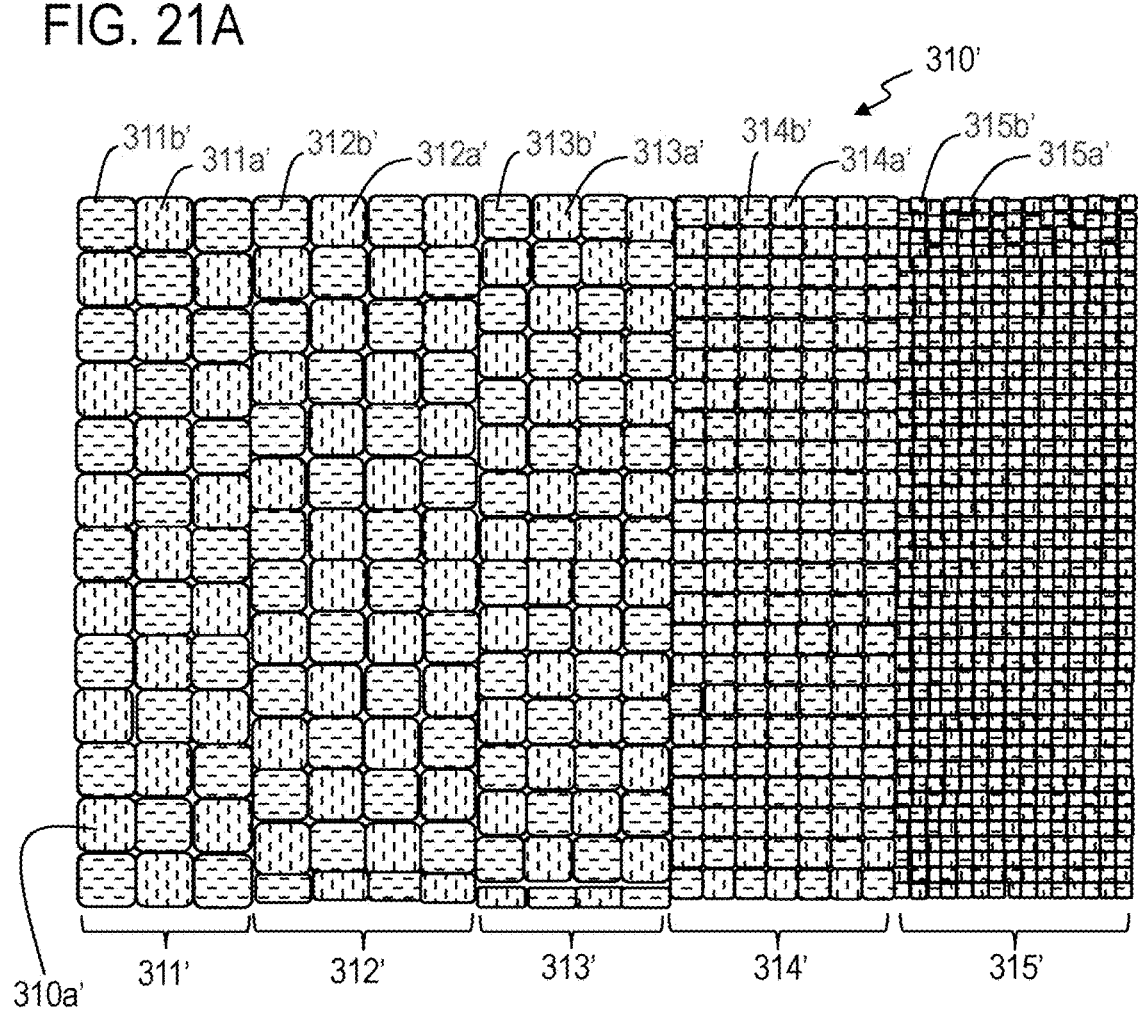
FIG. 21B
FIG. 21C
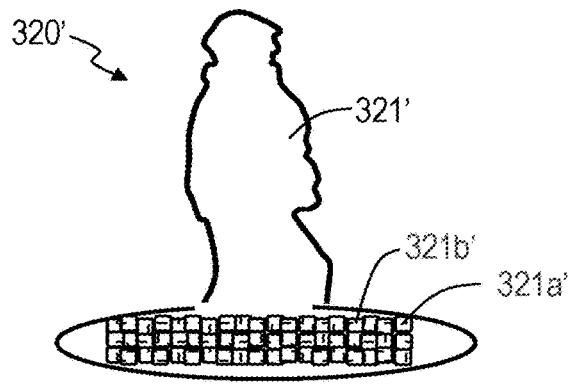
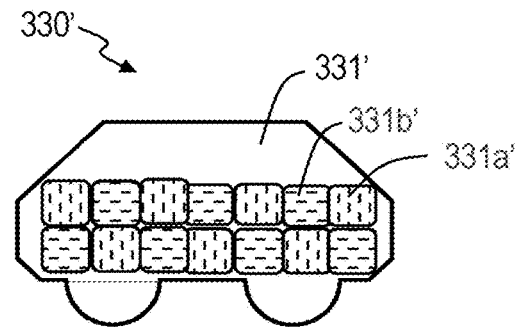

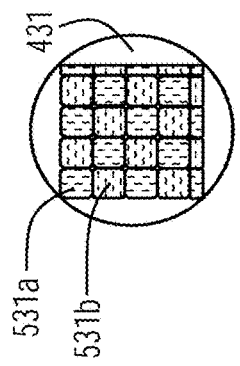
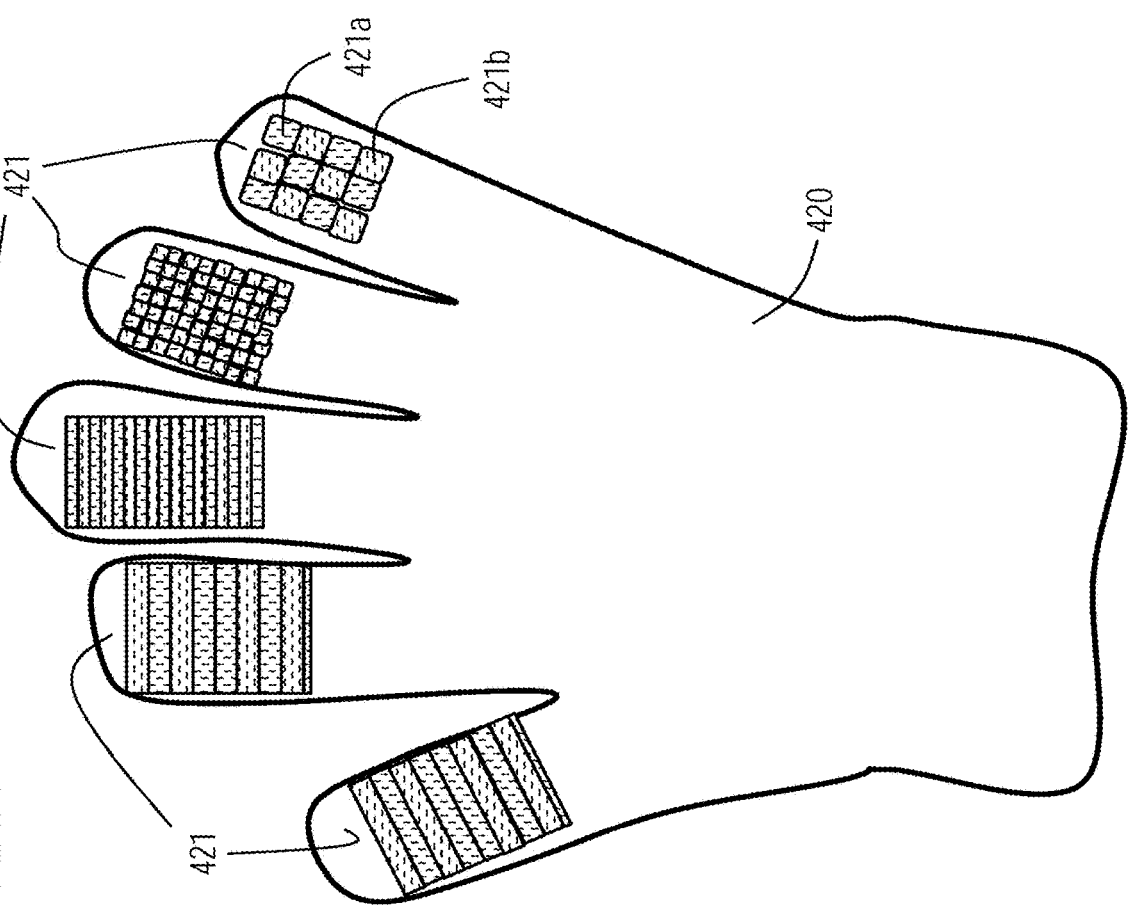
FIG. 24B
FIG. 24C
FIG. 24A

FIG. 30A   FIG. 30B
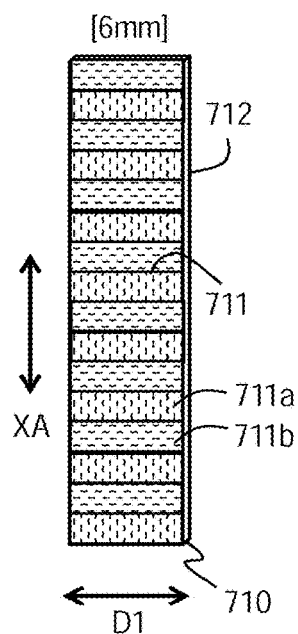
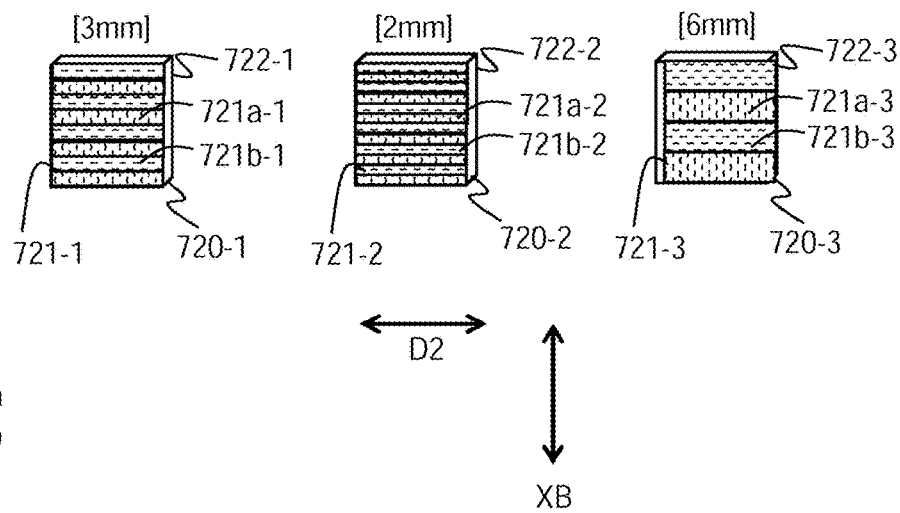
FIG. 30C
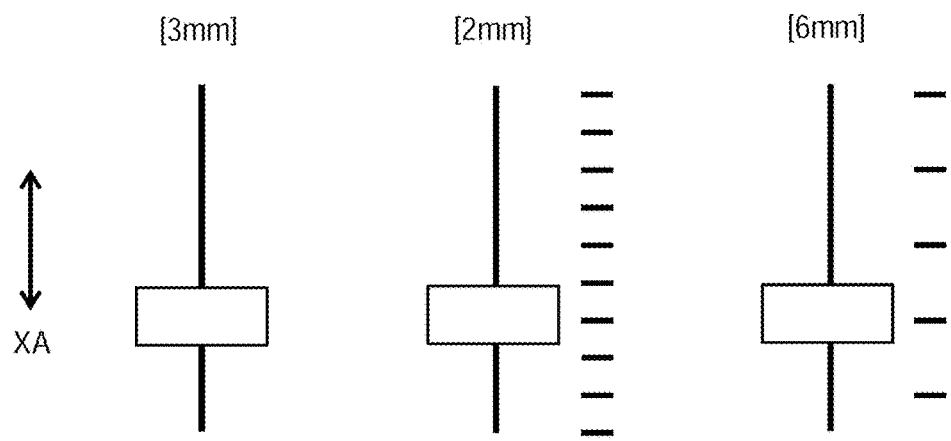

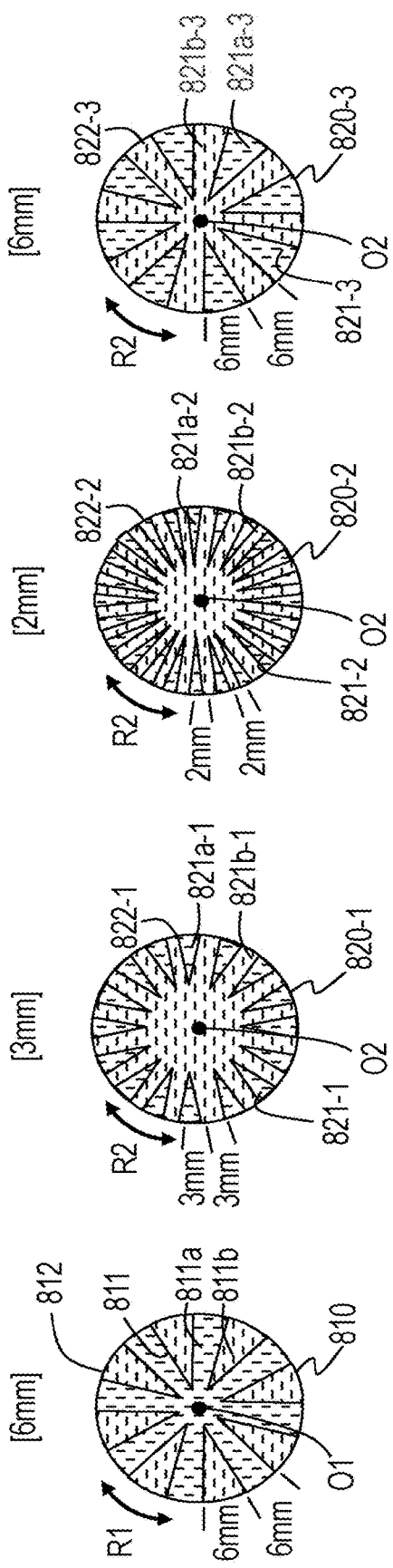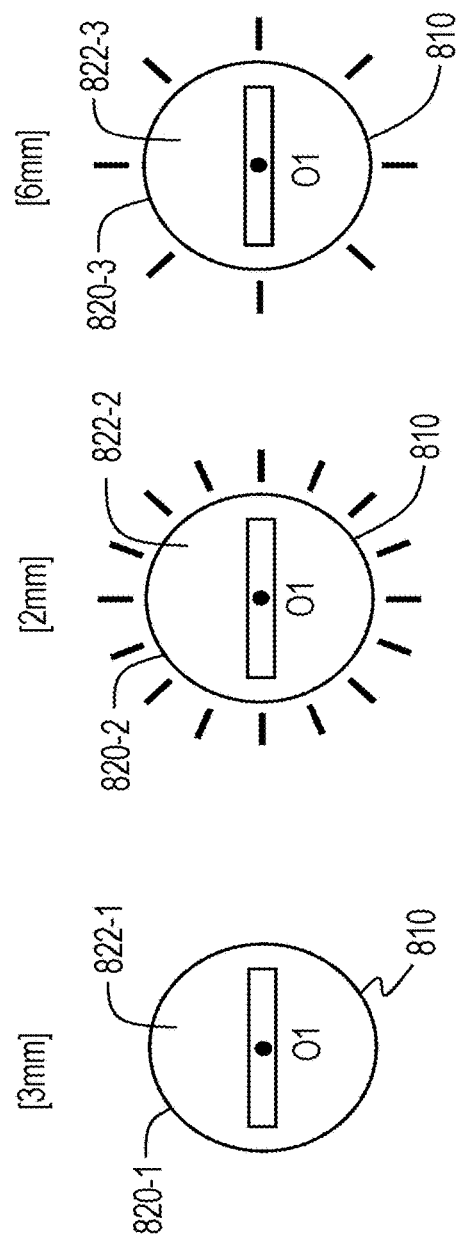
FIG. 31A  FIG. 31B
FIG. 31C

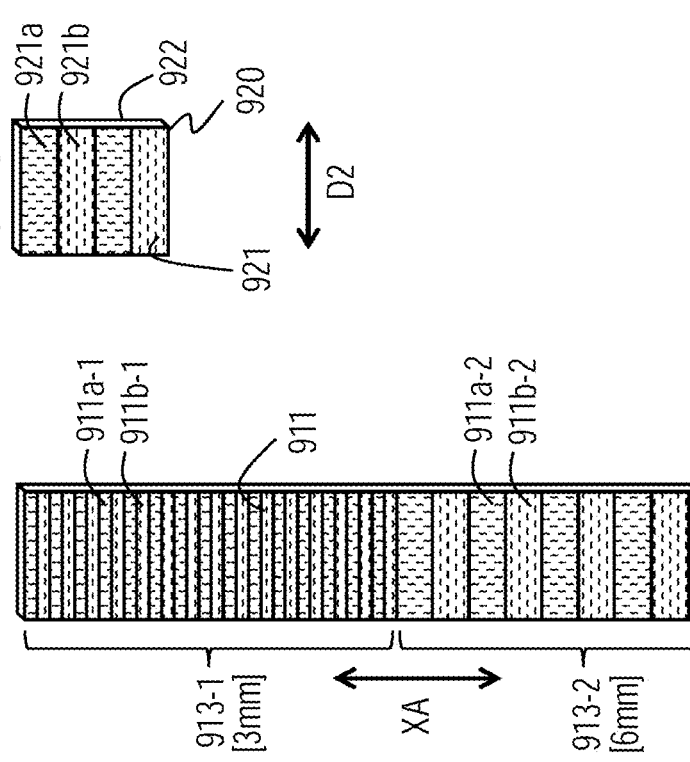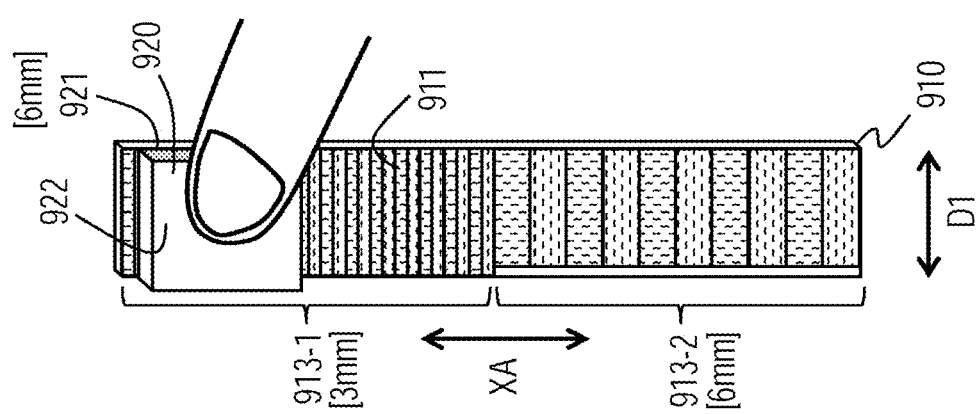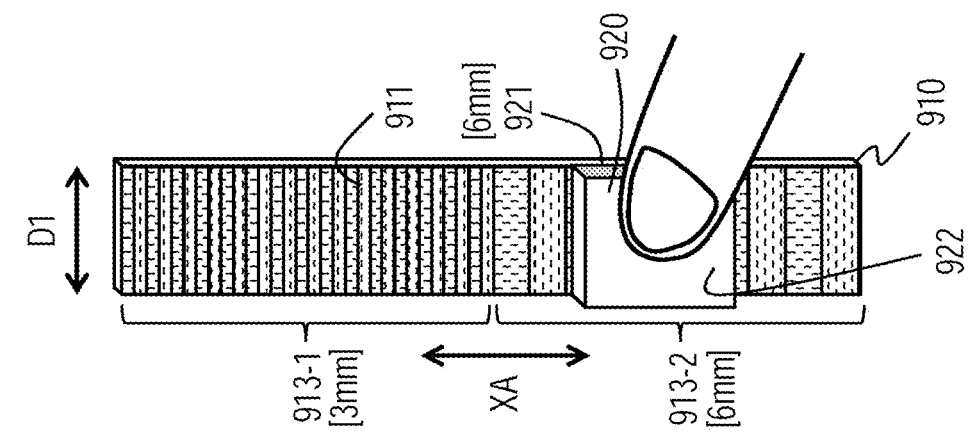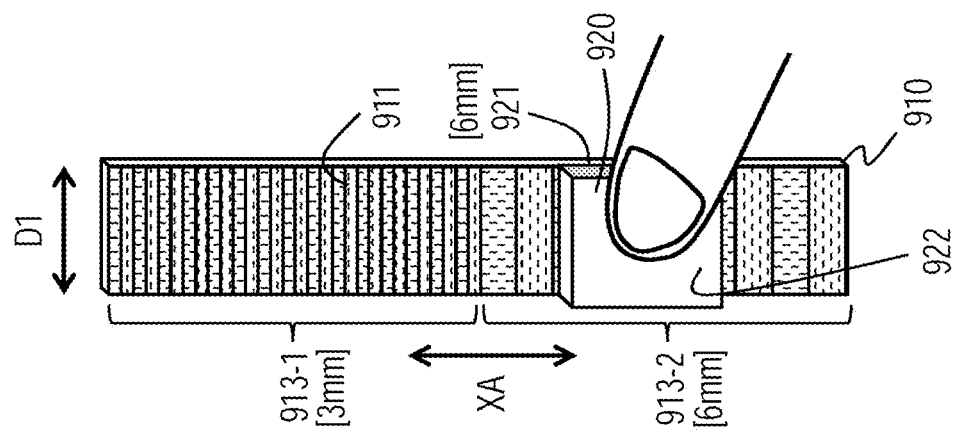

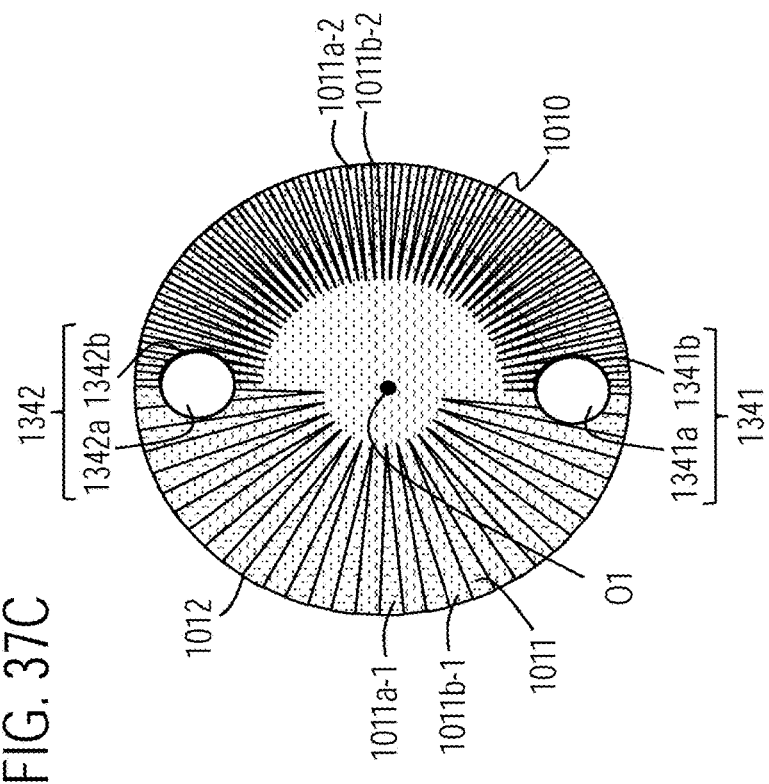
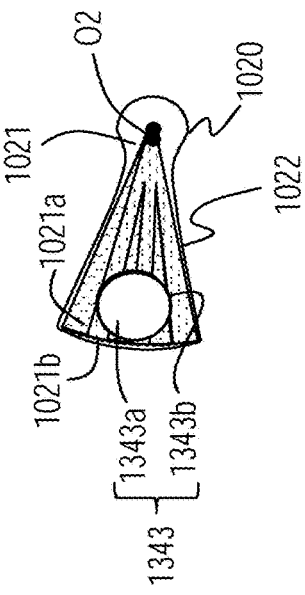
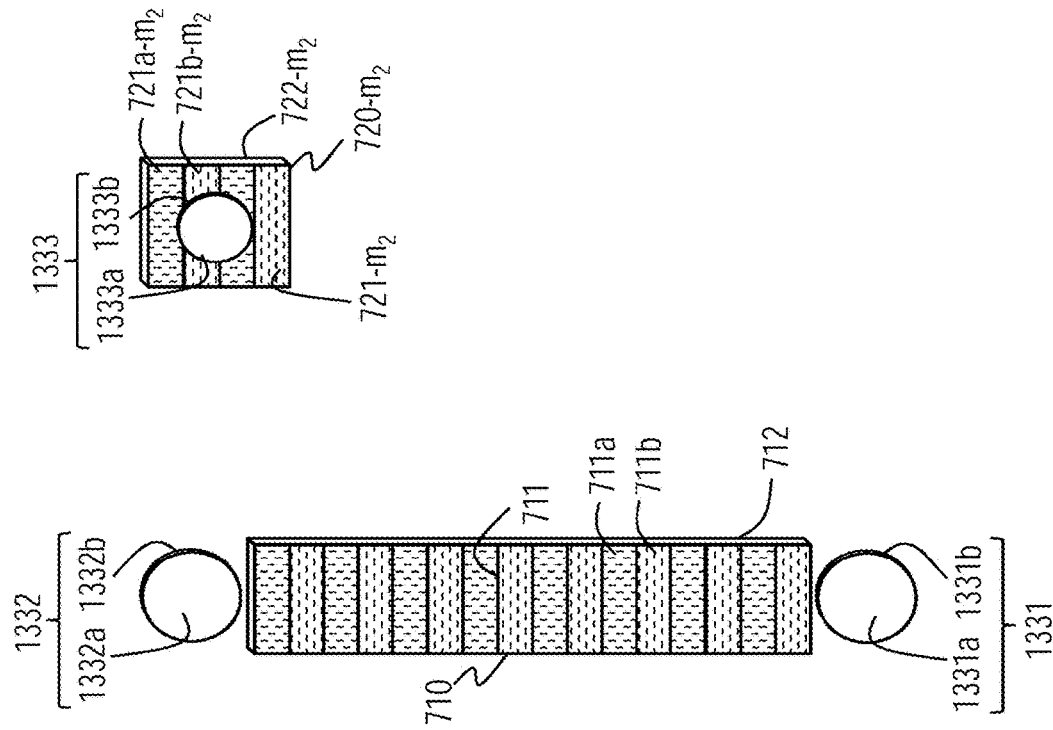

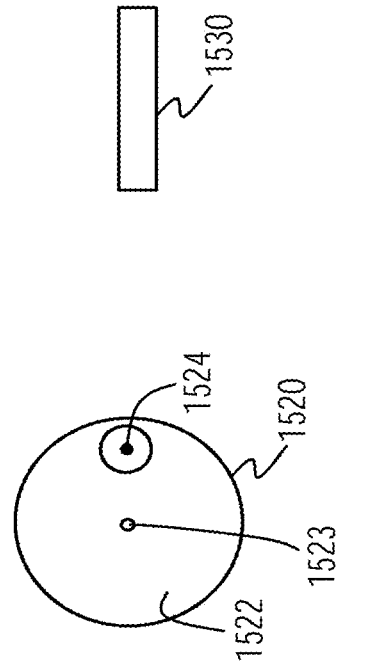
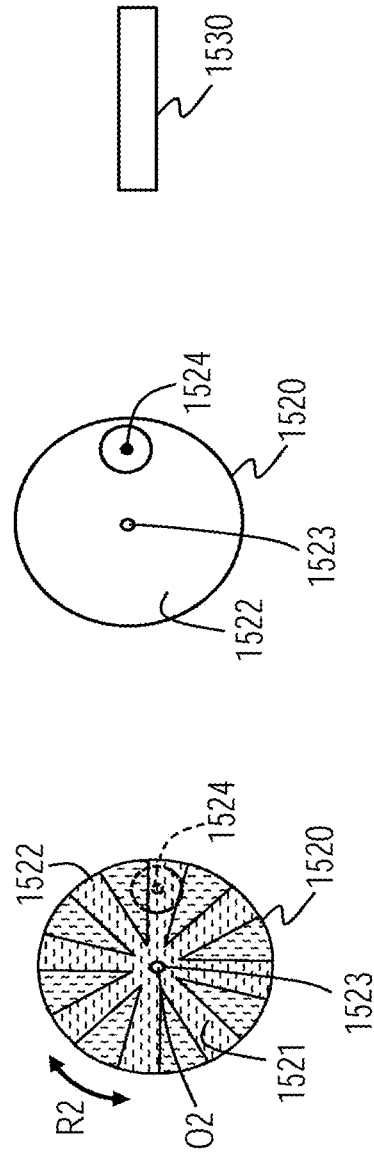
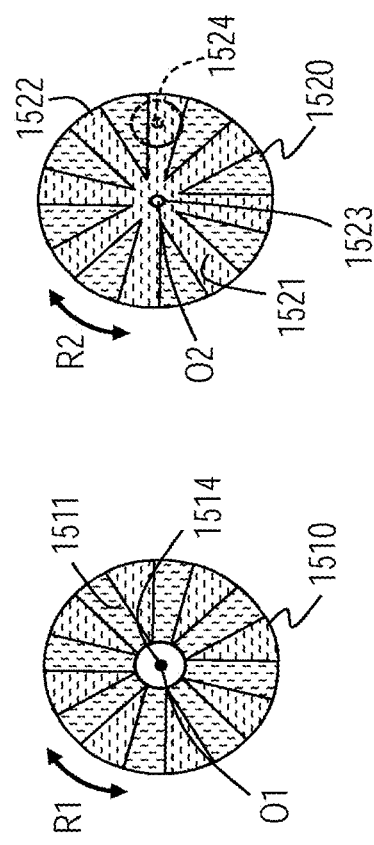
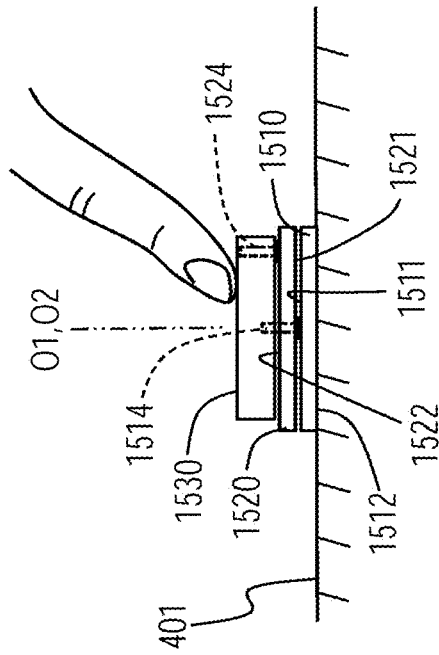
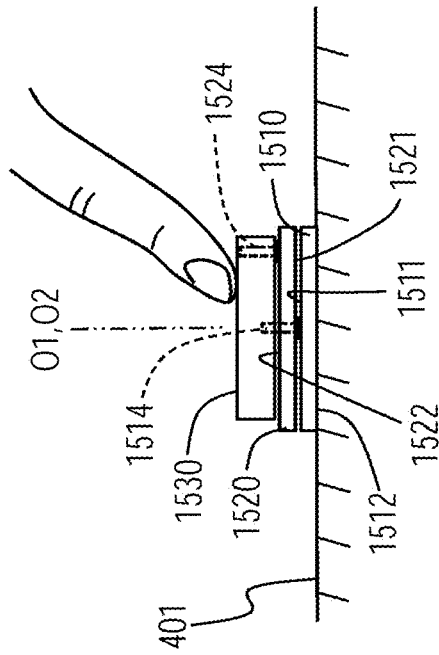
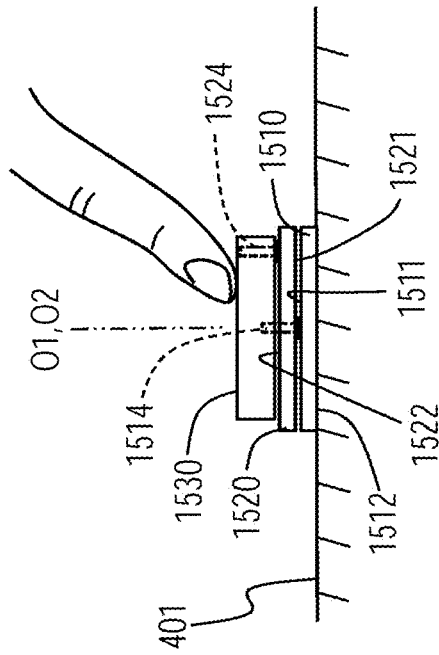
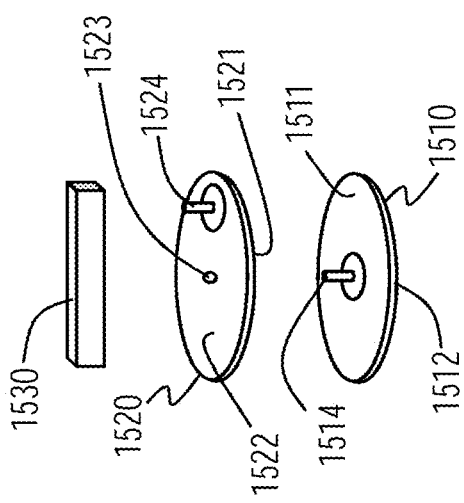

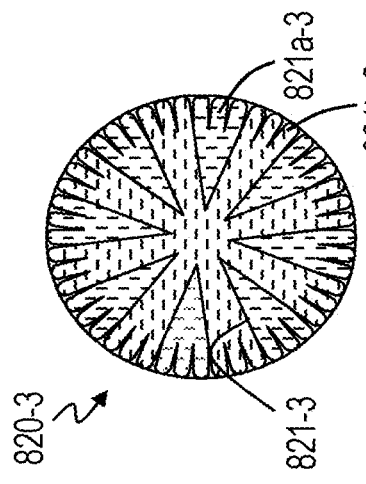
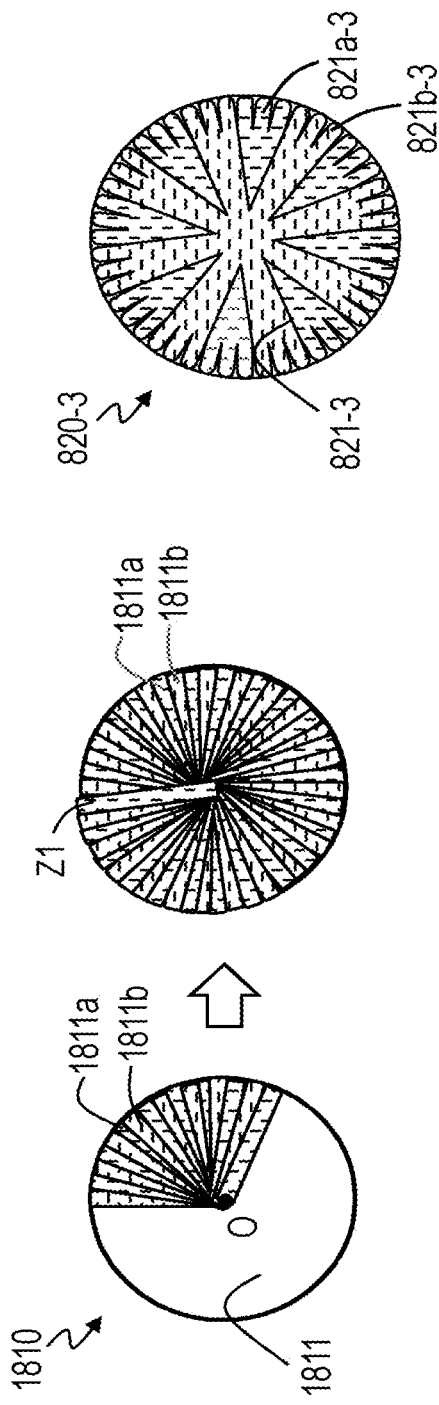
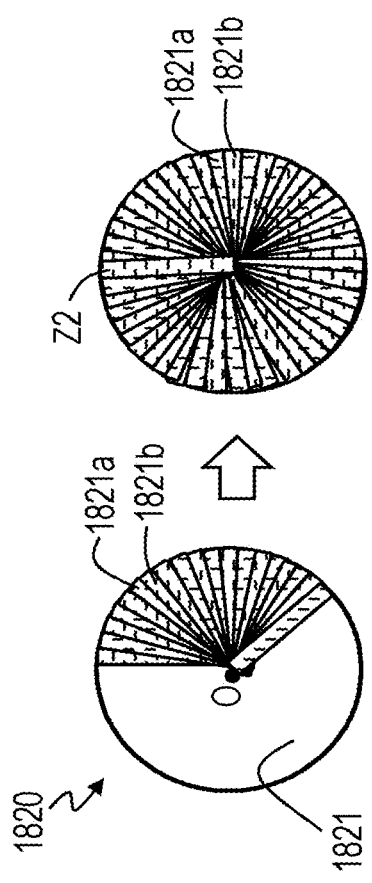

FORCE SENSE PRESENTING OBJECT

TECHNICAL FIELD

The present invention relates to techniques for presenting a force sense.

BACKGROUND ART

Patent Literature 1 discloses the technique for feeding back a force sense to an operator of a drawing tablet which is an input device.

PRIOR ART LITERATURE

Patent Literature

Patent Literature 1: Japanese Patent Application Laid Open No. 2000-207114

SUMMARY OF THE INVENTION

Problems to be Solved by the Invention

A force sense is presented by using a magnetic field which is generated with an electromagnet in Patent Literature 1, requiring a power source for driving the electromagnet. A force sense is presented to a person who operates an input device without using an electromagnet in the present invention.

Means to Solve the Problems

A force sense presenting object includes a first object and a second object. The first object includes a first surface, which is preliminarily magnetized with a first texture including an S-pole region and an N-pole region, and is disposed on an input surface of a touch panel. The second object includes a second surface, which is preliminarily magnetized with a second texture including an S-pole region and an N-pole region, and is worn, gripped, or supported by an acting subject performing an input operation with respect to the touch panel.

Effects of the Invention

According to the present invention, a force sense can be presented to a person who operates an input device without using an electromagnet.

BRIEF DESCRIPTION OF THE DRAWINGS

FIG. 1 is a conceptual diagram illustrating a functional configuration of a magnetization device according to an embodiment.

FIG. 3A is a perspective view illustrating a cutter component of a cutting plotter and FIG. 3B is an exploded perspective view of the cutter component. FIG. 3C is a perspective view illustrating a magnetization component and FIG. 3D is an exploded perspective view of the magnetization component.

FIG. 5 is a diagram illustrating texture information including S-pole pattern information and N-pole pattern information.

FIG. 6A and FIG. 6B are diagrams illustrating a magnetized magnetic sheet.

FIG. 9A to FIG. 9D are diagrams illustrating magnetized magnetic sheets.

FIG. 10A to FIG. 10C are diagrams illustrating an action for presenting bumpy feeling by two magnetic sheets.

FIG. 21A to FIG. 21C are diagrams illustrating contact objects.

FIG. 24A to FIG. 24C are diagrams illustrating an input device according to the embodiment.

FIG. 30A and FIG. 30B are diagrams illustrating magnetized magnetic sheets. FIG. 30C is a conceptual diagram illustrating bumpy feeling.

FIG. 31A and FIG. 31B are diagrams illustrating magnetized magnetic sheets. FIG. 31C is a conceptual diagram illustrating bumpy feeling.

FIG. 33A and FIG. 33B are diagrams illustrating a magnetized magnetic sheet. FIG. 33C and FIG. 33D are diagrams illustrating an action for presenting bumpy feeling by two magnetic sheets.

FIG. 37A to FIG. 37D are diagrams illustrating an example in which a magnet having strong magnetic force is combined with a magnetized magnetic sheet.

FIG. 40A to FIG. 40F are diagrams illustrating magnetic sheets positioned by a mechanical structure.

FIG. 43A to FIG. 43C are diagrams for describing a modification of a dial-type force sense presenting object.

DETAILED DESCRIPTION OF THE EMBODIMENTS

Embodiments according to the present invention are described below with reference to the accompanying drawings.

First Embodiment

In the present embodiment, a cutter component of a cutting plotter (also referred to as a "cutting machine"), which is an apparatus for making a cut corresponding to inputted texture information on an object based on the inputted texture information, is replaced with a magnetization component and this cutting plotter is driven to magnetize a magnetic sheet (the magnetic sheet is magnetized).

<Configuration>

Figure 2A:
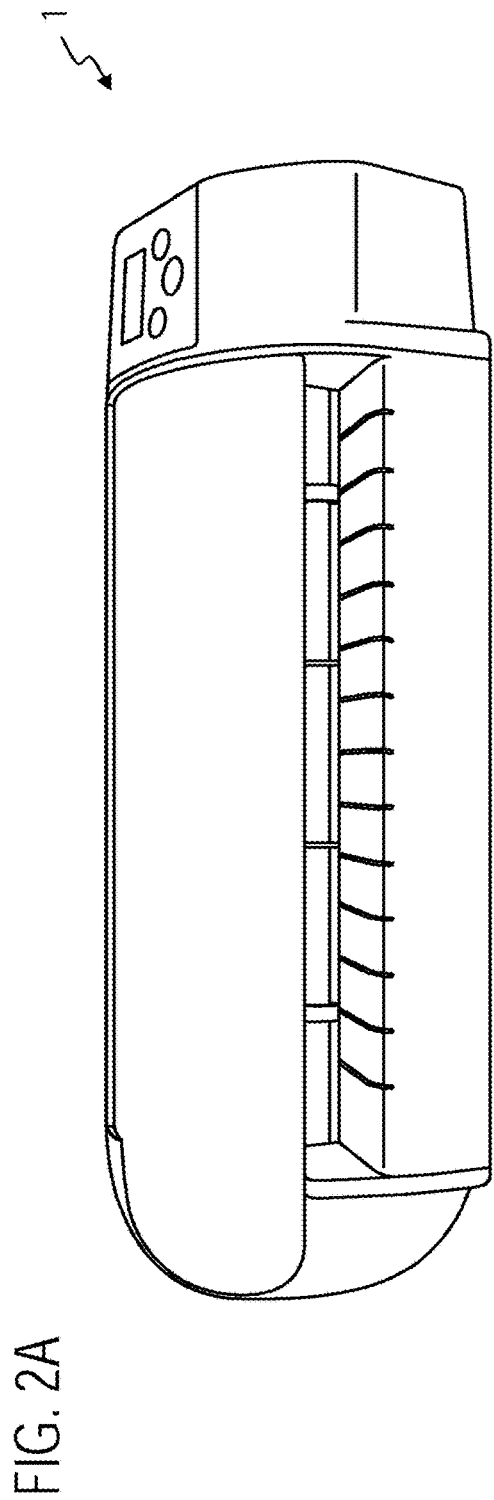
FIG. 2A and FIG. 2B are conceptual diagrams illustrating the functional configuration of the magnetization device according to the embodiment.

As illustrated in FIG. 1 to FIG. 3, a magnetization device 1 according to the present embodiment includes a magnetization component 11, a cutter component attachment unit 12, a drawing head 13, an input unit 14, a storage 15, a control unit 16, and a driving unit 17 and magnetizes a magnetic sheet 18 which is placed. This magnetization device 1 is obtained by replacing a cutter component 101 of a cutting plotter including the cutter component 101, the cutter component attachment unit 12, the drawing head 13, the input unit 14, the storage 15, the control unit 16, and the driving unit 17 with the magnetization component 11.

<<Cutter Component 101 and Magnetization Component 11>>

As illustrated in FIG. 3A and FIG. 3B, the cutter component 101 includes a cutter portion 101a for making a cut on an object, a fixing portion 101b which has a columnar shape and on which the cutter portion 101a is fixed, and a cap portion 101c. One end of the cutter portion 101a is a cutting edge 101aa and the other end is fixed in the fixing portion 101b. The cutter portion 101a may be attachable to and detachable from the fixing portion 101b or does not have to be attachable and detachable. A through hole 101ca is formed on an end side of the cap portion 101c. The cap portion 101c can be attached to the cutter portion 101a side of the fixing portion 101b. When the cap portion 101c is attached to the cutter portion 101a side of the fixing portion 101b, the cutting edge 101aa protrudes to the outside of the cap portion 101c through the through hole 101ca. An attachment region 101ba is provided on an outer lateral surface of the fixing portion 101b and this attachment region 101ba can be fixed on an attachment position of the above-mentioned cutting plotter.

Figure 4:
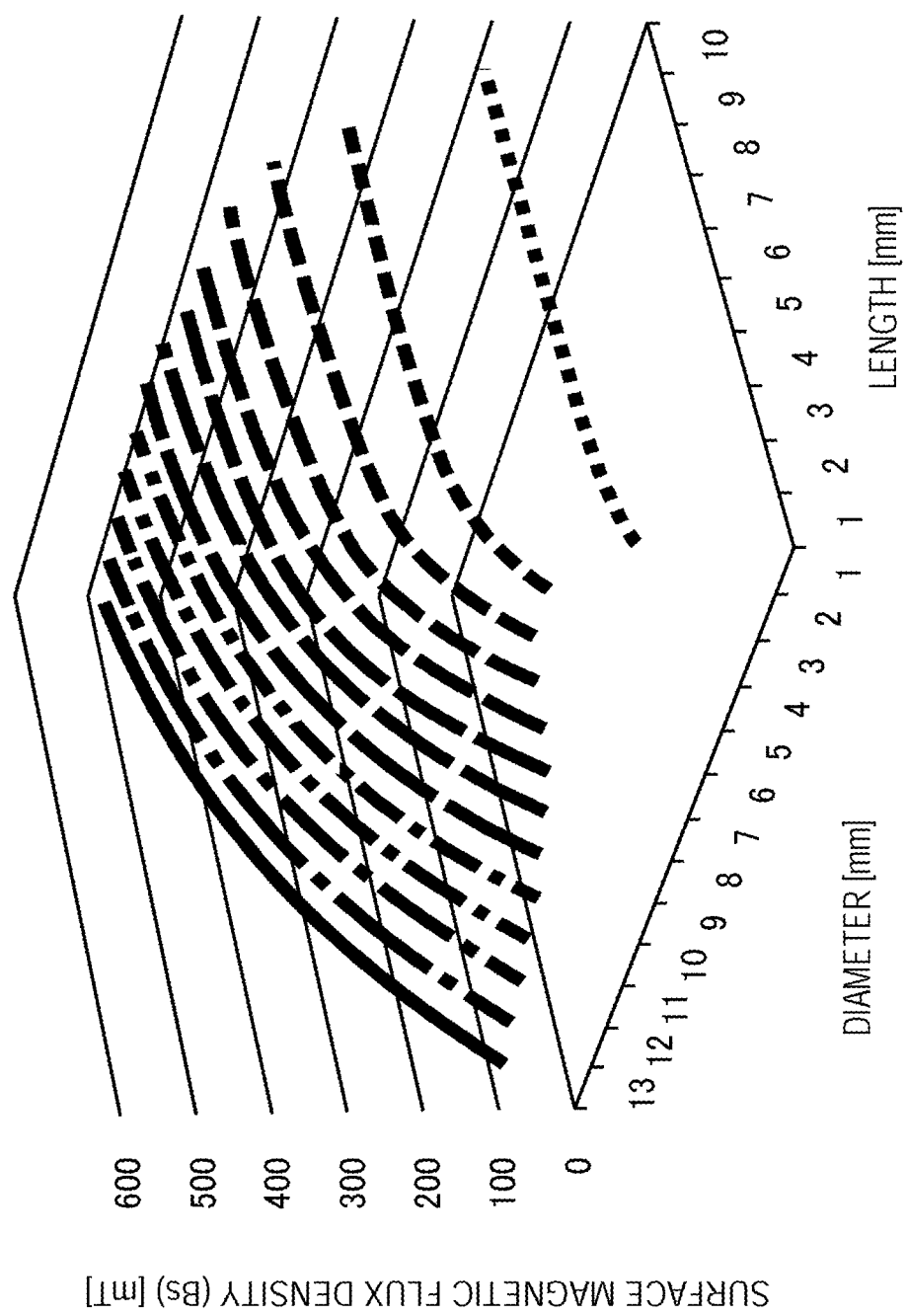
FIG. 4 is a graph illustrating a relation between a shape of a magnet and surface magnetic flux density.

As illustrated in FIG. 3C and FIG. 3D, the magnetization component 11 which replaces the cutter component 101 includes a magnet 11a which magnetizes an object and has a columnar shape (a magnet which is supported by an attachment mechanism and is configured such that the magnetic pole thereof is opposed to the object when the attachment mechanism is attached on an attachment position), a fixing portion 11b in which the magnet 11a is fixed and which has a columnar shape (an attachment mechanism which has the substantially same configuration as that of an attachment part of the cutter component with respect to an attachment position), and a cap portion 11c. The magnet 11a is a permanent magnet such as a neodymium magnet. When a neodymium magnet is used as the magnet 11a, surface magnetic flux density of an end portion 11aa of the magnet 11a varies depending on a shape of the magnet 11a. FIG. 4 illustrates surface magnetic flux density (Bs) [mT] at the centers on bottom surfaces of columns of columnar neodymium magnets having different diameters [mm] and lengths [mm]. As illustrated in FIG. 4, the magnet 11a has larger surface magnetic flux density as the diameter thereof is larger. However, if the diameter is too larger, the magnetic flux density at the center is lowered and resolution of a pattern which can magnetize the magnetic sheet 18 is lowered. Surface magnetic flux density is larger as the length of the magnet 11a is greater when the magnets 11a have the same diameters as each other. The length of the magnet 11a is, however, limited due to the restriction as the magnetization component 11 which can replace the cutter component 101. A neodymium magnet having the diameter of 2 mm and the length of 10 mm can be used as the magnet 11a, for example. The end portion 11aa on one end of the magnet 11a has either magnetic pole (the S pole or the N pole) and the other end is fixed to the fixing portion 11b. The magnet 11a may be attachable to and detachable from the fixing portion 11b or does not have to be attachable and detachable. A through hole 11ca is formed on an end side of the cap portion 11c. The cap portion 11c can be attached to the magnet 11a side of the fixing portion 11b. When the cap portion 11c is attached to the magnet 11a side of the fixing portion 11b, the end portion 11aa of the magnet 11a protrudes to the outside of the cap portion 11c through the through hole 11ca (the magnetic pole of the magnet 11a is disposed on the outside of the cap portion 11c). An attachment region 11ba is provided on an outer lateral surface of the fixing portion 11b and this attachment region 11ba can be fixed on an attachment position of the above-mentioned cutting plotter.

In the present embodiment, the outer shape of the fixing portion 11b is substantially the same as the outer shape of the fixing portion 101b and the position and the shape of the attachment region 11ba (the configuration of the attachment mechanism) are also substantially the same as the position and the shape of the attachment region 101ba (the attachment part of the cutter component with respect to the attachment position). The outer shape of the cap portion 11c is preferably substantially the same as the outer shape of the cap portion 101c, but these shapes may be different from each other. A relative position of the end portion 11aa with respect to the attachment region 11ba is preferably substantially the same as a relative position of the cutting edge 101aa with respect to the attachment region 101ba. The length of the end portion 11aa positioned in the outside of the cap portion 11c when the cap portion 11c is attached to the fixing portion 11b is preferably substantially the same as the length of the cutting edge 101aa positioned in the outside of the cap portion 101c when the cap portion 101c is attached to the fixing portion 101b. The cutter component 101 in which the cutter portion 101a is replaced with the magnet 11a, for example, may be used as the magnetization component 11. In this case, the fixing portion 101b is equivalent to the fixing portion 11b and the cap portion 101c is equivalent to the cap portion 11c. In such a case, it is preferable that the shape of the cutter component 101 on the fixing portion 101b side is substantially the same as the shape of the magnetization component 11 on the fixing portion 11b side. Accordingly, the magnetization component 11 can be produced from the known cutter component 101 without specially installing a spacer and machining. Here, "α is substantially the same as β" means that α and β are the same as each other or α and β approximate each other.

<<Cutter Component Attachment Unit 12 and Drawing Head 13>>

Figure 2B:
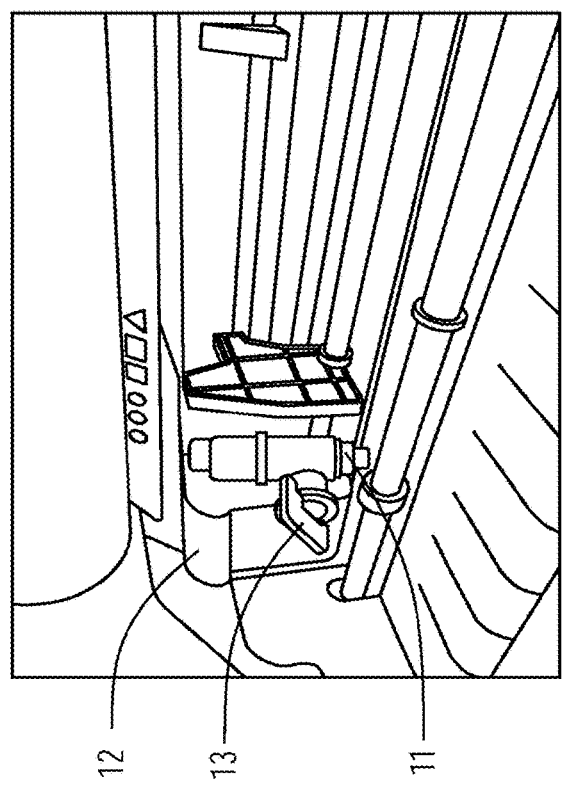

By fixing the attachment region 101ba of the cutter component 101 on the cutter component attachment unit 12, the cutter component 101 is attached to the drawing head 13. In the present embodiment, instead of the cutter component 101, by fixing the attachment region 11ba of the magnetization component 11 on the cutter component attachment unit 12 (the attachment position of the cutter component), the magnetization component 11 is attached to the drawing head 13 (FIG. 1 and FIG. 2B). The magnetization component 11 attached to the cutter component attachment unit 12 is positioned so that the end portion 11aa (magnetic pole) of the magnet 11a of the magnetization component 11 is opposed to a surface 18a of the magnetic sheet 18 (object) which is disposed as a magnetization object. That is, the magnetization component 11 which is a component including the magnet 11a whose magnetic pole (the S pole or the N pole) is opposite to that of the surface 18a of the magnetic sheet 18 is attached to the cutter component attachment unit 12. The end portion 11aa of the magnet 11a is set to the N pole when the surface 18a of the magnetic sheet 18 is magnetized to the S pole, while the end portion 11aa of the magnet 11a is set to the S pole when the surface 18a of the magnetic sheet 18 is magnetized to the N pole. The case where the surface 18a of the magnetic sheet 18 needs to be magnetized to the S pole and the N pole requires the magnetization component 11 including the magnet 11a whose end portion 11aa is on the N pole (for magnetization to the S pole) and the magnetization component 11 including the magnet 11a whose end portion 11aa is on the S pole (for magnetization to the N pole). If the magnet 11a is attachable to and detachable from the fixing portion 11b, the magnet 11a whose end portion 11aa is on the N pole may be attached to the fixing portion 11b when the surface 18a of the magnetic sheet 18 is magnetized to the S pole, and the magnet 11a whose end portion 11aa is on the S pole may be attached to the fixing portion 11b when the surface 18a of the magnetic sheet 18 is magnetized to the N pole. Two ends of the magnet 11a may have magnetic poles opposite to each other (the S pole and the N pole), and one end selected from the two ends may be set as the end portion 11aa and the other end may be able to be fixed on the fixing portion 11b. That is, the magnet 11a may be reversible with respect to the fixing portion 11b and either one end (the S pole or the N pole) of the magnet 11a can be selected as the end portion 11aa. As described later, positions of the drawing head 13 and the magnetic sheet 18 are digitally controlled and thus, the relative position of the drawing head 13 with respect to the surface 18a of the magnetic sheet 18 can be changed. Here, a surface different from the surface 18a of the magnetic sheet 18 is magnetized to the opposite magnetic pole to that of the surface 18a. That is, magnetization of the surface 18a of the magnetic sheet 18 also means magnetization of the magnetic sheet 18 itself.

<<Input Unit 14, Storage 15, Control Unit 16, and Driving Unit 17>>

The input unit 14, the storage 15, the control unit 16, and the driving unit 17 are functional components originally provided to the cutting plotter. The input unit 14 is an input interface, the storage 15 is a random-access memory (RAM), hard disk, and the like, and the driving unit 17 is a driving device composed of a motor, an actuator, and the like. The control unit 16 may be configured through execution of a predetermined program by a computer including a processor (hardware processor) such as a central processing unit (CPU), a memory such as a random-access memory (RAM) and a read-only memory (ROM), and the like, and may be configured by an integrated circuit.

<<Magnetic Sheet 18>>

The magnetic sheet 18 is a sheet mainly made of a ferromagnetic material, and is a magnetic rubber sheet mainly made of magnetic rubber, a magnetic plastic sheet mainly made of magnetic plastic, or a magnetic metal sheet mainly made of metal, for example. If a ferromagnetic material is exposed in a strong magnetic field, atoms' dipoles are aligned with a magnetic field and the alignment remains even after the magnetic field is removed. A ferromagnetic material which is once magnetized maintains the direction of the magnetic pole thereof until a sufficiently-strong opposite magnetic field, strong impact, or sufficient heat is applied to the ferromagnetic material. Utilizing this property in the present embodiment, the magnetic sheet 18 is magnetized by the magnet 11a of the magnetization component 11 in a rewritable manner.

<Operation>

A magnetization method according to the present embodiment is described. Texture information representing a pattern for magnetizing the surface 18a of the magnetic sheet 18 (magnetization pattern) is inputted into the input unit 14 of the magnetization device 1 (FIG. 1). The texture information is two dimensional data representing which coordinate of the surface 18a of the magnetic sheet 18 is to be magnetized. When the magnetization pattern is for magnetizing the surface 18a of the magnetic sheet 18 to either one magnetic pole (the S pole or the N pole) (when the magnetization pattern corresponds to only one magnetic pole), texture information includes pattern information representing a pattern for magnetization to the corresponding magnetic pole. On the other hand, when the magnetization pattern is for magnetizing the surface 18a of the magnetic sheet 18 to both magnetic poles (the S pole and the N pole) (when the magnetization pattern corresponds to both magnetic poles), texture information includes pattern information representing a pattern for magnetization to one magnetic pole (the S pole, for example) (first pattern information representing a pattern corresponding to one magnetic pole) and pattern information representing a pattern for magnetization to the other magnetic pole (the N pole, for example) (second pattern information representing a pattern corresponding to the other magnetic pole). FIG. 5 illustrates a magnetization pattern 110 for magnetizing the surface 18a of the magnetic sheet 18 to both magnetic poles. As illustrated in FIG. 5, the magnetization pattern 110 includes a pattern 111 for magnetization to the S pole and a pattern 112 for magnetization to the N pole. Texture information in this case includes information representing the pattern 111 and information representing the pattern 112. The texture information may be image data in a vector format which is produced by drawing software or may be image data in a raster format (bitmap image data) to which such image data is converted. The inputted texture information is stored in the storage 15. Further, the magnetic sheet 18 is placed on the magnetization device 1. Accordingly, the end portion 11aa (magnetic pole) of the magnet 11a in the magnetization component 11 attached to the cutter component attachment unit 12 is opposed to the surface 18a of the magnetic sheet 18.

When the magnetization device 1 which is a cutting plotter is operated, the control unit 16 reads the texture information from the storage 15 and changes a relative position of the drawing head 13 with respect to the surface 18a of the magnetic sheet 18 by controlling the driving unit 17 so as to magnetize the surface 18a of the magnetic sheet 18 to a pattern corresponding to the texture information by the magnetic force of the end portion 11aa of the magnet 11a (magnetization corresponding to the texture information is performed with respect to the surface 18a of the magnetic sheet 18). That is, the driving unit 17 moves the drawing head 13 along at least either one of the X axis and the Z axis, being able to change a relative position of the end portion 11aa of the magnet 11a with respect to the surface 18a of the magnetic sheet 18. The driving unit 17 further moves the magnetic sheet 18 along the Y axis, being able to change the relative position of the end portion 11aa of the magnet 11a with respect to the surface 18a of the magnetic sheet 18. Here, the X axis, the Y axis, and the Z axis are coordinate axes which are orthogonal to each other. The X-Y plane passing the X axis and the Y axis is substantially parallel (parallel, for example) to the surface 18a of the magnetic sheet 18 and the Z axis is substantially orthogonal (orthogonal, for example) to the surface 18a of the magnetic sheet 18. If the relative position of the drawing head 13 with respect to the magnetic sheet 18 is changed along the X coordinate and/or the Y axis, an (X,Y) coordinate of the end portion 11aa of the magnet 11a on the surface 18a of the magnetic sheet 18 can be changed and the magnetization position in the surface 18a of the magnetic sheet 18 can be changed. If the relative position of the drawing head 13 with respect to the magnetic sheet 18 is changed along the Z coordinate, a distance between the surface 18a of the magnetic sheet 18 and the end portion 11aa of the magnet 11a can be changed. The surface 18a of the magnetic sheet 18 is magnetized when the surface 18a of the magnetic sheet 18 and the end portion 11aa of the magnet 11a are brought in contact with or close to each other. Thus, existence of magnetization can be controlled by changing the distance between the surface 18a of the magnetic sheet 18 and the end portion 11aa of the magnet 11a. The driving unit 17 changes the relative position between the drawing head 13 and the magnetic sheet 18 along the X axis, the Y axis, and the Z axis based on the texture information so as to magnetize the surface 18a side of the magnetic sheet 18 in the magnetization pattern represented by the texture information. Here, when the magnetization pattern is for magnetizing the surface 18a of the magnetic sheet 18 to both magnetic poles (the S pole and the N pole), the driving unit 17 magnetizes the surface 18a side of the magnetic sheet 18 in a pattern corresponding to each magnetic pole. When magnetization is performed based on a pattern for magnetization to the S pole, the driving unit 17 changes the relative position between the drawing head 13 and the magnetic sheet 18 along the X axis, the Y axis, and the Z axis in accordance with the S-pole pattern so as to magnetize the surface 18a of the magnetic sheet 18 with the S-pole pattern (the pattern 111 in FIG. 5, for example) by using the magnetization component 11 which includes the magnet 11a having the end portion 11aa of the N pole. When magnetization is performed based on a pattern for magnetization to the N pole, the driving unit 17 changes the relative position between the drawing head 13 and the magnetic sheet 18 along the X axis, the Y axis, and the Z axis in accordance with the N-pole pattern so as to magnetize the surface 18a of the magnetic sheet 18 with the N-pole pattern (the pattern 112 in FIG. 5, for example) by using the magnetization component 11 which includes the magnet 11a having the end portion 11aa of the S pole. That is, when the N pole (the other magnetic pole) of the magnet 11a included in the magnetization component 11 is opposed to the surface 18a of the magnetic sheet 18, the surface 18a of the magnetic sheet 18 is magnetized with the S-pole pattern (the pattern 111 in FIG. 5, for example) (magnetization corresponding to first pattern information). On the other hand, when the S pole (one magnetic pole) of the magnet 11a included in the magnetization component 11 is opposed to the surface 18a of the magnetic sheet 18, the surface 18a of the magnetic sheet 18 is magnetized with the N-pole pattern (the pattern 112 in FIG. 5, for example) (magnetization corresponding to second pattern information). The method for switching the magnetic poles of the end portion 11aa is as described above.

The following two types of magnetization methods can be assumed.

Sliding method: A method in which an (X,Y) coordinate of the drawing head 13 on the magnetic sheet 18 is changed while keeping the magnetic pole of the end portion 11aa of the magnet 11a in contact with or close to the surface 18a of the magnetic sheet 18.

Plotting method: A method in which an (X,Y) coordinate of the drawing head 13 on the magnetic sheet 18 is changed while keeping the magnetic pole of the end portion 11aa of the magnet 11a separate from the surface 18a of the magnetic sheet 18 and the magnetic pole of the end portion 11aa of the magnet 11a is brought into contact with or close to the surface 18a of the magnetic sheet 18 on a coordinate on which magnetization is to be performed.

Though high speed magnetization can be realized in the sliding method, directions of atoms' dipoles on a magnetized part may not be able to be orthogonally aligned to the surface 18a and surface magnetic flux density may be accordingly lowered. On the other hand, directions of atoms' dipoles on a magnetized part can be orthogonally aligned to the surface 18a in the plotting method, but the magnetization requires much time. Comparison results in the number of steps, processing time, and surface magnetic flux density obtained when magnetization with the same patterns are performed by the plotting method, in which magnetization is performed at 2 mm interval and 1 mm interval, and the sliding method are illustrated.

TABLE 1

| Magnetization method | Number of steps | Processing time [s] | Bs [mT] |
| --- | --- | --- | --- |
| Plotting method (2 mm interval) | 176 | 57.0 | Max: 28.6, Min: 6.7 |

TABLE 1-continued

| Magnetization method | Number of steps | Processing time [s] | Bs [mT] |
|---|---|---|---|
| Plotting method (1 mm interval) | 352 | 96.4 | Max: 24.1, Min: 18.7 |
| Sliding method | 11 | 8.3 | Max: 25.5, Min: 22.3 |

This result shows that there is not large difference among the maximum values of the surface magnetic flux density in the plotting method and the sliding method. Further, it is understood that the number of steps and the processing time in the slide method are particularly smaller than those in the plotting method. Further, when magnetization is performed at 2 mm interval with the plotting method, the minimum value of the surface magnetic flux density is largely lowered. This is because an interval between magnetization points has been increased and the surface magnetic flux density has become uneven. The above shows that it is more preferable to perform magnetization by using the sliding method than the plotting method.

Characteristics of Present Embodiment

Magnetization can be performed with an arbitrary magnetic pattern without using a dedicated device for magnetization in the present embodiment.

Modification of First Embodiment

The magnetic poles of the end portion 11aa of the magnet 11a are manually switched when the surface 18a of the magnetic sheet 18 is magnetized to both magnetic poles (the S pole and the N pole), in the first embodiment. However, the magnetic poles of the end portion 11aa of the magnet 11a may be automatically switched. That is, the N pole (the other magnetic pole) of the magnet 11a included in the magnetization component 11 may be automatically made opposed to the surface 18a of the magnetic sheet 18 when the surface 18a of the magnetic sheet 18 is magnetized with the S-pole pattern (magnetization corresponding to the first pattern information), and the S pole (one magnetic pole) of the magnet 11a included in the magnetization component 11 may be automatically made opposed to the surface 18a of the magnetic sheet 18 when the surface 18a of the magnetic sheet 18 is magnetized with the N-pole pattern (magnetization corresponding to the second pattern information). Namely, polarity of the magnetic pole opposed to the surface 18a of the magnetic sheet 18 (object) may be able to be switched when the fixing portion 11b (attachment mechanism) is attached to the cutter component attachment unit 12 (attachment position). For example, the magnetic poles of the end portion 11aa in the magnet 11a may be automatically switched by physically reversing the magnet 11a of the magnetization component 11. Alternatively, an electromagnet may be used as the magnet 11a and the magnetic poles of the end portion 11aa in the magnet 11a may be automatically switched by switching a direction of current supplied to the electromagnet.

Second Embodiment

In a second embodiment, perception of bumpiness (also referred to as "unevenness") is provided by using two objects which are magnetized with patterns having the S pole and the N pole. A force sense presenting object according to the present embodiment has a "first object" and a "second object". The "first object" includes a "first surface" and the "first surface" is magnetized with a "first texture" including an S-pole region and an N-pole region. The "second object" includes a "second surface" and the "second surface" is magnetized with a "second texture" including an S-pole region and an N-pole region. Here, an "acting subject" that is a human being or an animal other than a human being touches at least either one of the "first object" and the "second object" and performs an operation for changing a relative positional relation between the "first surface" and the "second surface" or/and an action for changing the relative positional relation between the "first surface" and the "second surface" while keeping the "first surface" and the "second surface" in contact with or close to each other. Accordingly, the "acting subject" perceives bumpiness. That is, the "acting subject" touches at least either one of the "first object" and the "second object" and performs the operation for changing the relative positional relation between the "first surface" and the "second surface" or/and the action for changing the relative positional relation between the "first surface" and the "second surface" while keeping the "first surface" and the "second surface" in contact with or close to each other. Accordingly, shearing stress received by the "acting subject" from at least one of the "first object" and the "second object" periodically changes. Change in shearing stress is change in a linear direction included in a plane along the "first surface" and the "second surface", and the "acting subject" perceives (has an illusion) this change as bumpiness substantially orthogonal to the "first surface" and the "second surface". In the "first texture" and the "second texture", regions magnetized to the S pole and regions magnetized to the N pole are periodically arranged in an alternate manner, for example. The "first texture" and the "second texture" may be textures in which belt-like regions magnetized to the S pole and belt-like regions magnetized to the N pole are periodically arranged in an alternate manner or may include periodical nearly-checkered regions magnetized to the S pole and periodical nearly-checkered regions magnetized to the N pole, for example. A pattern of the "first texture" and a pattern of the "second texture" may be the same as each other or different from each other. The way of change in shearing stress received by the "acting subject" from at least one of the "first object" and the "second object" varies and bumpy feeling perceived by the "acting subject" also varies depending on a combination between a pattern of the "first texture" and a pattern of the "second texture". The way of change in shearing stress received by the "acting subject" from at least one of the "first object" and the "second object" may vary depending on a direction in which the relative positional relation between the "first surface" and the "second surface" is changed. In this case, bumpy feeling perceived by the "acting subject" varies as well depending on the direction in which the relative positional relation between the "first surface" and the "second surface" is changed. For example, the "first texture" and the "second texture" may be textures on which tape-like regions magnetized to the S pole and tape-like regions magnetized to the N pole are periodically arranged in an alternate manner. The operation for changing the relative positional relation between the "first surface" and the "second surface" or/and the action for changing the relative positional relation between the "first surface" and the "second surface" may be performed while keeping the "first surface" and the "second surface" in contact with or close to each other so that the longitudinal direction of the tape-like regions of the "first texture" follows the longitudinal direction of the tape-like regions of the "second texture". In this case, the way of change in shearing stress received by the "acting subject" from at least one of the "first object" and the "second object" varies and bumpy feeling perceived by the "acting subject" also varies depending on whether the relative positional relation between the "first surface" and the "second surface" is changed in the longitudinal direction of the tape-like regions or the short side direction of the same. Any of the following (1) to (3) or a combination of a part or all of these is the example of the operation for changing the relative positional relation between the "first surface" and the "second surface" or/and the action for changing the relative positional relation between the "first surface" and the "second surface".

(1) An action for changing the relative positional relation between the "first surface" and the "second surface" by directly moving at least one of the "first object" and the "second object" by the "acting subject".

(2) An action for changing the relative positional relation between the "first surface" and the "second surface" by moving a thing interposed between at least one of the "first object" and the "second object" and the "acting subject" by the "acting subject" so as to indirectly move at least one of the "first object" and the "second object".

(3) An operation for changing the relative positional relation between the "first surface" and the "second surface" by driving a device which automatically moves at least one of the "first object" and the "second object" by the "acting subject".

Further, "changing the relative positional relation between the first surface and the second surface" means sliding the "second surface" with respect to the "first surface" and sliding the "first surface" with respect to the "second surface", for example.

Specific examples of the present embodiment are described below with reference to the accompanying drawings.

A magnetic sheet 210 in FIG. 6A is a specific example of the "first object" and a magnetic sheet 220 in FIG. 6B is a specific example of the "second object". One surface (plate surface) 211 (first surface) of the magnetic sheet 210 is magnetized with a texture (first texture) including S-pole regions 211a and N-pole regions 211b. The regions 211a which have a belt-like (tape-like) shape and are magnetized to the S pole and the regions 211b which have a belt-like (tape-like) shape and are magnetized to the N pole are periodically arranged on the surface 211 in an alternate manner. In a similar manner, one surface (plate surface) 221 (the second surface) of the magnetic sheet 220 is magnetized with a texture (second texture) including S-pole regions 221a and N-pole regions 221b. The regions 221a which have a belt-like (tape-like) shape and are magnetized to the S pole and the regions 221b which have a belt-like (tape-like) shape and are magnetized to the N pole are periodically arranged on the surface 221 in an alternate manner. In this example, each of the width (pitch) in the short side direction of the region 211a, the width (pitch) in the short side direction of the region 211b, the width (pitch) in the short side direction of the region 221a, and the width (pitch) in the short side direction of the region 221b is 2 mm. Further, FIG. 6A and FIG. 6B express difference in magnetic poles of the region 211a, the region 211b, the region 221a, and the region 221b by difference of drawing patterns. The region 211a, the region 211b, the region 221a, and the region 221b are not separately painted in a visually recognizable manner. That is, these textures are magnetization patterns but are not a visually separately painted patterns (the same is applied to the below). The magnetic sheets 210 and 220 are magnetized by the method described in the first embodiment, for example. However, the magnetic sheets 210 and 220 may be magnetized by a method other than the above method (the same is applied to the below).

Figure 7:
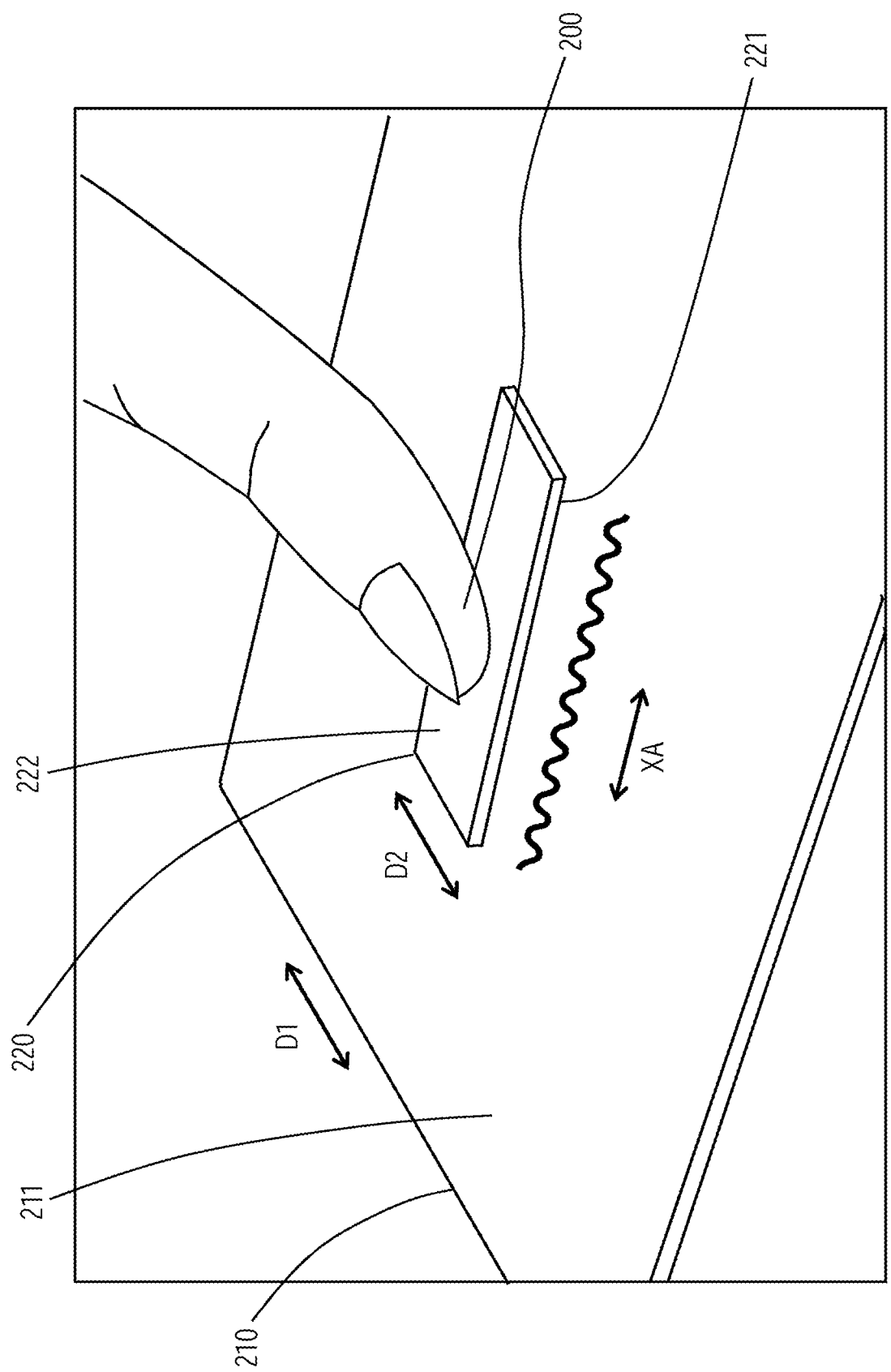
FIG. 7 is a diagram illustrating an action for presenting bumpy feeling by two magnetic sheets.
Figure 8:
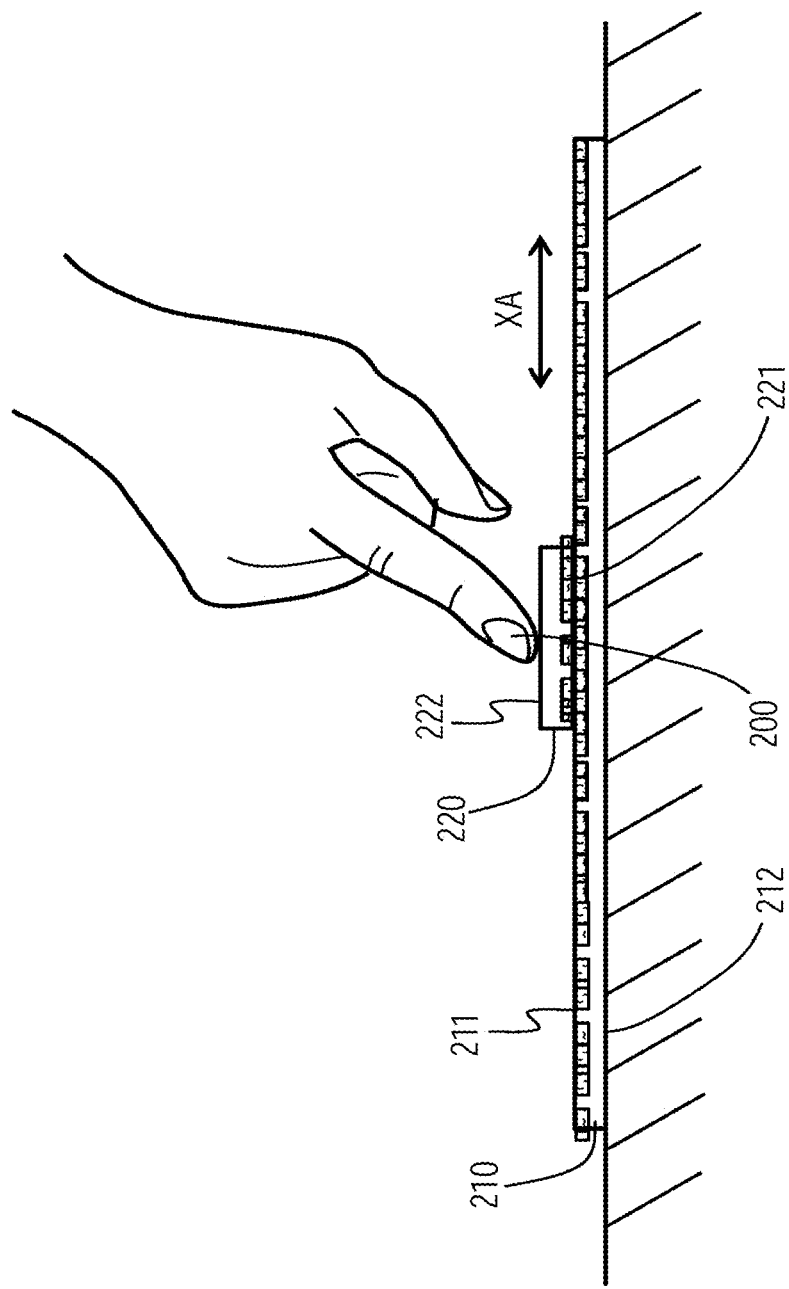
FIG. 8 is a diagram illustrating an action for presenting bumpy feeling by two magnetic sheets.

As illustrated in FIG. 7, FIG. 8, and FIG. 10A, a user (acting subject) places the magnetic sheet 210 so that the surface 211 faces outside and places the magnetic sheet 220 so that the surface 221 is in contact with the surface 211. Here, the magnetic sheet 220 is layered on the magnetic sheet 210 in a direction in which the longitudinal direction D1 of the regions 211a and 211b of the magnetic sheet 210 follows the longitudinal direction D2 of the regions 221a and 221b of the magnetic sheet 220. For example, the magnetic sheet 220 is layered on the magnetic sheet 210 so that the longitudinal direction D1 is along the longitudinal direction D2 (in other words, so that the longitudinal direction D1 and the longitudinal direction D2 are substantially parallel to each other). The user touches the other surface 222 of the magnetic sheet 220, which is layered on the magnetic sheet 210, with the finger 200 and performs an operation for changing a relative positional relation between the surface 211 and the surface 221 while keeping the surface 211 and the surface 221 in contact with or close to (nearly in contact with) each other. In the example of FIG. 7 and FIG. 8, the relative positional relation between the surface 211 and the surface 221 is changed in the XA direction which is the short side direction of the regions 211a and 211b of the magnetic sheet 210. Accordingly, shearing stress in the XA direction received by the user from the magnetic sheet 220 periodically changes. As a result, the user perceives bumpy feeling in a direction substantially orthogonal to the surface 221. Here, when the relative positional relation between the surface 211 and the surface 221 is changed in the longitudinal direction of the regions 211a and 211b of the magnetic sheet 210, shearing stress received by the user does not change and the user does not perceive bumpy feeling. The way of change in shearing stress received by the user from the magnetic sheet 220 varies and bumpy feeling perceived by the user also varies depending on a direction in which the relative positional relation between the surface 211 and the surface 221 is changed.

FIG. 9A and FIG. 9B respectively illustrate magnetic sheets 230 and 250 whose pitches are different from the pitch of the magnetic sheet 210 and FIG. 9C and FIG. 9D respectively illustrate magnetic sheets 240 and 260 whose pitches are different from the pitch of the magnetic sheet 220. The magnetic sheets 230 and 250 are specific examples of the "first object" and the magnetic sheets 240 and 260 are specific examples of the "second object". Belt-like regions 231a magnetized to the S pole and belt-like regions 231b magnetized to the N pole are periodically arranged in an alternate manner on one surface 231 (first surface) of the magnetic sheet 230. Similarly, belt-like regions 241a magnetized to the S pole and belt-like regions 241b magnetized to the N pole are periodically arranged in an alternate manner on one surface 241 (second surface) of the magnetic sheet 240. Belt-like regions 251a magnetized to the S pole and belt-like regions 251b magnetized to the N pole are periodically arranged in an alternate manner on one surface 251 (first surface) of the magnetic sheet 250. In a similar manner, belt-like regions 261a magnetized to the S pole and belt-like regions 261b magnetized to the N pole are periodically arranged in an alternate manner on one surface 261 (second surface) of the magnetic sheet 260. Here, each of the width in the short side direction of the region 231a, the width in the short side direction of the region 231b, the width in the short side direction of the region 241a, and the width in the short side direction of the region 241b is 4 mm. Each of the width in the short side direction of the region 251a, the width in the short side direction of the region 251b, the width in the short side direction of the regions 261a, and the width in the short side direction of the region 261b is 6 mm.

When the magnetic sheet 230 is used as the "first object" and the magnetic sheet 240 is used as the "second object", a user performs an operation for changing a relative positional relation between the surface 231 and the surface 241 or/and an action for changing the relative positional relation between the surface 231 and the surface 241 while keeping the surface 231 and the surface 241 in contact with or close to each other and accordingly perceives bumpy feeling (FIG. 10B), similarly to the case where the magnetic sheets 210 and 220 are used by replacing the magnetic sheets 210 and 220, the surfaces 211 and 221, and the regions 211a, 211b, 221a, and 221b with the magnetic sheets 230 and 240, the surfaces 231 and 241, and the regions 231a, 231b, 241a, and 241b respectively. In a similar manner, when the magnetic sheet 250 is used as the "first object" and the magnetic sheet 260 is used as the "second object", a user performs an operation for changing a relative positional relation between the surface 251 and the surface 261 or/and an action for changing the relative positional relation between the surface 251 and the surface 261 while keeping the surface 251 and the surface 261 in contact with or close to each other and accordingly perceives bumpy feeling (FIG. 10C), similarly to the case where the magnetic sheets 210 and 220 are used by replacing the magnetic sheets 210 and 220, the surfaces 211 and 221, and the regions 211a, 211b, 221a, and 221b with the magnetic sheets 250 and 260, the surfaces 251 and 261, and the regions 251a, 251b, 261a, and 261b respectively.

Also, any of the magnetic sheets 210, 230, and 250 may be used as the "first object", any of the magnetic sheets 220, 240, and 260 may be used as the "second object", and the pitch of the "first object" and the pitch of the "second object" may be different from each other.

Figure 11A:
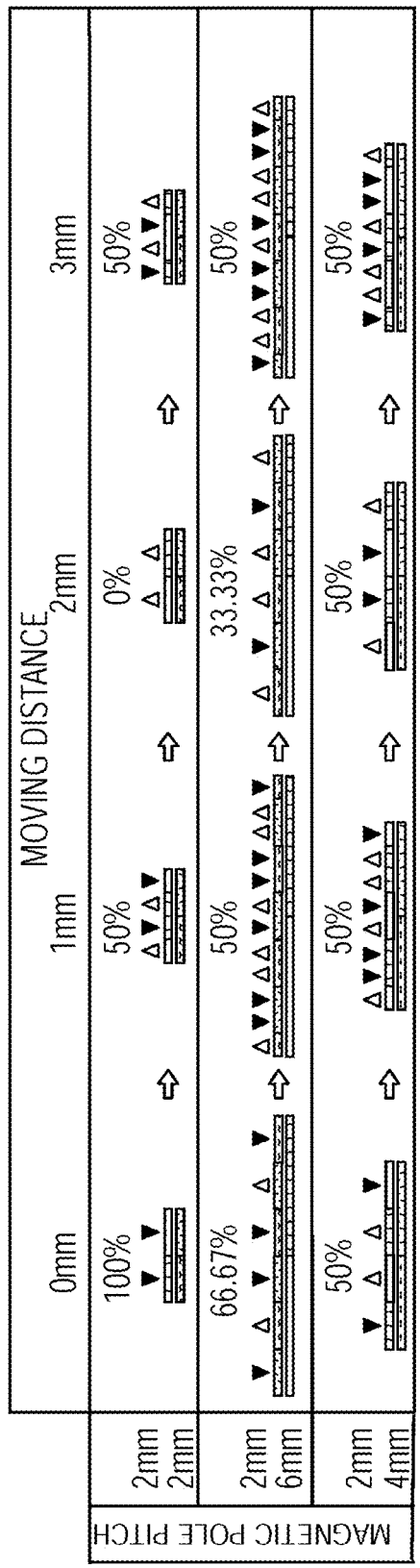
FIG. 11A to FIG. 11D are diagrams illustrating an attractive force area ratio between two magnetic sheets.
Figure 11D:
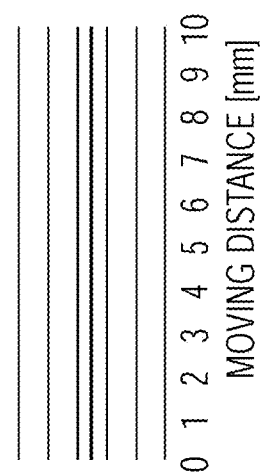
Figure 11C:
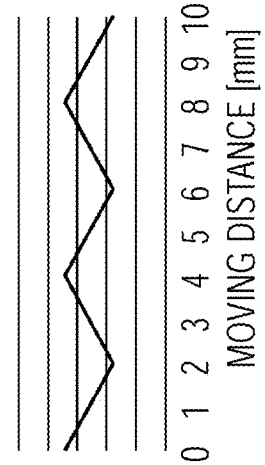
Figure 11B:
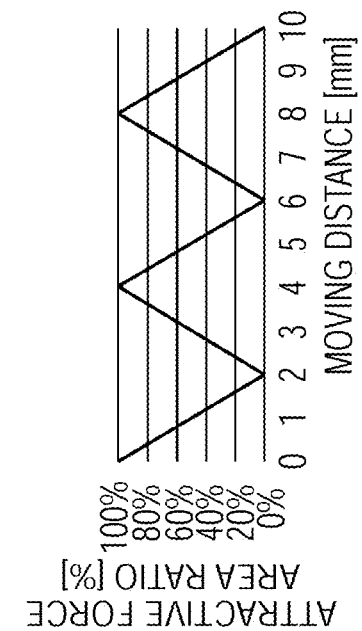

Pitches of magnetic sheets used as the "first object" and the "second object" affect shearing stress, that is, bumpy feeling perceived by a user. First, as illustrated from FIG. 10A to FIG. 10C, a spatial frequency of shearing stress perceived by a user, that is, spacing of bumpiness depends on a smaller pitch between a pitch of a magnetic sheet used as the "first object" and a pitch of a magnetic sheet used as the "second object". For example, spacing of bumpiness perceived when both of the pitch of a magnetic sheet used as the "first object" and the pitch of a magnetic sheet used as the "second object" are 2 mm as illustrated in FIG. 10A is narrower than spacing of bumpiness perceived when both of the pitch of a magnetic sheet used as the "first object" and the pitch of a magnetic sheet used as the "second object" are 4 mm as illustrated in FIG. 10B. Further, as illustrated from FIG. 11A to FIG. 11D, a magnitude of shearing stress, that is, a magnitude of bumpy feeling perceived by a user depends on a combination between the pitch of a magnetic sheet used as the "first object" and the pitch of a magnetic sheet used as the "second object". As illustrated in FIG. 11A and FIG. 11B, a difference between the maximum value (100%) and the minimum value (0%) of an attractive force area ratio between magnetic sheets used as the "first object" and the "second object" reaches the maximum and the magnitude of bumpy feeling perceived by a user reaches the maximum when the pitch of the magnetic sheet used as the "first object" and the pitch of the magnetic sheet used as the "second object" are the same as each other (when both are 2 mm, for example). As illustrated in FIG. 11A and FIG. 11C, when the pitch of a magnetic sheet used as the "first object" is 6 mm and a pitch of a magnetic sheet used as the "second object" is 2 mm, the maximum value and the minimum value of the attractive force area ratio between the magnetic sheets are respectively 66.67% and 33.33% and the magnitude of bumpy feeling perceived by a user is thus smaller than that obtained when the pitches of magnetic sheets used as the "first object" and the "second object" are the same as each other. Further, as illustrated in FIG. 11A and FIG. 11D, when the pitch of a magnetic sheet used as the "first object" is 4 mm and the pitch of a magnetic sheet used as the "second object" is 2 mm, the maximum value and the minimum value of the attractive force area ratio between the magnetic sheets are both 50% and a user accordingly does not perceive bumpy feeling.

The magnitude of bumpy feeling perceived by a user is formulated as the following. The pitch of the magnetic sheet A used as the "second object" is $p_A$=n [mm] and the pitch of the magnetic sheet B used as the "first object" is $p_B$=m [mm]. Here, n≤m holds. The attractive force area ratio $Ar_{(A,B)}$ on a surface on which these two magnetic sheets A and B are in contact with each other is expressed by a function f of two pitches $p_A$ and $p_B$.

$$Ar_{(A,B)} = f(p_A, p_B) \ [\%] \tag{1}$$

Here, the function f depends on patterns magnetizing the magnetic sheets A and B. Further, holding force ($H_{(A,B)}$ [g/cm$^2$]) generated between the two magnetic sheets A and B depends on $Ar_{(A,B)}$ and surface magnetic flux density $Bs_A$ and $Bs_B$ [mT] of both magnetic sheets A and B and is expressed by a function g.

$$H_{(A,B)} = g(Ar_{(A,B)}, Bs_{(A)}, Bs_{(B)}) \ [\text{g/cm}^2] \tag{2}$$

The magnitude $V_{(A,B)}$ of bumpy feeling depends on the maximum value $H_{(A,B)MAX}$ of $H_{(A,B)}$ and is expressed by a function h, the bumpy feeling perceived when the relative positional relation between surfaces of the magnetic sheet A and the magnetic sheet B is changed while keeping the surfaces of these two magnetic sheets A and B in contact with or close to each other.

$$V_{(A,B)} = h(H_{(A,B)MAX})$$

$$= h(g(Ar_{(A,B)}, Bs_{(A)}, Bs_{(B)})_{MAX})(\because (2))$$

$$= h(g(f(p_A, p_B), p_A, p_B)_{MAX})(\because (1), \text{ and when identical materials are used, surface magnetic flux density } Bs_A \text{ and } Bs_B \text{ mainly depend on the pitches } p_A \text{ and } p_B \text{ respectively})$$

$$= F(p_A, p_B) \tag{3}$$

Figure 12:
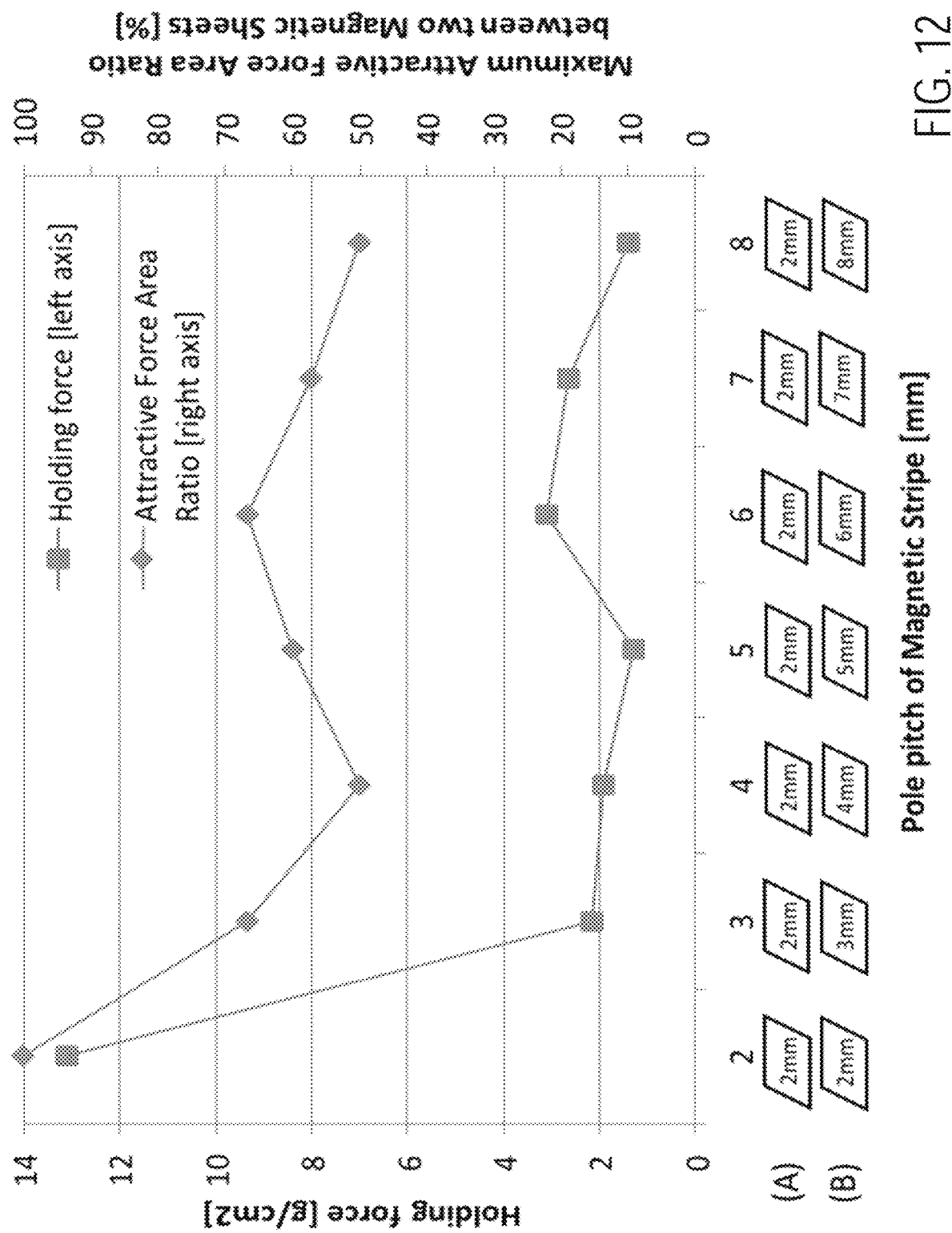
FIG. 12 is a diagram illustrating a relation among a pitch of a magnetic pattern, holding force, and an attractive force area ratio.

FIG. 12 illustrates a relation among the pitches $p_A$ and $p_B$ of the magnetic sheets A and B, holding force generated between the magnetic sheets A and B, and the maximum attractive force area ratio (the maximum value of the attractive force area ratio). The left vertical axis of FIG. 12 represents holding force, the right vertical axis represents maximum attractive force area ratio, and the horizontal axis represents the pitches $p_A$ and $p_B$ of the magnetic sheets A and B ((A) represents the pitch $p_A$ and (B) represents the pitch $p_B$). As illustrated, the magnitude of bumpiness perceived from the magnetic sheets A and B used as the "first object" and the "second object" vary depending on the pitches of the magnetic sheets A and B.

Figure 13C:
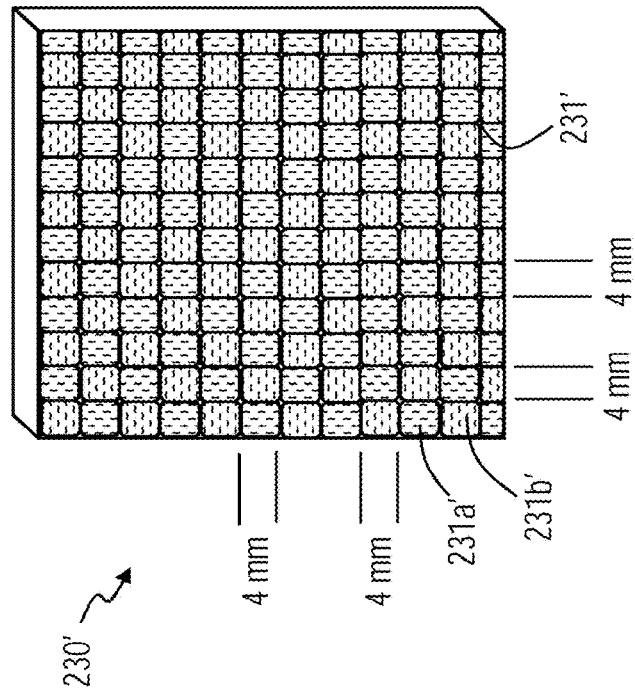
FIG. 13A to FIG. 13D are diagrams illustrating magnetized magnetic sheets.
Figure 13D:
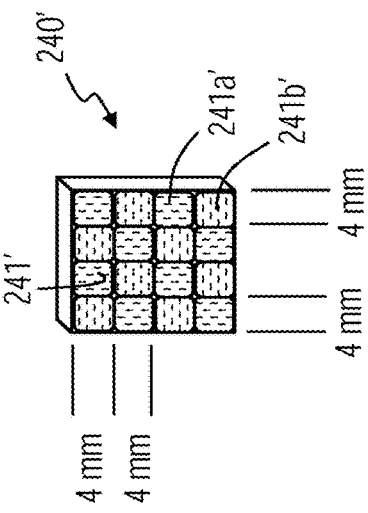
Figure 13A:
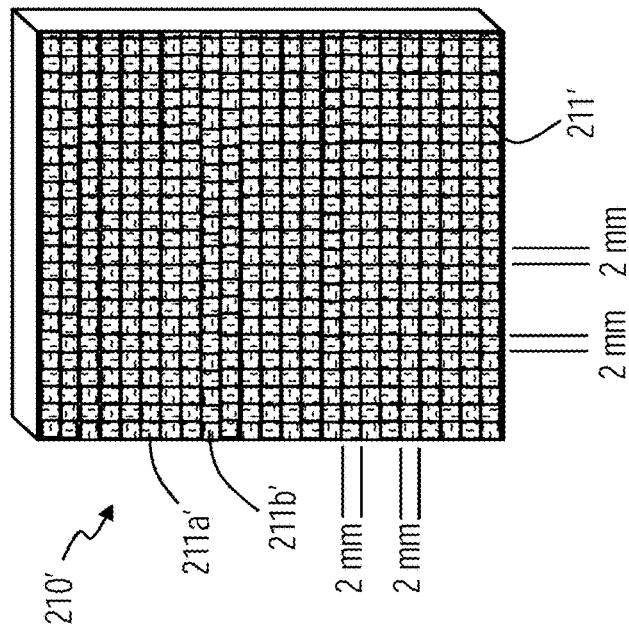
Figure 13B:
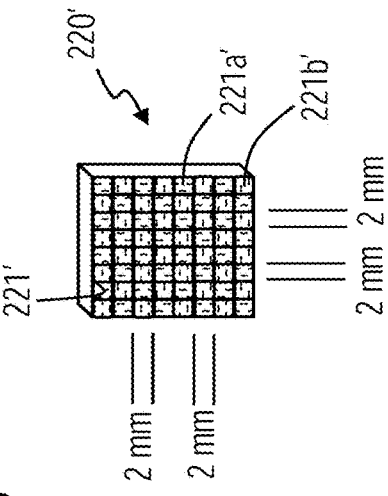
Figure 14B:
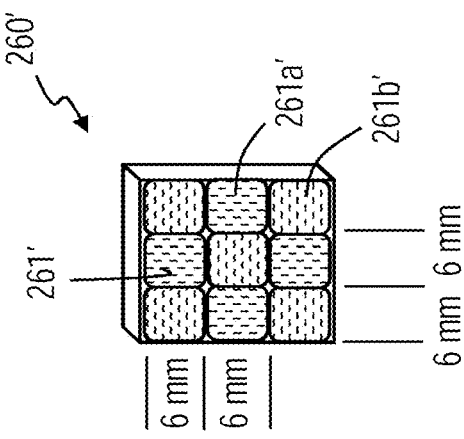
FIG. 14A and FIG. 14B are diagrams illustrating magnetized magnetic sheets.
Figure 14A:
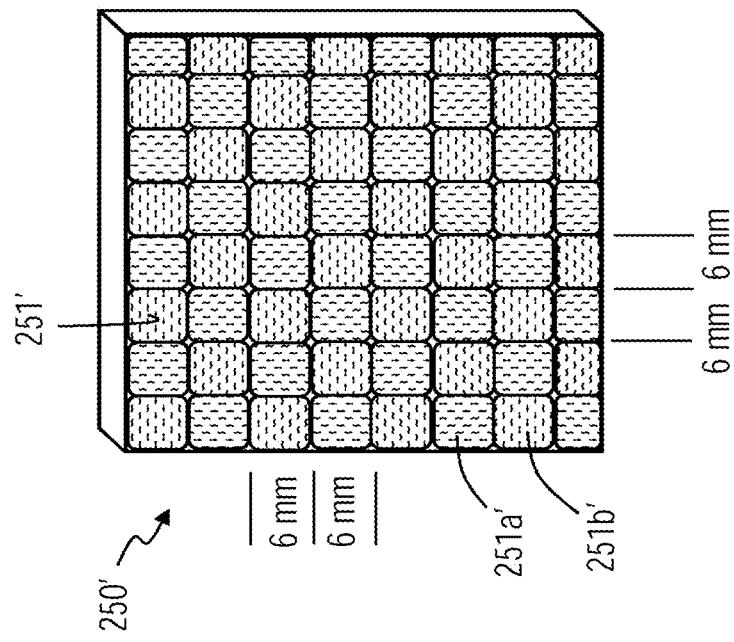

Other examples of the "first object" and the "second object" are described. FIG. 13A to FIG. 14B illustrate magnetic sheets which are magnetized with a texture including periodical nearly-checkered (nearly checker) regions magnetized to the S pole and periodical nearly-checkered regions magnetized to the N pole, as examples of the "first object" and the "second object". Magnetic sheets 210', 230', and 250' in FIG. 13A, FIG. 13C, and FIG. 14A are specific examples of the "first object" and magnetic sheets 220', 240' and 260' in FIG. 13B, FIG. 13D, and FIG. 14B are specific examples of the "second object". A nearly-checkered pattern means a checkered pattern or a pattern close to a checkered pattern. That is, the nearly-checkered pattern in the present embodiment includes not only a pattern (checkered pattern) in which squares (or rectangles) magnetized to the S pole and squares (or rectangles) magnetized to the N pole are periodically arranged in an alternate manner but also a pattern in which patterns similar to squares (or rectangles) magnetized to the S pole and patterns similar to squares (or rectangles) magnetized to the N pole are periodically arranged in an alternate manner. Examples of the pattern similar to a square (or a rectangle) include a pattern of a square (or a rectangle) with rounded corners, a circle, and an oval.

As illustrated in FIG. 13A, one surface 211' (first surface) of the magnetic sheet 210' (first object) is magnetized with a nearly-checkered texture (first texture) in which square regions 211a' having rounded corners and magnetized to the S pole and square regions 211b' having rounded corners and magnetized to the N pole are periodically repeated in an alternate manner. As illustrated in FIG. 13B, one surface 221' (second surface) of the magnetic sheet 220' (second object) is magnetized with a nearly-checkered texture (second texture) in which square regions 221a' having rounded corners and magnetized to the S pole and square regions 221b' having rounded corners and magnetized to the N pole are periodically repeated in an alternate manner. All pitches of patterns in the nearly-checkered patterns magnetizing the magnetic sheets 210' and 220' (the width of each of the patterns periodically and repeatedly arranged in an alternate manner) are 2 mm.

As illustrated in FIG. 13C, one surface 231' (first surface) of the magnetic sheet 230' (first object) is magnetized with a nearly-checkered texture (first texture) in which square regions 231a' having rounded corners and magnetized to the S pole and square regions 231b' having rounded corners and magnetized to the N pole are periodically repeated in an alternate manner. As illustrated in FIG. 13D, one surface 241' (second surface) of the magnetic sheet 240' (second object) is magnetized with a nearly-checkered texture (second texture) in which square regions 241a' having rounded corners and magnetized to the S pole and square regions 241b' having rounded corners and magnetized to the N pole are periodically repeated in an alternate manner. All pitches of patterns in the nearly-checkered patterns magnetizing the magnetic sheets 230' and 240' are 4 mm.

As illustrated in FIG. 14A, one surface 251' (first surface) of the magnetic sheet 250' (first object) is magnetized with a nearly-checkered texture (first texture) in which square regions 251a' having rounded corners and magnetized to the S pole and square regions 251b' having rounded corners and magnetized to the N pole are periodically repeated in an alternate manner. As illustrated in FIG. 14B, one surface 261' (second surface) of the magnetic sheet 260' (second object) is magnetized with a nearly-checkered texture (second texture) in which square regions 261a' having rounded corners and magnetized to the S pole and square regions 261b' having rounded corners and magnetized to the N pole are periodically repeated in an alternate manner. All pitches of patterns in the nearly-checkered patterns magnetizing the magnetic sheets 250' and 260' are 6 mm.

A user can perceive bumpiness by performing the operation for changing the relative positional relation between the "first surface" and the "second surface" or/and the action for changing the relative positional relation between the "first surface" and the "second surface" while keeping the "first surface" of the "first object" and the "second surface" in contact with or close to each other also when magnetic sheets magnetized with nearly-checkered textures described above are used as the "first object" and the "second object". The pitch of the "first object" and the pitch of the "second object" may be the same as or different from each other. Also, a magnetic sheet magnetized with a nearly-checkered texture may be used as the "first object" and a magnetic sheet magnetized with a texture in which belt-like regions are alternately repeated as described above may be used as the "second object". In an inverted manner, a magnetic sheet magnetized with a texture in which belt-like regions are alternately repeated as described above may be used as the "first object" and a magnetic sheet magnetized with a nearly-checkered texture may be used as the "second object".

Figure 15:
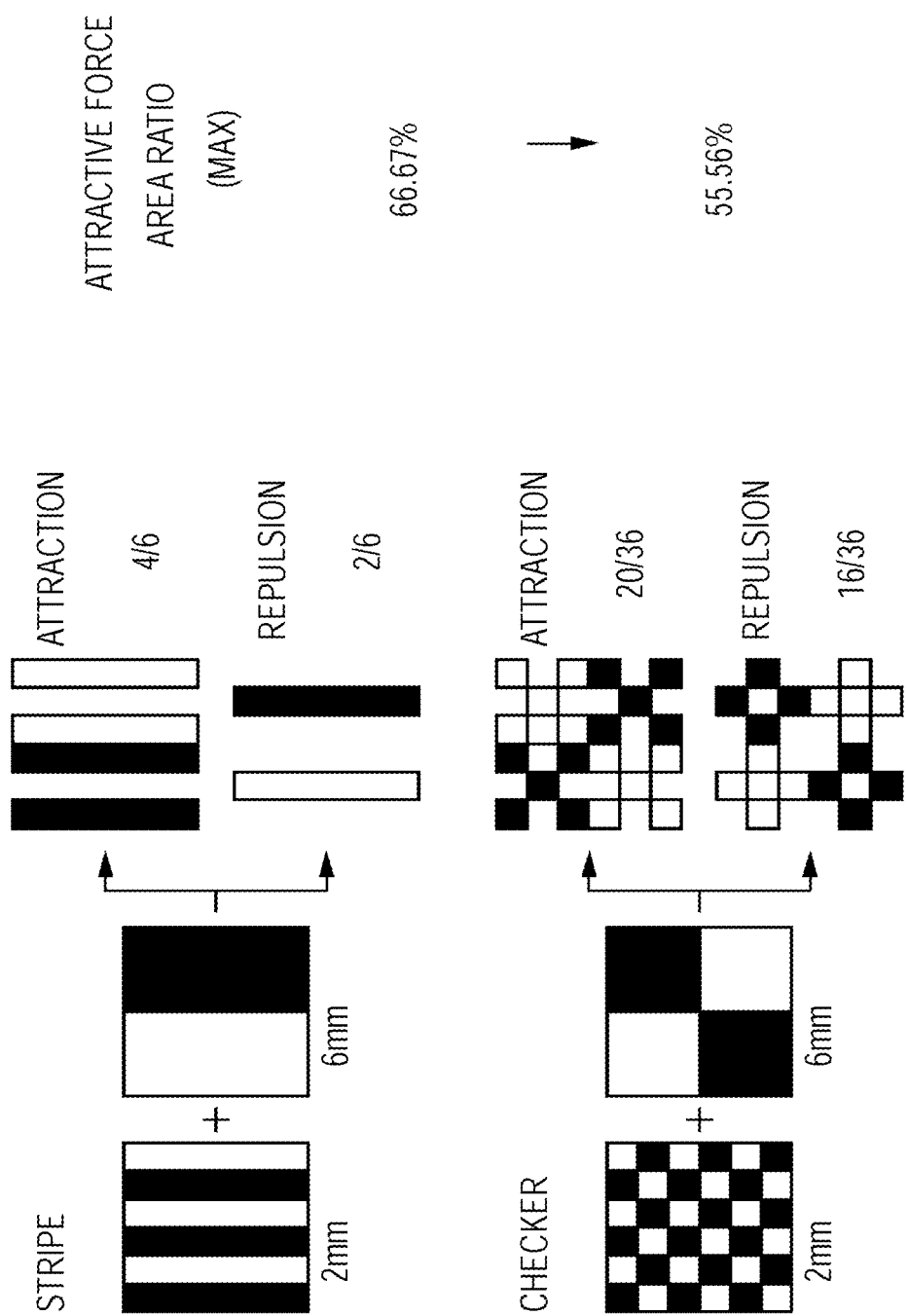
FIG. 15 is a diagram illustrating a difference between an attractive force area ratio of a stripe texture and an attractive force area ratio of a checker texture.
Figure 16A:
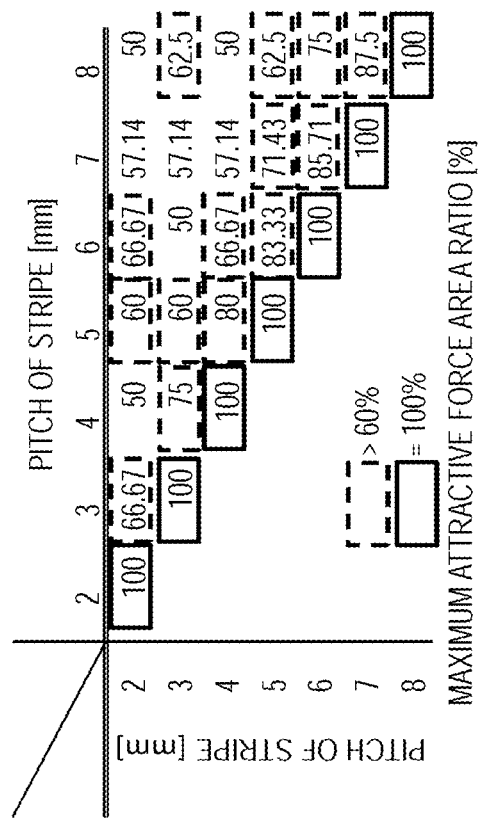
FIG. 16A and FIG. 16B respectively illustrate a relation between a pitch of a combination of magnetic sheets magnetized with stripe textures and holding force, and a relation between a pitch and an attractive force area ratio.
Figure 16B:
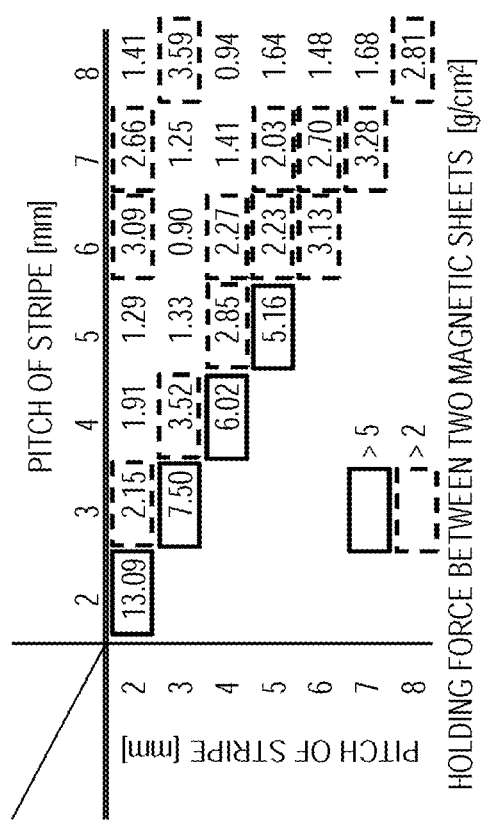
Figure 17B:
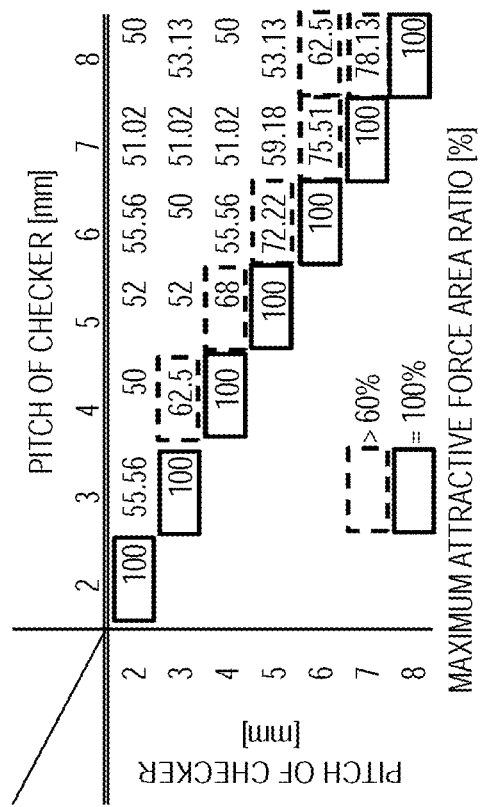
FIG. 17A and FIG. 17B respectively illustrate a relation between a pitch of a combination of magnetic sheets magnetized with checker textures and holding force, and a relation between a pitch and an attractive force area ratio.
Figure 17A:
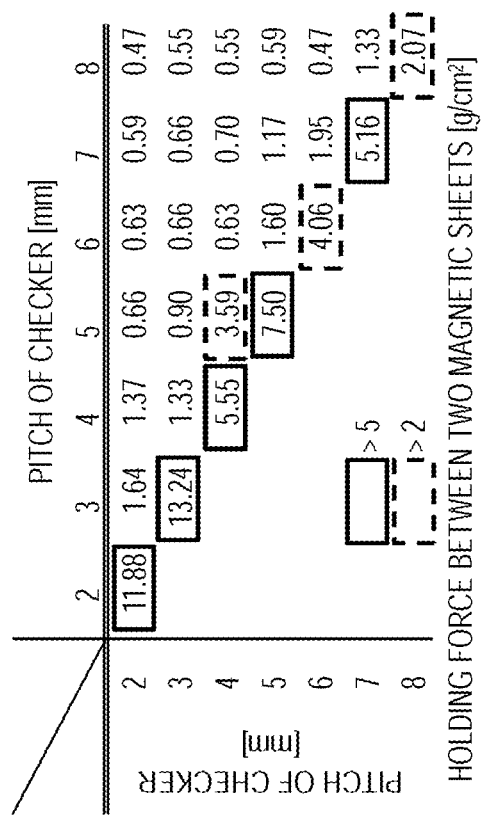

Pitches of magnetic sheets used as the "first object" and the "second object" affect shearing stress, that is, bumpy feeling perceived by a user also when a magnetic sheet magnetized with a nearly-checkered texture as described above is used as at least one of the "first object" and the "second object". That is, a spatial frequency of shearing stress, that is, spacing of bumpiness perceived by a user depends on a smaller pitch between the pitch of a magnetic sheet used as the "first object" and the pitch of a magnetic sheet used as the "second object". Further, a magnitude of shearing stress, that is, a magnitude of bumpy feeling perceived by a user depends on a combination between the pitch of a magnetic sheet used as the "first object" and the pitch of a magnetic sheet used as the "second object". Also, the above-described formulation for a magnitude of perceived bumpy feeling is applicable also to the case where a magnetic sheet magnetized with a nearly-checkered texture is used as at least one of the "first object" and the "second object", and the magnitude $V_{(A,B)}$ of perceived bumpy feeling is expressed by Formula (3). However, the maximum attractive force area ratio between magnetic sheets is smaller and perceived bumpy feeling can be reduced when a magnetic sheet magnetized with a nearly-checkered texture is used as at least one of the "first object" and the "second object" compared to the case where magnetic sheets magnetized with a texture in which belt-like regions are alternately repeated as those described above are used as the "first object" and the "second object". For example, even in the use of the magnetic sheet having a 2-mm pitch and the magnetic sheet having a 6-mm pitch, 66.67% of maximum attractive force area ratio is obtained when a combination of magnetic sheets magnetized with textures in which belt-like regions are alternately repeated (stripe texture) is used, while 55.56% of maximum attractive force area ratio is obtained when a combination of magnetic sheets magnetized with nearly-checkered textures (checker texture) is used, as illustrated in FIG. 15. Further, even in the use of a combination of magnetic sheets magnetized with stripe textures or a combination of magnetic sheets magnetized with checker textures, holding force and the maximum attractive force area ratio between these magnetic sheets reach the maximum when the pitch of the magnetic sheet used as the "first object" and the pitch of the magnetic sheet used as the "second object" are equal to each other, as illustrated from FIG. 16A to FIG. 17B. Here, in the use of stripe textures, certain levels of holding force and maximum attractive force area ratios can be obtained even when the pitch of the magnetic sheet used as the "first object" and the pitch of the magnetic sheet used as the "second object" are different from each other (FIG. 16A and FIG. 16B). On the other hand, in the use of checker textures, holding force and maximum attractive force area ratios are largely lower when the pitch of the magnetic sheet used as the "first object" and the pitch of the magnetic sheet used as the "second object" are different from each other compared to the case where these pitches are the same as each other (FIG. 17A and FIG. 17B). That is, it is understood that a certain level of magnitude of bumpy feeling can be perceived even when pitches of two magnetic sheets are different from each other in the use of stripe textures, while the magnitude of perceived bumpy feeling is largely lowered when the pitches of two magnetic sheets are different from each other in the use of checker textures. Meanwhile, bumpy feeling can be perceived only when the relative position between the "first object" and the "second object" is changed in a one-dimensional direction in the use of stripe textures, while bumpy feeling can be perceived also when this relative position is changed in a two-dimensional direction in the use of checker textures.

Characteristics of Present Embodiment

In the present embodiment, use of two magnetic sheets enables perception of bumpy feeling and realizes expression of various kinds of bumpy feeling in accordance with textures magnetizing respective magnetic sheets and pitches.

Modification of Second Embodiment

If magnetic force sufficiently acts between a magnetic sheet used as the "first object" and a magnetic sheet used as the "second object", the relative positional relation between surfaces (first surface and second surface) of these magnetic sheets may be changed in a state that these two magnetic sheets are not in contact with each other. For example, a thin sheet made of a nonmagnetic body such as paper may be interposed between these two magnetic sheets. A user may be in contact with both of a magnetic sheet used as the "first object" and a magnetic sheet used as the "second object" or may be in contact only with the magnetic sheet used as the "first object".

Third Embodiment

The principles of the second embodiment are applied to a third embodiment. As described above, even though a texture magnetizing one magnetic sheet is unvaried, different kinds of bumpy feeling can be provided to a user if a texture magnetizing the other magnetic sheet to be layered on one magnetic sheet is varied. The present embodiment utilizes this characteristic. A force sense presenting object according to the present embodiment includes a "base object", a "first sheet", a "second sheet", a "first contact object", and a "second contact object". The "base object" includes a "first surface", and the "first surface" is preliminarily magnetized with a "first texture" including S-pole regions and N-pole regions. The "first sheet" is provided with a "first pattern", which is visually recognizable, and is layered on the "first surface" of the "base object". The "second sheet" is provided with a "second pattern", which is different from the "first pattern" and is visually recognizable, and is layered on the "first surface" of the "base object". The "first contact object" includes a "second surface", and the "second surface" is preliminarily magnetized with a "second texture" including S-pole regions and N-pole regions. The "second contact object" includes a "third surface", and the "third surface" is preliminarily magnetized with a "third texture" which includes S-pole regions and N-pole regions and is different from the "second texture". Here, bumpy feeling perceived by the "acting subject" from the "first contact object" when performing a "first action" and bumpy feeling perceived by the "acting subject" from the "second contact object" when performing a "second action" are different from each other. In other words, the way of change in shearing stress received by the "acting subject" from the "first contact object" when performing the "first action" and the way of change in shearing stress received by the "acting subject" from the "second contact object" when performing the "second action" are different from each other. Here, the "first action" means an action that the "acting subject" touches the "first contact object" and performs an operation for changing a relative positional relation between the "first surface" and the "second surface" or/and an action for changing the relative positional relation between the "first surface" and the "second surface" while keeping the "first surface" and the "second surface" close to each other when the "first sheet" is layered on the "first surface" of the "base object". The "second action" means an action that the "acting subject" touches the "second contact object" and performs an operation for changing a relative positional relation between the "first surface" and the "third surface" or/and an action for changing the relative positional relation between the "first surface" and the "third surface" while keeping the "first surface" and the "third surface" close to each other when the "second sheet" is layered on the "first surface" of the "base object".

Specific examples of the present embodiment are described below with reference to the accompanying drawings.

Figure 19:
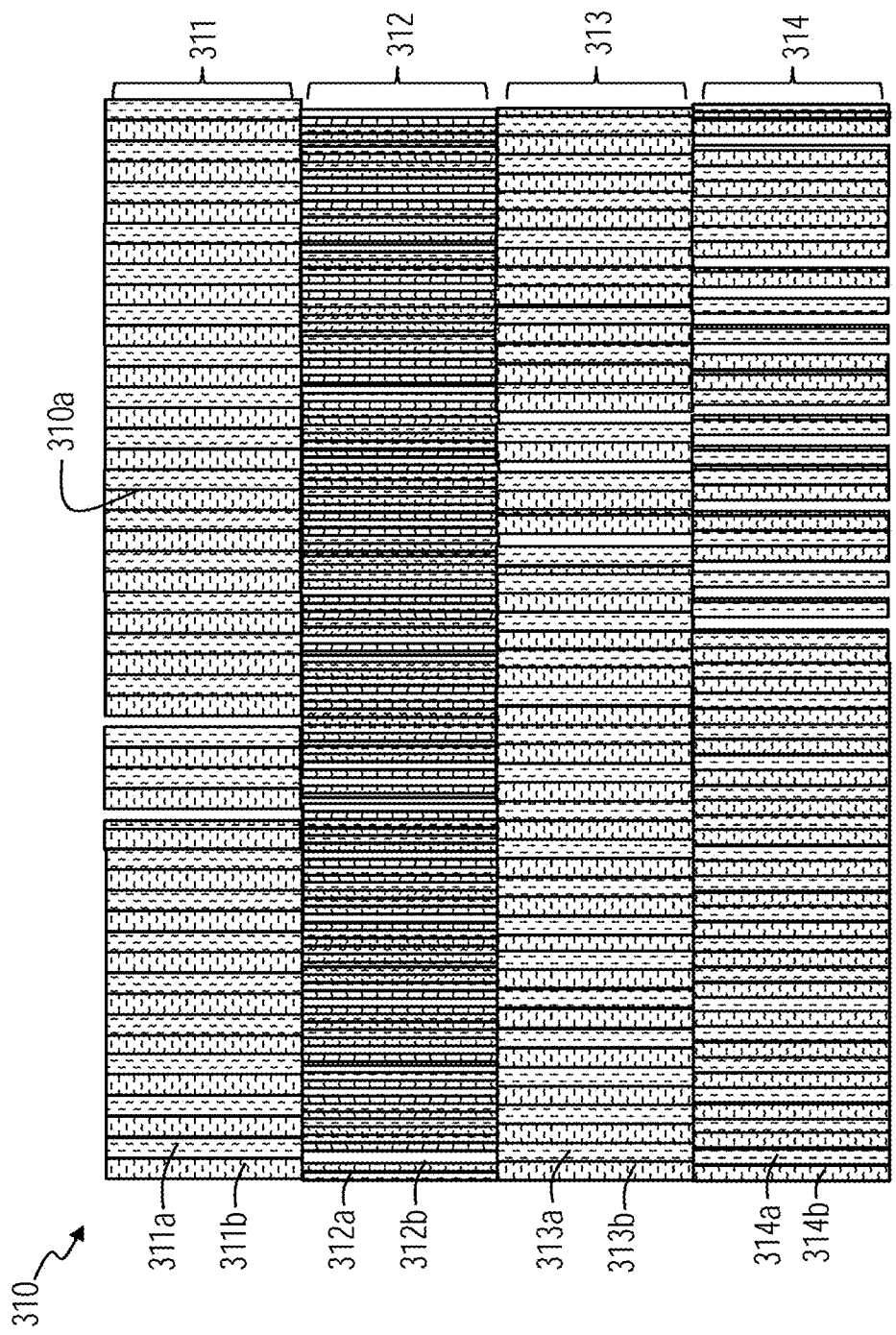
FIG. 19 is a diagram illustrating a base object.

FIG. 19 illustrates a base object 310 which is the "base object" of the present embodiment. The base object 310 of the present embodiment is a magnetic sheet and one surface 310a (first surface) of the base object 310 is preliminarily magnetized with a texture (first texture) including S-pole regions 311a, 312a, 313a, and 314a and N-pole regions 311b, 312b, 313b, and 314b. The surface 310a of the base object 310 is sectioned into four regions 311, 312, 313, and 314. The region 311 is magnetized so that the S-pole regions 311a having a belt-like shape and the N-pole regions 311b having a belt-like shape are periodically repeated in an alternate manner. The region 312 is magnetized so that the S-pole regions 312a having a belt-like shape and the N-pole regions 312b having a belt-like shape are periodically repeated in an alternate manner. The region 313 is magnetized so that the S-pole regions 313a having a belt-like shape and the N-pole regions 313b having a belt-like shape are periodically repeated in an alternate manner. The region 314 is magnetized so that the S-pole regions 314a having a belt-like shape and the N-pole regions 314b having a belt-like shape are periodically repeated in an alternate manner.

Figure 18A:
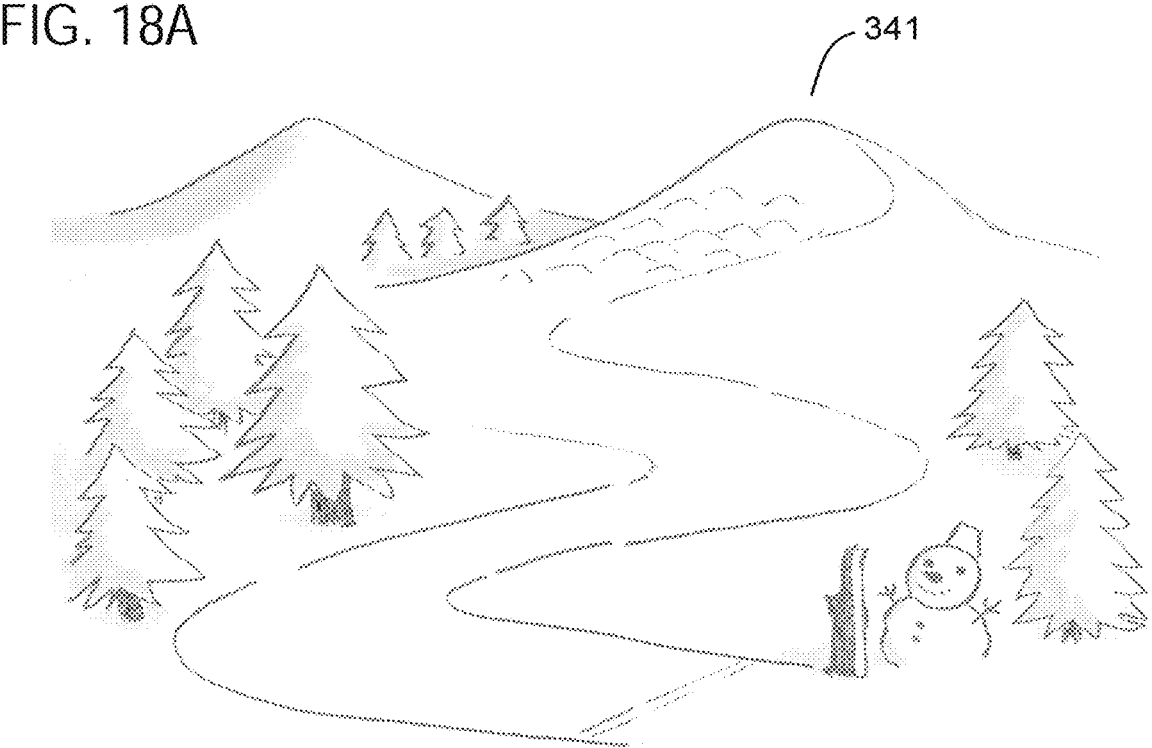
FIG. 18A and FIG. 18B are diagrams illustrating sheets to be layered on a base object.
Figure 18B:
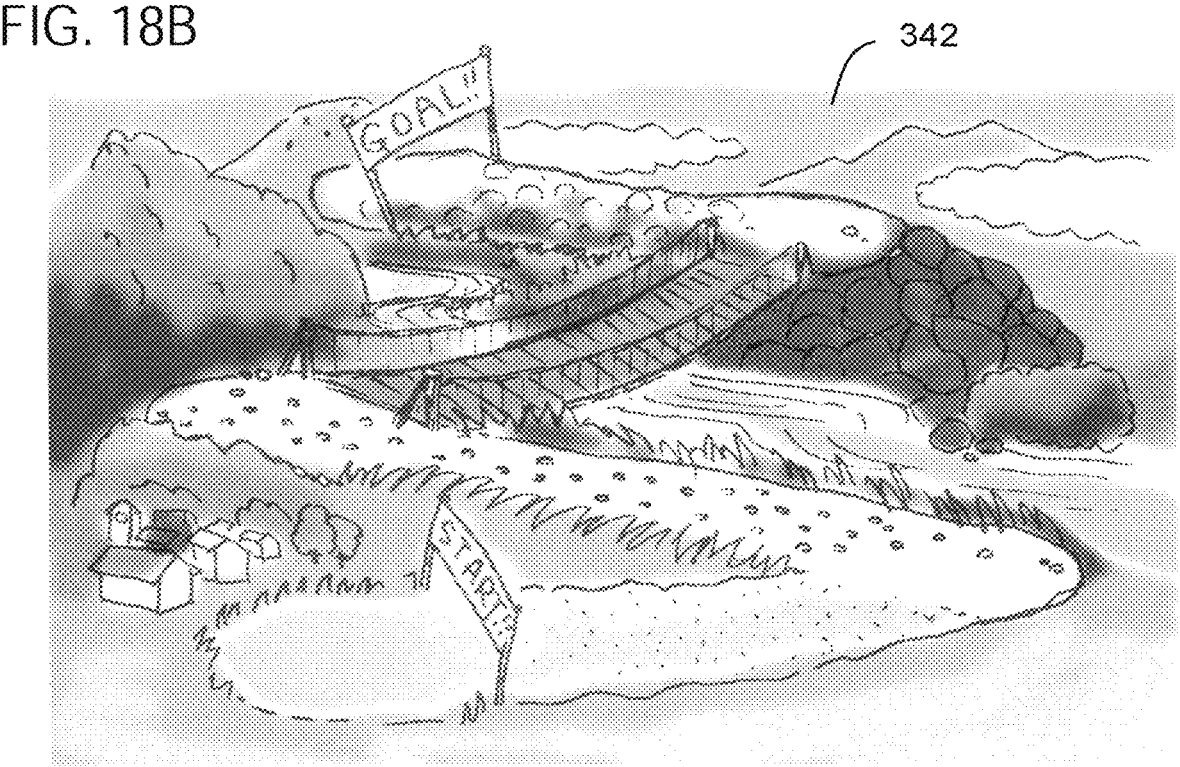

FIG. 18A illustrates a sheet 341 which is the "first sheet" of the present embodiment and FIG. 18B illustrates a sheet 342 which is the "second sheet" of the present embodiment. The sheets 341 and 342 are thin sheets made of a nonmagnetic body such as paper and synthetic resin. The sheets 341 and 342 may be made of an opaque material or may be made of a transparent material. One surface of the sheet 341 is provided with a visually-recognizable pattern (first pattern).

One surface of the sheet 342 is provided with a visually-recognizable pattern (second pattern) which is different from the pattern (first pattern) of the sheet 341. On one surface of the sheet 341 illustrated in FIG. 18A and one surface of the sheet 342 illustrated in FIG. 18B, images which are different from each other (drawings and pictures, for example) are drawn. In this example, a ski area is expressed on the sheet 341 and an off-road course is expressed on the sheet 342. Each of the sheets 341 and 342 can be layered on the surface 310a of the base object 310.

Figure 20A:
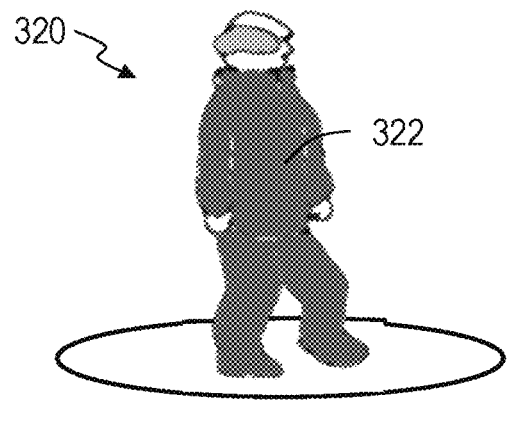
FIG. 20A to FIG. 20D are diagrams illustrating contact objects.
Figure 20B:
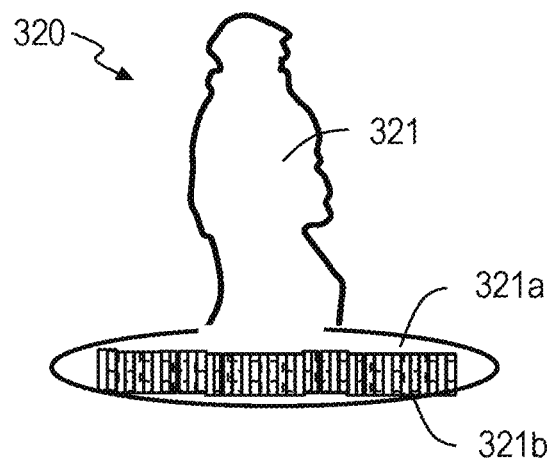

FIG. 20A and FIG. 20B illustrate a contact object 320 which is the "first contact object" of the present embodiment. The contact object 320 of the present embodiment is a magnetic sheet. An image (a drawing and a picture of a snowboarder, for example) is drawn on one surface 322 of the contact object 320. The other surface 321 (second surface) of the contact object 320 is preliminarily magnetized with a texture (second texture) including S-pole regions 321a and N-pole regions 321b. The surface 321 of the contact object 320 of the present embodiment is magnetized so that the S-pole regions 321a having a belt-like shape and the N-pole regions 321b having a belt-like shape are periodically repeated in an alternate manner.

Figure 20C:
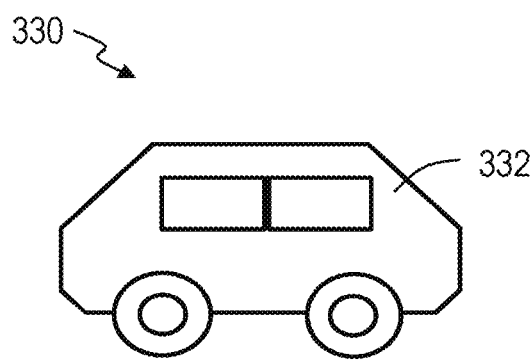
Figure 20D:
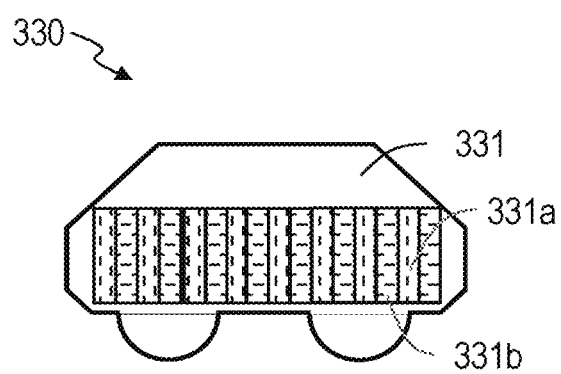

FIG. 20C and FIG. 20D illustrate a contact object 330 which is the "second contact object" of the present embodiment. The contact object 330 of the present embodiment is also a magnetic sheet. An image (a drawing and a picture of a car, for example) is drawn on one surface 332 of the contact object 330. The other surface 331 (third surface) of the contact object 330 is preliminarily magnetized with a texture (third texture) including S-pole regions 331a and N-pole regions 331b. The texture magnetizing the surface 331 of the contact object 330 is different from the texture magnetizing the surface 321 of the contact object 320. The surface 331 of the contact object 330 of the present embodiment is magnetized so that the S-pole regions 331a having a belt-like shape and the N-pole regions 331b having a belt-like shape are periodically repeated in an alternate manner. However, the pitch of the texture magnetizing the surface 331 is different from the pitch of the texture magnetizing the surface 321 of the contact object 320.

When the sheet 341 (first sheet) is layered on the surface 310a of the base object 310, the contact object 320 is further layered on the sheet 341. The sheet 341 is interposed between the contact object 320 and the base object 310 in a state that the surface 321 of the contact object 320 faces the sheet 341 side. A user (acting subject) touches the surface 322 of the contact object 320 with the finger or the like and performs an operation for changing a relative positional relation between the surface 310a (first surface) and the surface 321 (second surface) or/and an action for changing the relative positional relation between the surface 310a (first surface) and the surface 321 (second surface) while keeping the surface 310a (first surface) and the surface 321 (second surface) close to each other (first action). Accordingly, the user perceives bumpy feeling from the contact object 320. As described above, this bumpy feeling varies depending on a combination between a pattern, which is composed of the S-pole regions 321a and the N-pole regions 321b and magnetizes the surface 321 of the contact object 320, and a pattern, which is composed of the S-pole regions (any of the regions 311a, 312a, 313a, and 314a) and the N-pole regions (any of the regions 311b, 312b, 313b, and 314b) and magnetizes the region (any of the regions 311, 312, 313, and 314) of the surface 310a of the base object 310, which is close to the pattern composed of the S-pole regions 321a and the N-pole regions 321b.

Meanwhile, when the sheet 342 (second sheet) is layered on the surface 310a of the base object 310, the contact object 330 is further layered on the sheet 342. The sheet 342 is interposed between the contact object 330 and the base object 310 in a state that the surface 331 of the contact object 330 faces the sheet 342 side. A user (acting subject) touches the surface 332 of the contact object 330 with the finger or the like and performs an operation for changing a relative positional relation between the surface 310a (first surface) and the surface 331 (third surface) or/and an action for changing the relative positional relation between the surface 310a (first surface) and the surface 331 (third surface) while keeping the surface 310a (first surface) and the surface 331 (third surface) close to each other (second action). Accordingly, the user perceives bumpy feeling from the contact object 330. As described above, this bumpy feeling also varies depending on a combination between a pattern, which is composed of the S-pole regions 331a and the N-pole regions 331b and magnetizes the surface 331 of the contact object 330, and a pattern, which is composed of the S-pole regions (any of the regions 311a, 312a, 313a, and 314a) and the N-pole regions (any of the regions 311b, 312b, 313b, and 314b) and magnetizes the region (any of the regions 311, 312, 313, and 314) of the surface 310a of the base object 310, which is close to the pattern composed of the S-pole regions 331a and the N-pole regions 331b.

Further, the texture including the S-pole regions 321a and the N-pole regions 321b which are magnetized on the surface 321 of the contact object 320 and the texture including the S-pole regions 331a and the N-pole regions 331b which are magnetized on the surface 331 of the contact object 330 are different from each other. Therefore, bumpy feeling perceived by a user performing the "first action" when the texture including the regions 321a and 321b which are magnetized on the contact object 320 is close to any region α (any of the regions 311, 312, 313, and 314) of the surface 310a of the base object 310 and bumpy feeling perceived by the user performing the "second action" when the texture including the regions 331a and 331b which are magnetized on the contact object 330 is close to the same region α are different from each other. This is because the way of change in shearing stress received from the contact object 320 by a user performing the "first action" when the texture including the regions 321a and 321b which are magnetized on the contact object 320 is close to the region α and the way of change in shearing stress received from the contact object 330 by the user performing the "second action" when the texture including the regions 331a and 331b which are magnetized on the contact object 330 is close to the same region α are different from each other, as described above.

Characteristics of Present Embodiment

As described above, different kinds of bumpy feeling can be presented to a user depending on whether to use the contact object 320 or the contact object 330 even when the base object 310 is used for both cases. For example, magnitude or a pitch (spacing of perceived bumpiness) of bumpy feeling can be varied and regions on which bumpy feeling is not perceived can be varied depending on whether to use the contact object 320 or the contact object 330. Thus, mutually-different images corresponding mutually-different bumpy feeling are drawn on the sheet 341 and sheet 342 respectively, enabling perception of mutually-different bumpy feeling which respectively correspond to the mutually-different images drawn on the sheet 341 and the sheet 342.

Thus, bumpy feeling can be changed depending on an image expressed on a sheet even though only a permanent magnet is used in the present embodiment. This technique is applicable to picture books presenting different kinds of bumpy feeling depending on a sheet, for example.

Modification of Third Embodiment

The "first texture" magnetized on the "first surface" of the "base object" may be a "checker texture" which includes periodical nearly-checkered regions magnetized to the S pole and periodical nearly-checkered regions magnetized to the N pole. In the same manner, the "second texture" magnetizing the "second surface" of the "first contact object" may be the "checker texture" and the "third texture" magnetizing the "third surface" of the "second contact object" may be the "checker texture".

For example, a base object 310' illustrated in FIG. 21A may be used instead of the base object 310 described above, a contact object 320' illustrated in FIG. 21B may be used instead of the contact object 320, and a contact object 330' illustrated in FIG. 21C may be used instead of the contact object 330.

The base object 310' is a magnetic sheet and one surface 310a' (first surface) of the base object 310' is preliminarily magnetized with a periodical nearly-checkered texture (first texture) including S-pole regions 311a', 312a', 313a', 314a', and 315a' and N-pole regions 311b', 312b', 313b', 314b', and 315b'. The surface 310a' of the base object 310' is sectioned into five regions 311', 312', 313', 314', and 315'. The region 311' is magnetized with a periodical nearly-checkered texture composed of the S-pole regions 311a' and the N-pole regions 311b'. The region 312' is magnetized with a periodical nearly-checkered texture composed of the S-pole regions 312a' and the N-pole regions 312b'. The region 313' is magnetized with a periodical nearly-checkered texture composed of the S-pole regions 313a' and the N-pole regions 313b'. The region 314' is magnetized with a periodical nearly-checkered texture composed of the S-pole regions 314a' and the N-pole regions 314b'. The region 315' is magnetized with a periodical nearly-checkered texture composed of the S-pole regions 315a' and the N-pole regions 315b'.

The contact object 320' is a magnetic sheet. An image is drawn on one surface of the contact object 320' and the other surface 321' (second surface) is preliminarily magnetized with a periodical nearly-checkered texture (second texture) composed of S-pole regions 321a' and N-pole regions 321b'. The contact object 330' is a magnetic sheet. An image is drawn on one surface of the contact object 330' and the other surface 331' (third surface) is preliminarily magnetized with a periodical nearly-checkered texture (third texture) composed of S-pole regions 331a' and N-pole regions 321b'.

Figure 22B:
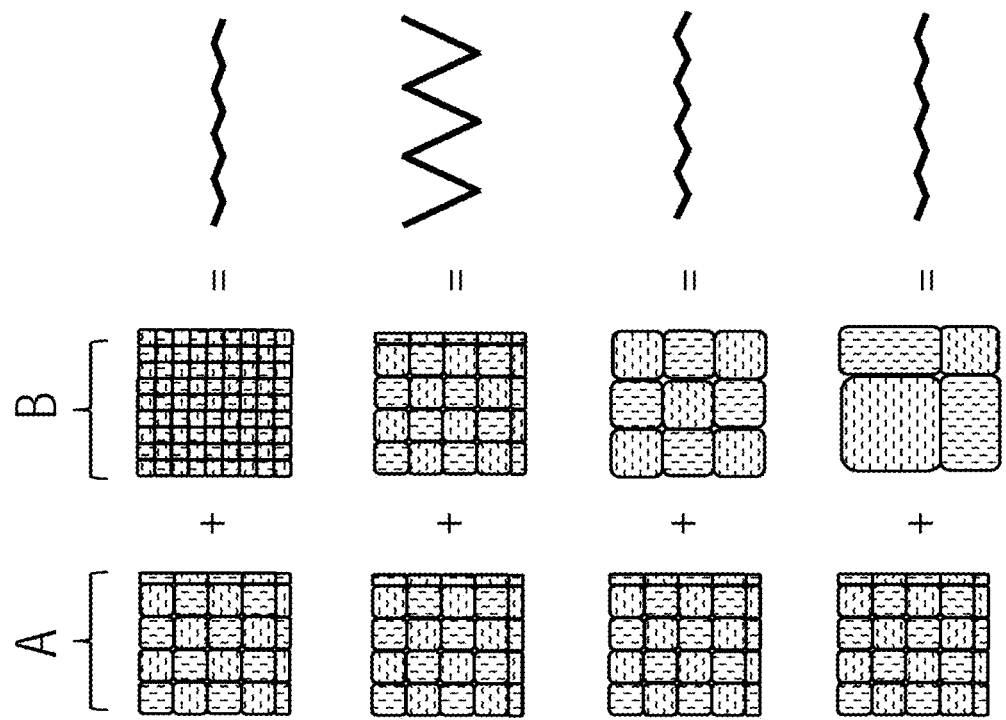
FIG. 22A and FIG. 22B are diagrams illustrating a relation of an attractive force area ratio between two magnetic sheets.
Figure 22A:
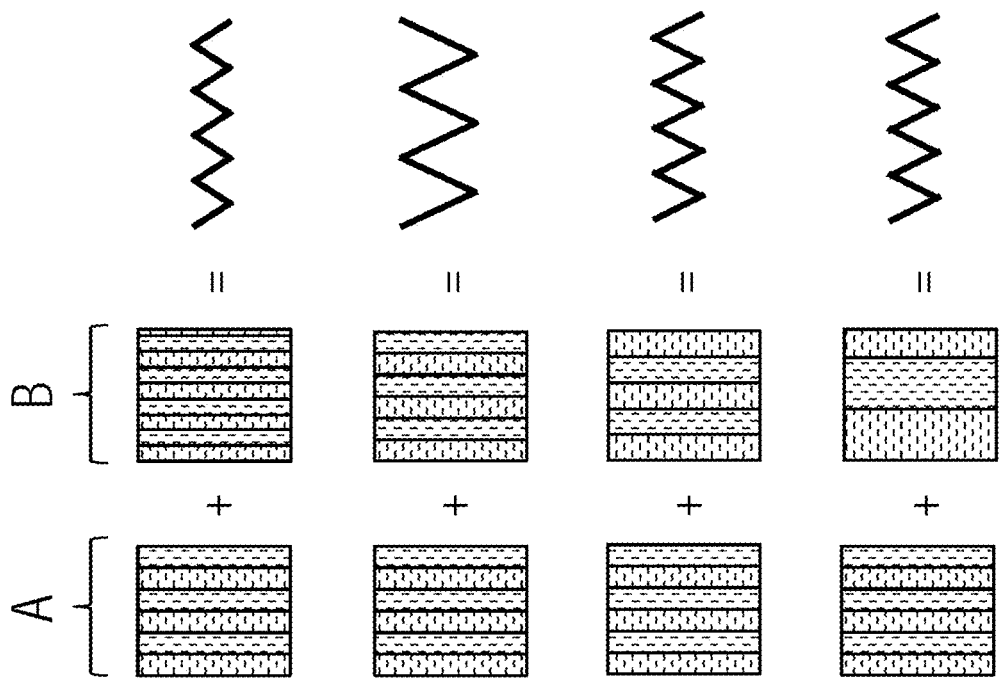

Similar advantageous effects to those of the third embodiment can be obtained also in this configuration. However, as described in the second embodiment, the magnitude of shearing stress perceived by a user, that is, the magnitude of bumpy feeling is smaller if at least any of the base object 310', the contact object 320', and the contact object 330' which are magnetized with checker textures is used instead of at least any of the base object 310, the contact object 320, and the contact object 330. As illustrated in FIG. 22A, in the use of the base object A and the contact object B which are magnetized with stripe textures, the magnitude of bumpy feeling perceived by a user reaches the maximum when the pitches of the textures are the same as each other, and even when the pitches of the textures are not the same as each other, there is a combination by which shearing stress perceived by the user is large to some extent and the user perceives a certain magnitude of bumpy feeling. On the other hand, as illustrated in FIG. 22B, in the use of the base object A and the contact object B which are magnetized with checker textures, the magnitude of bumpy feeling perceived by a user reaches the maximum when the pitches of the textures are the same as each other, and when the pitches of the textures are not the same as each other, shearing stress perceived by the user is small and almost no bumpy feeling is perceived. That is, a region in which bumpy feeling is perceived can be limited in the use of the base object A and the contact object B which are magnetized with checker textures.

Fourth Embodiment

The principles of the second embodiment are applied also in a fourth embodiment. The present embodiment describes a "force sense presenting object" which presents bumpy feeling to a user in information input to an input device, in which the principle of the second embodiment is incorporated, without using any electromagnet.

When the input device is a touch panel, the "force sense presenting object" includes a "first object" which is disposed on an input surface of the touch panel and a "second object" which is worn, gripped, or supported by an "acting subject" performing an input operation with respect to the touch panel. The "first object" includes a "first surface", and the "first surface" is preliminarily magnetized with a "first texture" including S-pole regions and N-pole regions. The "second object" includes a "second surface", and the "second surface" is preliminarily magnetized with a "second texture" including S-pole regions and N-pole regions. The "first object" is a magnetic sheet which is disposed with one plate surface thereof facing an input surface side of the touch panel and the "first surface" is the other plate surface of the magnetic sheet, for example. An "acting subject" who performs an input operation with respect to the touch panel having an input surface on which the "first object" is disposed wears, grips, or supports the "second object" and performs an operation for changing a relative positional relation between the "first surface" and the "second surface" or/and an action for changing the relative positional relation between the first surface and the second surface while keeping the "first surface" and the "second surface" in contact with or close to each other. Thus, the input operation with respect to the touch panel is performed and the "acting subject" perceives bumpy feeling. That is, through such an action performed by an "acting subject", the input operation with respect to the touch panel is performed and shearing stress received by the "acting subject" from the second object periodically varies. Accordingly, the "acting subject" perceives bumpy feeling.

When the input device is an input device such as a computer mouse, a "force sense presenting object" includes a "first object" and a "second object". The "first object" includes a "first surface", and the "first surface" is preliminarily magnetized with a "first texture" including S-pole regions and N-pole regions. The "second object" includes a "second surface", and the "second surface" is preliminarily magnetized with a "second texture" including S-pole regions and N-pole regions. The "second object" is attached or provided to the "input device" gripped by an "acting subject". An acting subject who operates the "input device" to which the "second object" is attached or provided performs an operation for changing a relative positional relation between the "first surface" and the "second surface" or/and an action for changing the relative positional relation between the "first surface" and the "second surface" while keeping the "first surface" and the "second surface" in contact with or close to each other. Thus, the input operation with respect to the "input device" is performed and the "acting subject" perceives bumpy feeling. That is, through such an action performed by an "acting subject", the input operation with respect to the input device is performed and shearing stress received by the acting subject from the input device periodically varies. Accordingly, the acting subject perceives bumpy feeling.

Specific examples of the present embodiment are described below with reference to the accompanying drawings.

<Case where Input Device is Touch Panel>

Figure 23:
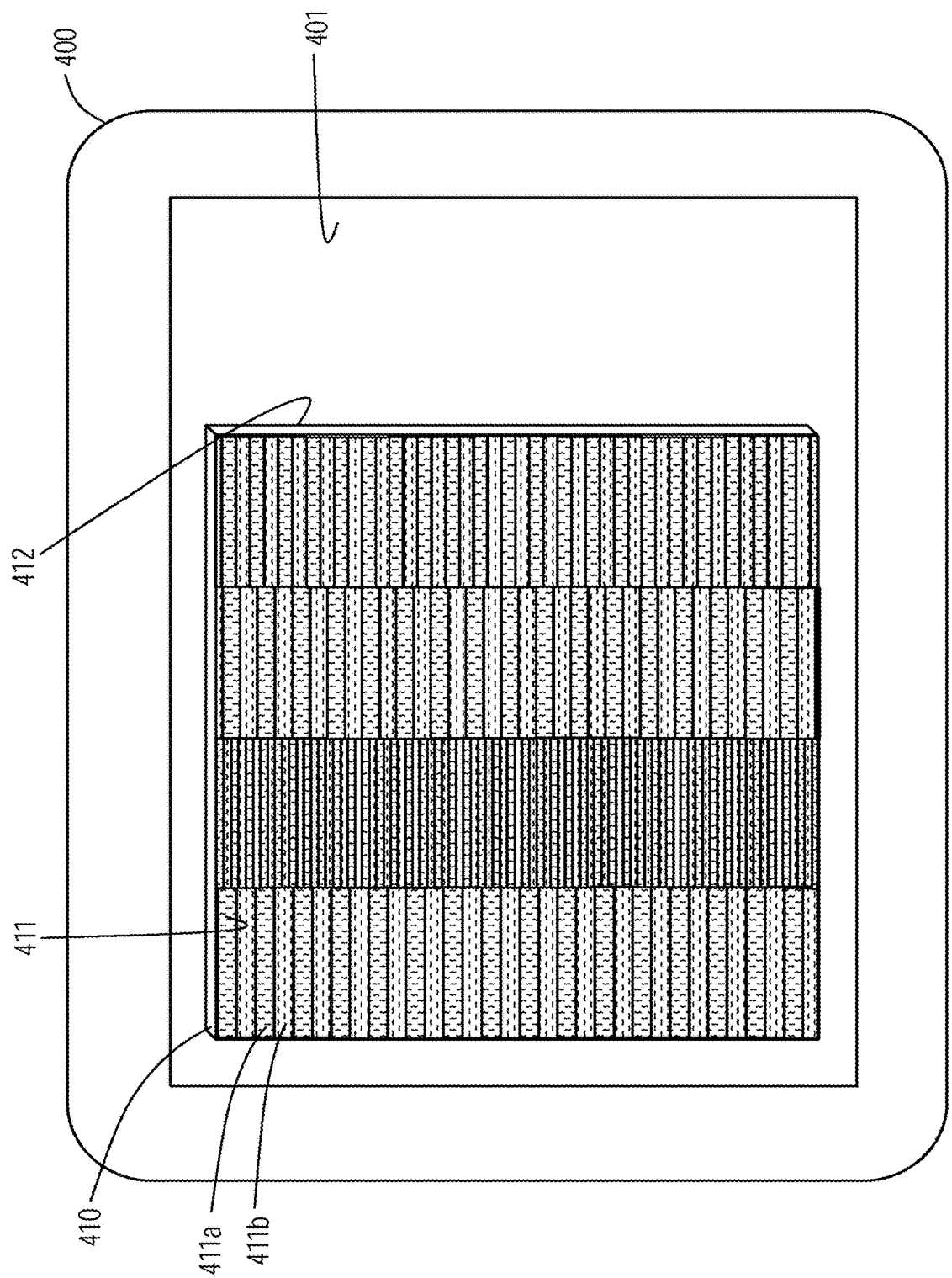
FIG. 23 is a diagram illustrating an input device according to an embodiment.

FIG. 23 and FIG. 24 illustrate an example in which the principle of the second embodiment is incorporated into a touch panel.

As illustrated in FIG. 23, a magnetic sheet 410 which is the "first object" is attached to an input surface (front surface) of a touch panel 401 of an electronic apparatus 400 such as a smartphone and a tablet device. One plate surface 412 of the magnetic sheet 410 is disposed to face an input surface side of the touch panel 401 and the other plate surface 411 (first surface) of the magnetic sheet 410 is preliminarily magnetized with a texture (first texture) including S-pole regions 411a and N-pole regions 411b. Here, the "first texture" may include a plurality of regions whose pitches and patterns (a stripe texture and a checker texture, for example) are mutually different.

A "second object" illustrated in FIG. 24A is a glove 420 which is worn, gripped, or supported by a user and front surfaces 421 (second surface) on pads of fingers of the user are preliminarily magnetized with a texture (second texture) including S-pole regions 421a and N-pole regions 421b. Here, the second texture may include a plurality of regions whose pitches and patterns (a stripe texture and a checker texture, for example) are mutually different. Respective fingers are magnetized with textures whose pitches and patterns are different from each other in FIG. 24A.

A user wears, grips, or supports the glove 420 and rubs the magnetic sheet 410 disposed on the input surface of the touch panel 401 of the electronic apparatus 400 by the texture part including the S-pole regions 421a and the N-pole regions 421b. Accordingly, an operation for changing a relative positional relation between the plate surface 411 (first surface) of the magnetic sheet 410 and the front surface 421 (second surface) on balls of fingers of the glove 420 or/and an action for changing the relative positional relation between the plate surface 411 (first surface) and the front surface 421 (second surface) is/are performed while keeping the plate surface 411 (first surface) and the front surface 421 (second surface) in contact with or close to each other. Thus, the input operation with respect to the touch panel is performed and a user perceives bumpy feeling. An image (a video, a moving image, and a picture image, for example) may be displayed from the touch panel 401 (output device) or sound may be outputted from a speaker (output device) of the electronic apparatus 400 in response to this input operation. Thus, force sense can be presented and presented contents of an image and/or sound can be changed in response to an input operation. In the glove 420 illustrated in FIG. 24A, respective fingers are magnetized with textures whose pitches and patterns are mutually different, realizing perception of different bumpy feeling depending on a finger operating the touch panel 401. Further, when a plurality of regions whose pitches and patterns are mutually different are provided on the plate surface 411 (first surface) of the magnetic sheet 410, a user can be allowed to perceive different bumpy feeling depending on a finger used for operation and a region operated.

A stylus pen 430 illustrated in FIG. 24B and FIG. 24C may be used as the "second object". The stylus pen 430 includes a gripping part 435 having a substantially columnar shape and an end part 436 having a substantially discoid shape. One end of the gripping part 435 is fixed or integrated around the center of one surface 432 of the end part 436. The other surface 431 (second surface) of the end part 436 is preliminarily magnetized with a texture (second texture) including S-pole regions 531a and N-pole regions 531b. A user grips or supports the gripping part 435 of the stylus pen 430 and rubs the magnetic sheet 410 disposed on the input surface of the touch panel 401 of the electronic apparatus 400 on the surface 431 side of the end part 436. Accordingly, an operation for changing a relative positional relation between the plate surface 411 (first surface) of the magnetic sheet 410 and the surface 431 (second surface) of the end part 436 or/and an action for changing the relative positional relation between the plate surface 411 (first surface) and the surface 431 (second surface) is/are performed while keeping the plate surface 411 (first surface) and the surface 431 (second surface) in contact with or close to each other. Thus, the input operation with respect to the touch panel 401 is performed and a user perceives bumpy feeling. An image may be displayed from the touch panel 401 (output device) or sound may be outputted from the speaker (output device) of the electronic apparatus 400 in response to this input operation. Accordingly, force sense can be presented and presented contents of an image and/or sound can be changed in response to an input operation.

Figure 25:
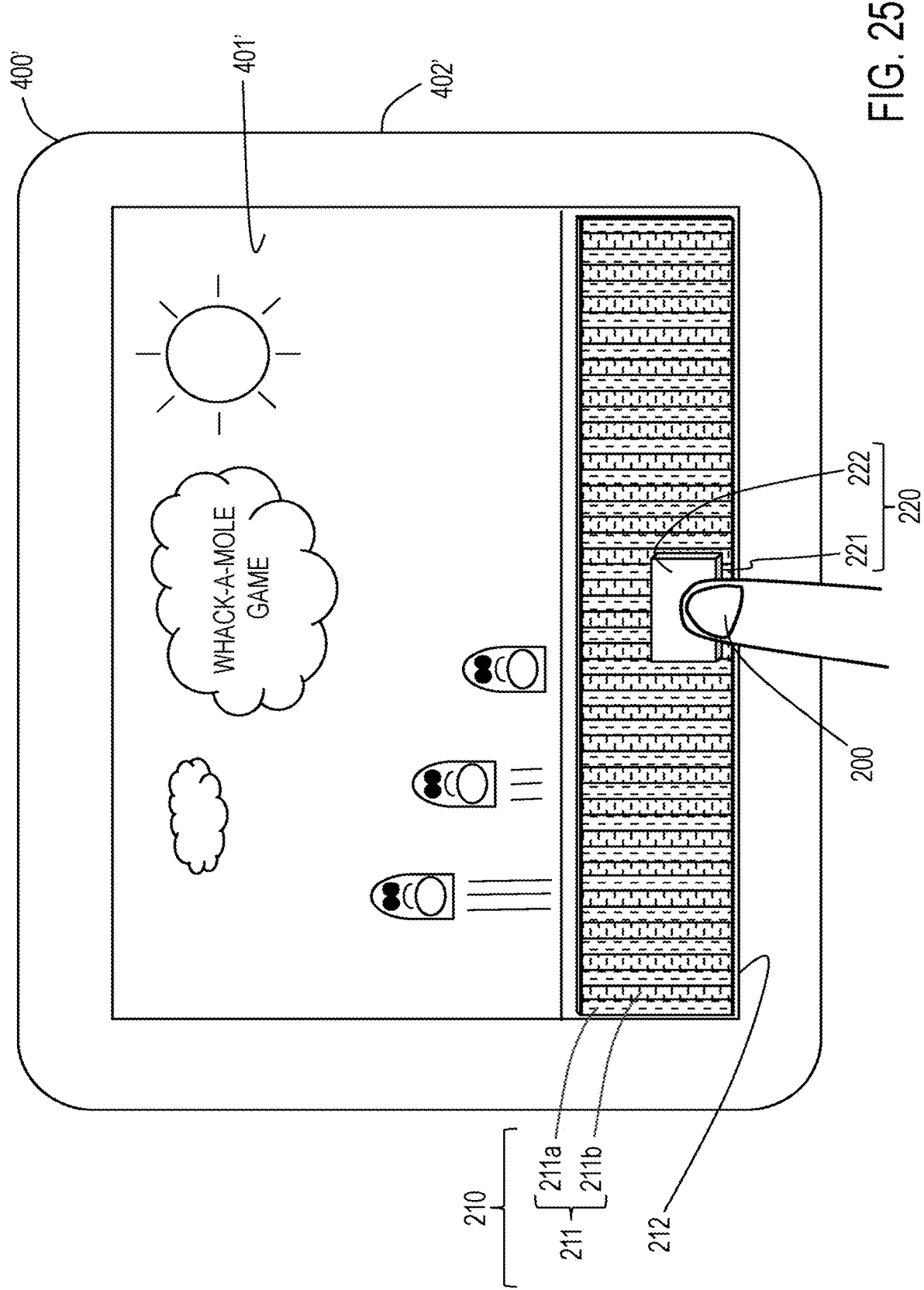
FIG. 25 is a diagram illustrating an input device according to the embodiment.

FIG. 25 illustrates an example in which force sense is presented and game contents are presented in response to an input operation. As illustrated in FIG. 25, the magnetic sheet 210 illustrated in the second embodiment is attached to a lower part of an input surface (front surface) of a touch panel 401' of an electronic apparatus 400' such as a smartphone and a tablet device. One plate surface 212 of the magnetic sheet 210 is disposed to face an input surface side of the touch panel 401' and the other plate surface 211 (first surface) of the magnetic sheet 210 is preliminarily magnetized with a texture (first texture) including S-pole regions 211a and N-pole regions 211b. The magnetic sheet 220 illustrated in the second embodiment is disposed on the plate surface 211 of the magnetic sheet 210. One surface 221 (second surface) of the magnetic sheet 220 is magnetized with a texture (second texture) including S-pole regions 221a and N-pole regions 221b and the magnetic sheet 220 is disposed so that the surface 221 faces the plate surface 211. A user touches the other surface 222 of the magnetic sheet 220 layered on the magnetic sheet 210 with a finger 200 and performs an operation for changing a relative positional relation between the surface 211 and the surface 221 while keeping the surface 211 and the surface 221 in contact with or close to (nearly in contact with) each other. Thus, the input operation with respect to the touch panel 401' is performed and the user perceives bumpy feeling. Presented contents of game contents on the touch panel 401' (output device) are changed and sound outputted from a speaker 402' (output device) of the electronic apparatus 400' is changed in response to this input operation.

<Case where Input Device is Computer Mouse and so On>

Figure 26C:
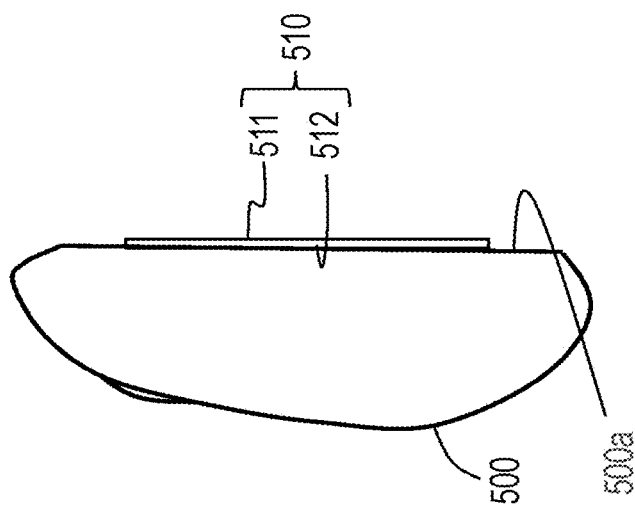
FIG. 26A to FIG. 26C are diagrams illustrating an input device according to the embodiment.
Figure 26B:
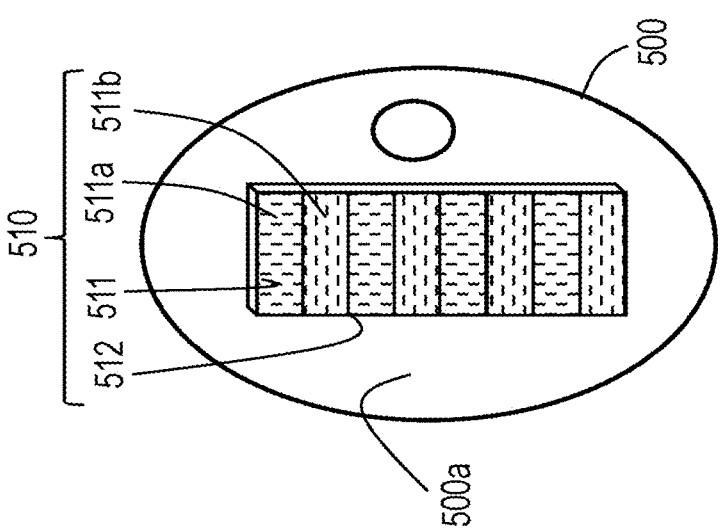
Figure 26A:
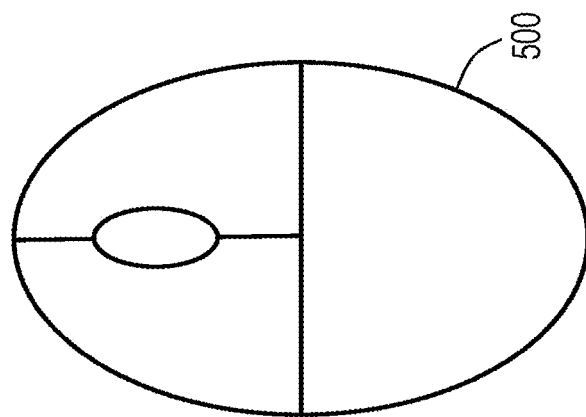

FIG. 26A to FIG. 26C illustrate an example in which the principle of the second embodiment is incorporated into a computer mouse 500. A magnetic sheet 510 which is the "second object" is fixed on a bottom surface 500a of the computer mouse 500. One surface 511 (second surface) of the magnetic sheet 510 is preliminarily magnetized with a "second texture" including S-pole regions 511a and N-pole regions 511b. The "second texture" is a stripe texture and a checker texture, for example. The other surface 512 of the magnetic sheet 510 is fixed on the bottom surface 500a of the computer mouse 500.

The magnetic sheets 210, 230, 250, 210', 230', and 250', and the base objects 310 and 310', for example, can be used as the "first object". When the magnetic sheet 210 is used as the "first object", for example, a user (acting subject) disposes the magnetic sheet 210 so that the surface 211 (first surface) faces outside and grips the computer mouse 500 so that the surface 511 (second surface) of the magnetic sheet 510 fixed to the computer mouse 500 is brought into contact with the surface 211. The user slides the computer mouse 500 along the surface 211 (first surface) of the magnetic sheet 210 so as to change a relative positional relation between the surface 211 (first surface) and the surface 511 (second surface) while keeping the surface 211 (first surface) and the surface 511 (second surface) in contact with or close to each other. Thus, the input operation with respect to the computer mouse 500 is performed and the user perceives bumpy feeling. An image may be displayed from a display (output device), which is not shown, a video may be projected from a projector (output device), or sound may be outputted from a speaker (output device) in response to this input operation. Accordingly, force sense can be presented and presented contents of an image and/or sound can be changed in response to an input operation.

Characteristics of Present Embodiment

In the present embodiment, a user performing information input can be allowed to perceive bumpy feeling when he/she performs the information input into an input device.

Fifth Embodiment

The principles of the second embodiment are applied in a fifth embodiment as well. In the fifth embodiment, a first object is fixed on a walking surface and bumpy feeling is presented when an acting subject wearing or gripping a second object moves, providing tactile information similar to a braille paving tile to a pedestrian. The "first object" of the present embodiment can be fixed on a walking surface in a state that a "first surface" faces upward and the "second object" is a member that can be worn or gripped by an "acting subject" in a state that a "second surface" faces outside. Here, the "first object" includes the "first surface", and the "first surface" is magnetized with a "first texture" including S-pole regions and N-pole regions; and the "second object" includes the "second surface", and the "second surface" is magnetized with a "second texture" including S-pole regions and N-pole regions, as described above. The "acting subject" wearing or gripping the "second object" walks on the "first surface" of the "first object" fixed on a walking surface while keeping the "first surface" and the "second surface" in contact with or close to each other and thus changes a relative positional relation between the "first surface" and the "second surface", perceiving bumpiness.

A specific example of the present embodiment is described below with reference to the accompanying drawings.

Figure 27:
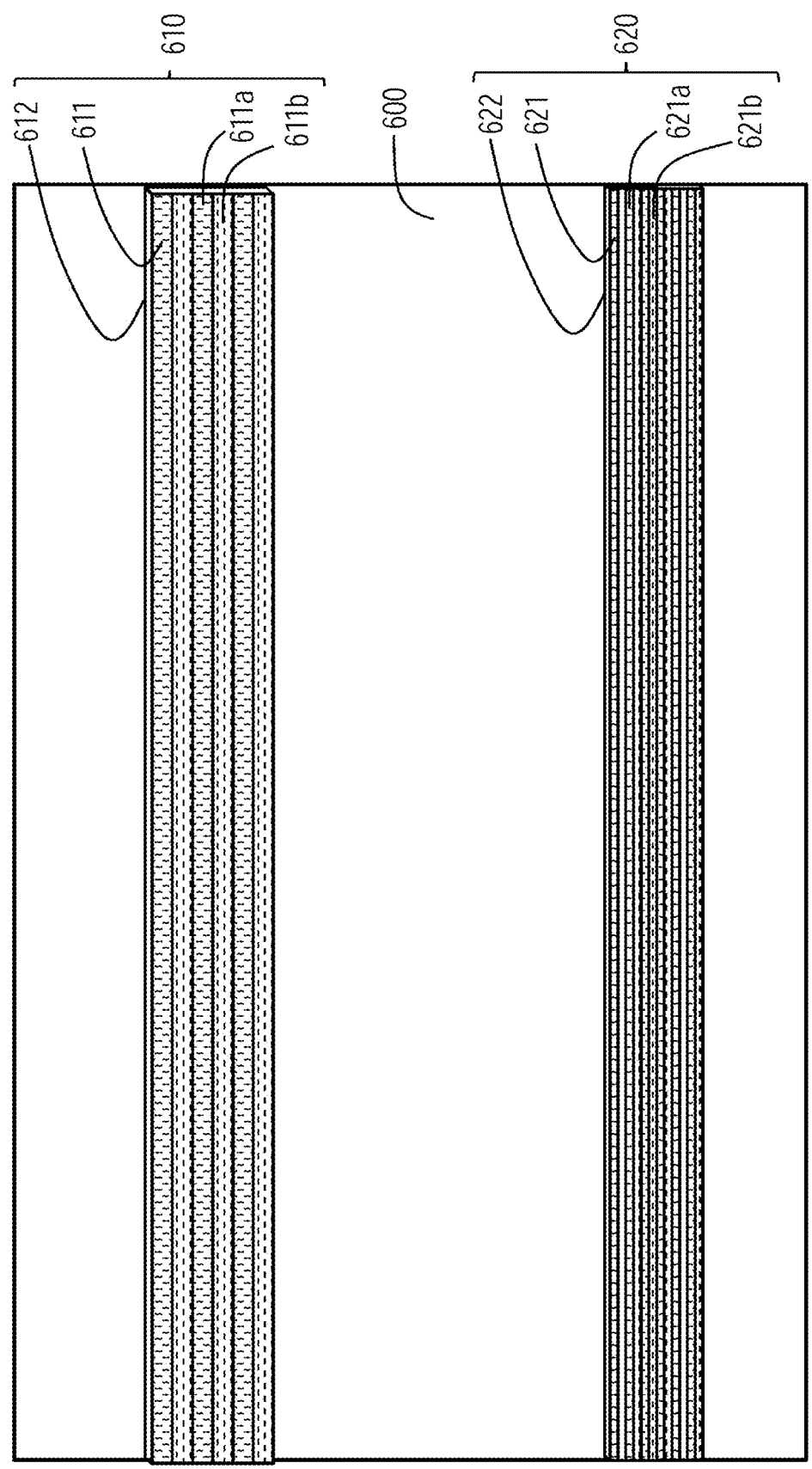
FIG. 27 is a diagram illustrating a magnetic braille paving tile according to an embodiment.

FIG. 27 illustrates magnetic sheets 610 and 620 which are the "first object" according to the present embodiment. One surface 611 (first surface) of the magnetic sheet 610 is magnetized with a texture (first texture) including S-pole regions 611a and N-pole regions 611b. The surface 611 (first surface) of the magnetic sheet 610 faces upward and the other surface 612 of the magnetic sheet 610 is fixed on a floor 600 (walking surface). In a similar manner, one surface 621 (first surface) of the magnetic sheet 620 is magnetized with a texture (first texture) including S-pole regions 621a and N-pole regions 621b. The surface 621 (first surface) of the magnetic sheet 620 faces upward and the other surface 622 of the magnetic sheet 620 is fixed on the floor 600 (walking surface). Though the surfaces 611 and 621 are magnetized with stripe textures in FIG. 27, the surfaces 611 and 621 may be magnetized with checker textures.

Figure 28B:
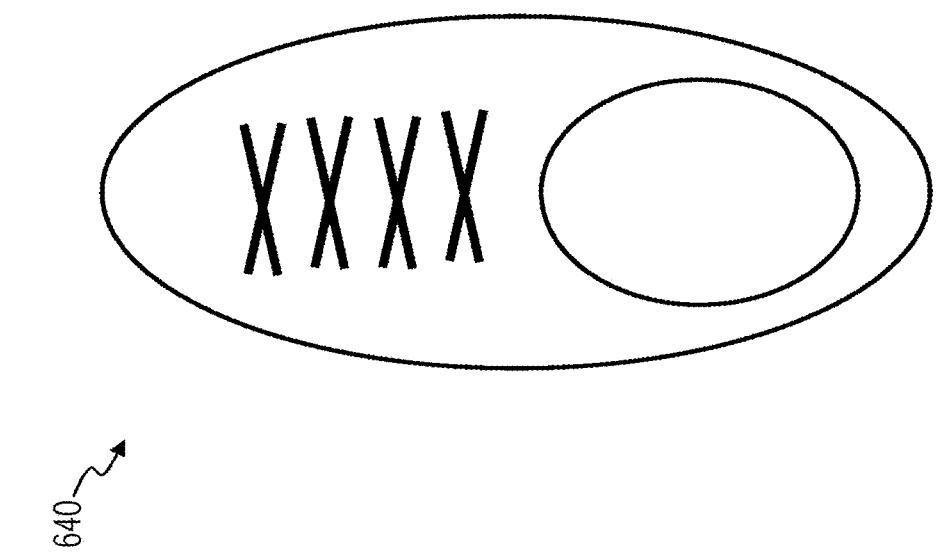
FIG. 28A and FIG. 28B are diagrams illustrating a shoe for magnetic braille paving tiles according to the embodiment.
Figure 28A:
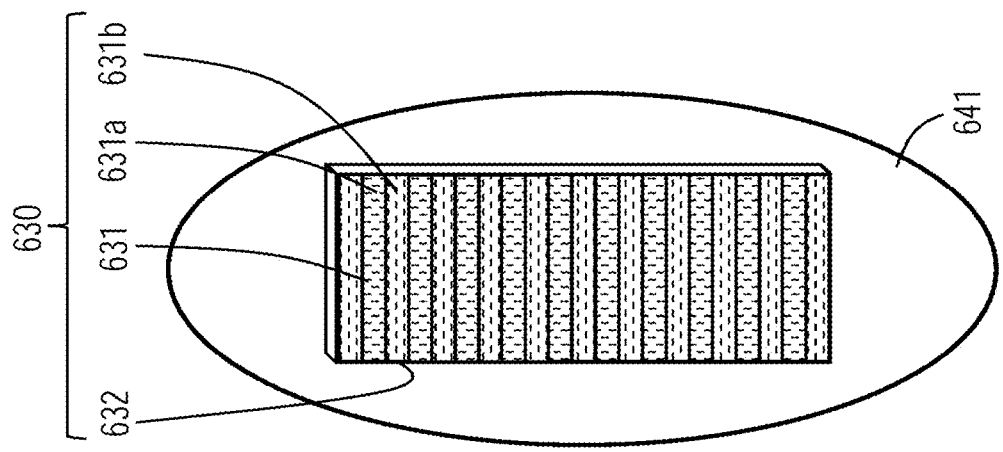

FIG. 28A and FIG. 28B illustrate a shoe 640 which is the "second object" of the present embodiment. One surface 632 of a magnetic sheet 630 is fixed on a shoe sole 641 (second surface) of the shoe 640. The other surface 631 of the magnetic sheet 630 is magnetized with a texture (second texture) including S-pole regions 631a and N-pole regions 631b. Needless to say, a pedestrian (acting subject) can wear the shoe 640 in a state that the shoe sole 641 faces outside.

A pedestrian wearing the shoe 640 walks on the surface 611 or 621 (first surface) of the magnetic sheet 610 or 620 fixed on the floor 600 (walking surface) while keeping the surface 611 or 621 (first surface) of the magnetic sheet 610 or 620 and the shoe sole 641 (second surface) in contact with or close to each other and thus changes a relative positional relation between the surface 611 or 621 (first surface) and the shoe sole 641 (second surface), perceiving bumpiness.

Figure 29B:
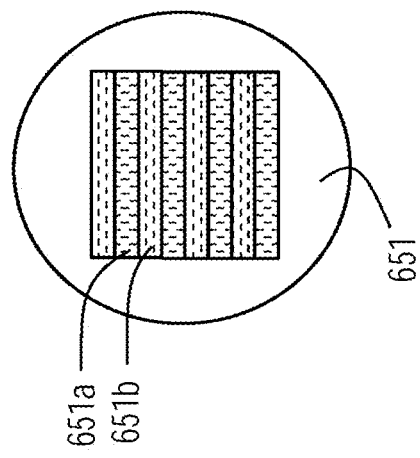
FIG. 29A and FIG. 29B are diagrams illustrating a white cane for magnetic braille paving tiles according to the embodiment.
Figure 29A:
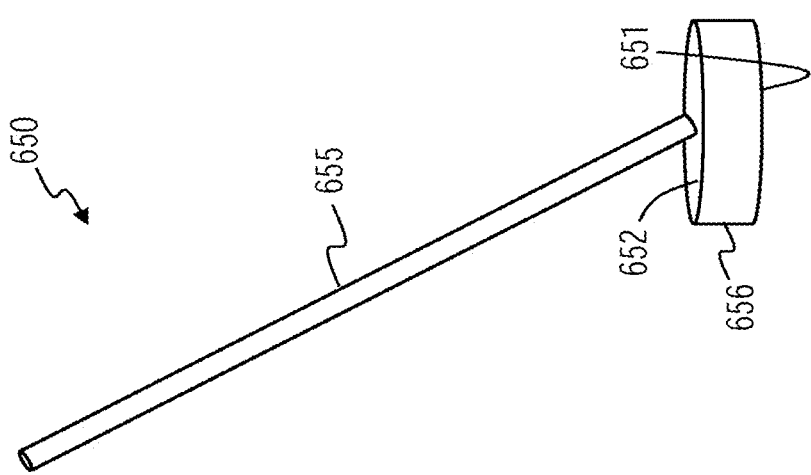

FIG. 29A and FIG. 29B illustrate a white cane 650 which is another example of the "second object". The white cane 650 includes a gripping part 655 having a substantially columnar shape and an end part 656 having a substantially discoid shape. One end of the gripping part 655 is fixed or integrated around the center of one surface 652 of the end part 656. The other surface 651 (second surface) of the end part 656 is preliminarily magnetized with a texture (second texture) including S-pole regions 651a and N-pole regions 651b. A pedestrian gripping the white cane 650 walks on the surface 611 or 621 (first surface) of the magnetic sheet 610 or 620 fixed on the floor 600 (walking surface) while keeping the surface 611 or 621 (first surface) of the magnetic sheet 610 or 620 and the surface 651 (second surface) of the end part 656 of the white cane 650 in contact with or close to each other and thus changes a relative positional relation between the surface 611 or 621 (first surface) and the surface 651 (second surface), perceiving bumpiness.

Characteristics of Present Embodiment

In the present embodiment, a pedestrian can be allowed to perceive bumpy feeling without providing physical bumpiness on the floor 600. Physical bumpiness does not have to be provided on the floor 600, providing an advantage that dirt and dust are hardly collected on the floor 600. Further, the way of change in shearing stress received from the shoe sole 641 or the surface 651 by a pedestrian (acting subject) is varied depending on the direction in which the relative positional relation between the surface 611 or 621 (first surface) and the shoe sole 641 or the surface 651 (second surface) is changed by using a stripe texture or the like, thus being able to providing different bumpy feeling. Accordingly, different bumpy feeling can be presented depending on a heading direction of a pedestrian.

Sixth Embodiment

The principles of the second embodiment are applied also in a sixth embodiment. In the present embodiment as well, the principles of the second embodiment are applied to an input interface of a touch panel and bumpy feeling is presented to a user in information input to the touch panel without using any electromagnets, as is the case with the fourth embodiment. Especially, different operation feeling is presented to a user by changing a combination between a "first object" which is disposed on an input surface of a touch panel and a "second object" which is worn, gripped, or supported by the user, in the present embodiment.

A "force sense presenting object" according to the present embodiment includes a "first object" which is disposed on an input surface of a touch panel and a plurality of pieces of "second objects" which are worn, gripped, or supported by an "acting subject" performing an input operation with respect to the touch panel. The "first object" includes a "first surface", and the "first surface" is preliminarily magnetized with a "first texture" including S-pole regions and N-pole regions. The "second object" includes a "second surface", and the "second surface" is preliminarily magnetized with a "second texture" including S-pole regions and N-pole regions. Here, a magnetization pattern of the "second texture" varies depending on a "second object". That is, magnetization patterns of the "second textures" are mutually different among a plurality of pieces of "second objects".

An "acting subject" wears, grips, or supports a "selected object", which is selected from a plurality of pieces of "second objects", and performs an operation for changing a relative positional relation between the "first surface" of the "first object" and the "second surface" of the "selected object" and/or an action for changing the relative positional relation between the "first surface" and the "second surface" of the "selected object" while keeping the "first surface" of the "first object" disposed on an input surface and the "second surface" of the "selected object" in contact with or close to each other. The input operation with respect to the touch panel is thus performed and shearing stress received by the "acting subject" from the "selected object" periodically varies. Accordingly, the "acting subject" perceives bumpy feeling. A maximum value of this shearing stress and/or a period of the shearing stress and bumpy feeling vary/varies depending on a "selected object".

Specific examples of the present embodiment are described below with reference to the accompanying drawings.

<Slider Type>

FIG. 30A and FIG. 30B illustrate a slider-type "force sense presenting object" according to the present embodiment. The slider-type "force sense presenting object" is an input interface for operating, for example, a volume of sound outputted from a speaker by a slide operation and is an input interface used in an operation performed when a user sets a parameter value, which can be freely set within a range between predetermined minimum value and maximum value, to a desired value, for example.

The "force sense presenting object" according to the present embodiment includes one piece of magnetic sheet 710 (first object) and $M_2$ pieces of magnetic sheets 720-$m_2$ (second objects). Here, $m_2=1, \ldots, M_2$ holds and $M_2$ is an integer which is 2 or greater. The present embodiment illustrates an example of $M_2=3$.

One surface 711 (first surface) of the magnetic sheet 710 is magnetized with a texture (first texture) including S-pole regions 711a and N-pole regions 711b. The belt-like regions 711a magnetized to the S pole and the belt-like regions 711b magnetized to the N pole are periodically arranged in an alternate manner on the surface 711 of the present embodiment. In the example of FIG. 30A, the belt-like regions 711a and 711b which extend in the direction D1 are alternately repeatedly arranged in the direction XA which is substantially orthogonal to the direction D1. Each of the widths in the short side direction (direction XA) of the regions 711a and the widths in the short side direction of the regions 711b is 6 mm in this example.

One surfaces 721-$m_2$ (second surfaces) of a plurality of pieces of magnetic sheets 720-$m_2$ are each magnetized with textures (second textures) including S-pole regions 721a-$m_2$ and N-pole regions 721b-$m_2$. The belt-like regions 721a-$m_2$ magnetized to the S pole and the belt-like regions 721b-$m_2$ magnetized to the N pole are periodically arranged in an alternate manner on the surface 721-$m_2$ of the present embodiment. In the example of FIG. 30B, the belt-like regions 721a-$m_2$ and 721b-$m_2$ which extend in the direction D2 are alternately repeatedly arranged in the direction XB which is substantially orthogonal to the direction D2. Here, magnetization patterns of the magnetic sheets 720-1, . . . , $M_2$ are different from each other. Each of the widths in the short side direction (direction XB) of the regions 721a-1 and the widths in the short side direction of the regions 721b-1 is 3 mm, each of the widths in the short side direction of the regions 721a-2 and the widths in the short side direction of the regions 721b-2 is 2 mm, and each of the widths in the short side direction of the regions 721a-3 and the widths in the short side direction of the regions 721b-3 is 6 mm, in this example.

Figure 32:
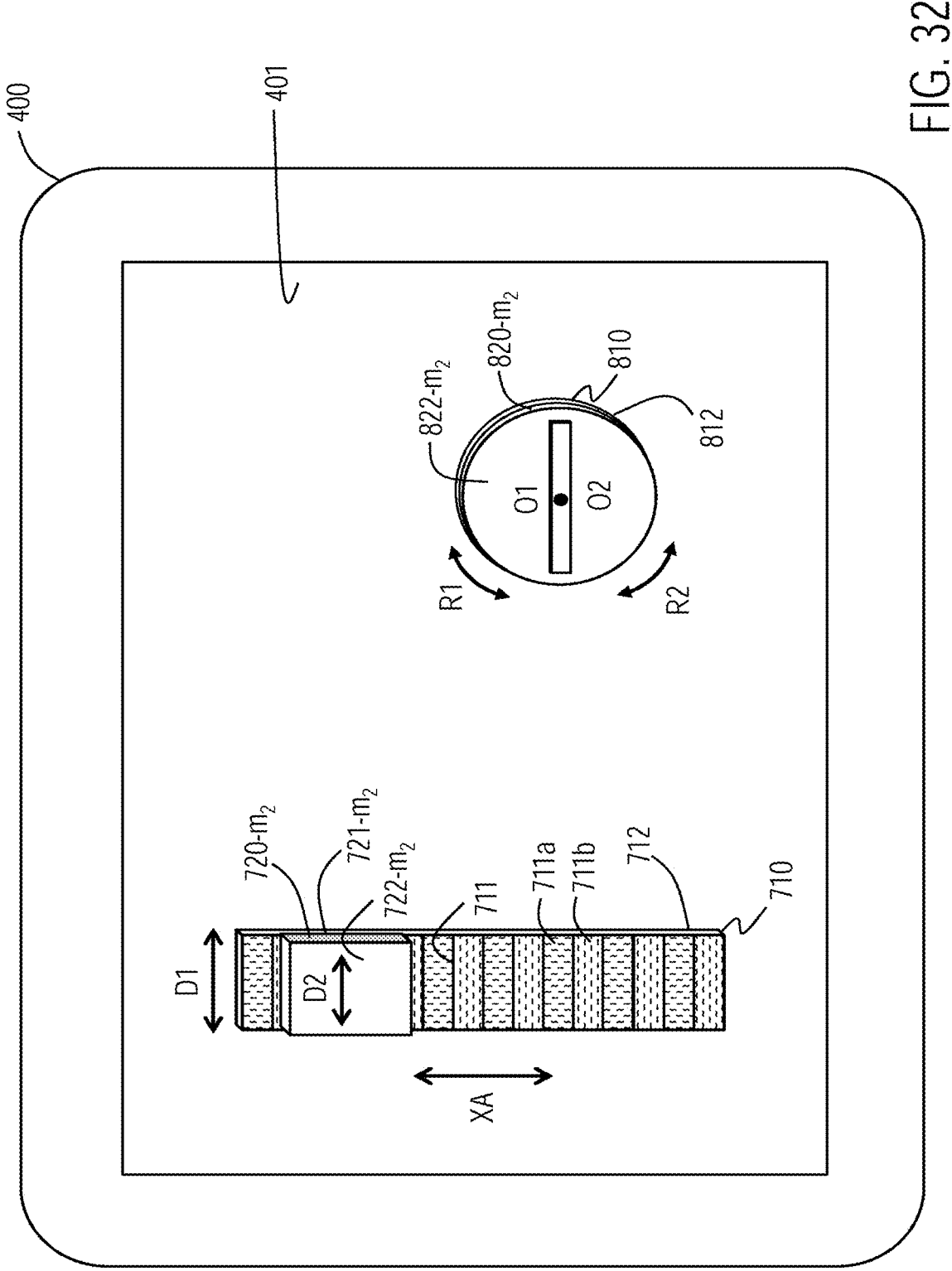
FIG. 32 is a diagram illustrating an input device according to an embodiment.

As illustrated in FIG. 32, the magnetic sheet 710 which is the "first object" is attached to the input surface of the touch panel 401 of the electronic apparatus 400. Here, the other surface 712 (opposite surface of the surface 711) of the magnetic sheet 710 is positioned so as to face the input surface side of the touch panel 401. When a certain position on the touch panel 401 of the electronic apparatus 400 is determined as a region which is to receive a slide input operation (input through a slide operation) (when determined by software or the like mounted on the electronic apparatus 400), for example, the electronic apparatus 400 displays the region on the touch panel 401, for example, so that a user positions the surface 712 of the magnetic sheet 710 on the region. Alternatively, the electronic apparatus 400 may detect a region on the touch panel 401 on which the magnetic sheet 710 is attached and receive a slide input operation on the detected region. In this case, the surface 712 of the magnetic sheet 710 may be positioned on an arbitrary region on the touch panel 401 which can receive a slide input operation. Also, a user may be able to specify a region on the touch panel 401 which is to receive a slide input operation (through an input, by the user, for specifying this region on the touch panel 401, for example). In this case, the electronic apparatus 400 is configured to detect a specified region on the touch panel 401 and the surface 712 of the magnetic sheet 710 is positioned on the specified region inputted by the user. The user selects any magnetic sheet 720-$m_2$ and disposes the magnetic sheet 720-$m_2$ so that a surface 722-$m_2$ of the selected magnetic sheet 720-$m_2$ (selected object) faces outward and the surface 721-$m_2$ of the magnetic sheet 720-$m_2$ is in contact with the surface 711 of the magnetic sheet 710. Here, the magnetic sheet 720-$m_2$ is layered on the magnetic sheet 710 in a direction in which the longitudinal direction D1 of the regions 711a and 711b of the magnetic sheet 710 follows the longitudinal direction D2 of the regions 721a-$m_2$ and 721b-$m_2$ of the magnetic sheet 720-$m_2$.

A user touches the surface 722-$m_2$ of the magnetic sheet 720-$m_2$, which is layered on the magnetic sheet 710, with the finger and performs an operation for changing a relative positional relation between the surface 711 and the surface 721-$m_2$ while keeping the surface 711 and the surface 721-$m_2$ in contact with or close to each other. In the example of FIG. 32, the relative positional relation between the surface 711 and the surface 721-$m_2$ is changed (slid) in the XA direction which is the short side direction of the regions 711a and 711b of the magnetic sheet 720-$m_2$. Accordingly, the input operation (slide input operation) with respect to the touch panel 401 is performed and shearing stress in the XA direction received by the user from the magnetic sheet 720-$m_2$ periodically varies. As a result, the user perceives bumpy feeling in a direction substantially orthogonal to the surface 721-$m_2$. The magnetization patterns of the regions 721a-$m_2$ and 721b-$m_2$ vary depending on a magnetic sheet 720-$m_2$, as described above. Accordingly, the maximum value of shearing stress received by a user from the magnetic sheet 720-$m_2$ and/or a period of the shearing stress vary/varies depending on a combination between the magnetic sheet 710 and a selected magnetic sheet 720-$m_2$ and bumpy feeling perceived by the user also varies depending on the combination. That is, a user perceives different bumpy feeling depending on a selected magnetic sheet 720-$m_2$ even in a use of the same magnetic sheet 710. In other words, a user can perceive different tactile senses only by changing magnetic sheets 720-$m_2$. As illustrated in FIG. 30C, for example, in a certain slide input operation with respect to the touch panel 401, a user can smoothly perform the slide input operation without perceiving bumpy feeling, that is, without perceiving any click feeling when selecting the magnetic sheet 720-1; the user can perform the same slide input operation while perceiving small-interval bumpy feeling (W-step bumpy feeling (W is a positive integer), for example), that is, while perceiving W-step click feeling when selecting the magnetic sheet 720-2; and the user can perform the same slide input operation while perceiving wide-interval bumpy feeling (W'-step bumpy feeling (W' is the maximum integer which is W/2 or smaller), for example), that is, while perceiving W'-step click feeling when selecting the magnetic sheet 720-3.

<Dial Type>

FIG. 31A and FIG. 31B illustrate a dial-type "force sense presenting object" according to the present embodiment. The dial-type "force sense presenting object" is an input interface for operating, for example, a volume by a rotation operation and is an input interface used in an operation performed when a user sets a parameter value, which can be freely set, to a desired value, for example.

The "force sense presenting object" according to the present embodiment includes one piece of magnetic sheet 810 (first object) and $M_2$ pieces of magnetic sheets 820 (second objects). Here, $m_2$=1, ... , $M_2$ holds and $M_2$ is an integer which is 2 or greater. The present embodiment illustrates an example of $M_2$=3.

The magnetic sheet 810 has a substantially discoid shape. One surface 811 (first surface) of the magnetic sheet 810 is magnetized with a texture (first texture) including S-pole regions 811a and N-pole regions 811b. The regions 811a magnetized to the S pole and the regions 811b magnetized to the N pole are periodically arranged in an alternate manner on the surface 811 of the present embodiment. In the example of FIG. 31A, the region 811a and the region 811b are repeatedly arranged along the axial direction R1 around the central axis (axis substantially orthogonal to the surface 811) O1 of the magnetic sheet 810. The length of an arc corresponding to each region 811a and the length of an arc corresponding to each region 811b in the circumference of the magnetic sheet 810 are both 6 mm, for example. The S-pole regions 811a and the N-pole regions 811b provided on the surface 811 are preferably fan-shaped regions respectively centered around the central axis O1. However, when all the regions 811b are first magnetized to the N pole with a columnar magnet having a predetermined diameter (2 mm, for example) and all the regions 811a are subsequently magnetized to the S pole with the magnet whose magnetic pole is inverted, a texture as the one illustrated in FIG. 31A is formed. Nevertheless, desired bumpy feeling is sufficiently well presented even though the S-pole regions 811a which do not have a complete fan shape and the N-pole regions 811b are provided as illustrated in FIG. 31A.

The magnetic sheet 820-$m_2$ also has a substantially discoid shape. The diameter of the magnetic sheet 820-$m_2$ is substantially the same as the diameter of the magnetic sheet 810, for example. One surfaces 821-$m_2$ (second surfaces) of a plurality of pieces of magnetic sheets 820-$m_2$ are each magnetized with textures (second textures) including S-pole regions 821a-$m_2$ and N-pole regions 821b-$m_2$. The regions 821a-$m_2$ magnetized to the S pole and the regions 821b-$m_2$ magnetized to the N pole are periodically arranged in an alternate manner on the surface 821-$m_2$ of the present embodiment. In the example of FIG. 31B, the region 821a-$m_2$ and the region 821b-$m_2$ are repeatedly arranged along the axial direction R2 around the central axis (axis substantially orthogonal to the surface 821-$m_2$) O2 of the magnetic sheet 820-$m_2$. Here, magnetization patterns of the magnetic sheets 820-1, ... , $M_2$ are different from each other. The length of an arc corresponding to each region 821a-1 and the length of an arc corresponding to each region 821b-1 in the circumference of the magnetic sheet 820-1 are both 3 mm, for example. The length of an arc corresponding to each region 821a-2 and the length of an arc corresponding to each region 821b-2 in the circumference of the magnetic sheet 820-2 are both 2 mm. The length of an arc corresponding to each region 821a-3 and the length of an arc corresponding to each region 821b-3 in the circumference of the magnetic sheet 820-3 are both 6 mm. The S-pole regions 821a-$m_2$ and the N-pole regions 821b-$m_2$ provided on the surface 821-$m_2$ are also preferably fan-shaped regions respectively centered around the central axis O2. However, when all the regions 821b-$m_2$ are first magnetized to the N pole with a columnar magnet having a predetermined diameter (2 mm, for example) and all the regions 821a-$m_2$ are subsequently magnetized to the S pole with the magnet whose magnetic pole is inverted, a texture as the one illustrated in FIG. 31B is formed. Nevertheless, desired bumpy feeling is sufficiently well presented even though the S-pole regions 821a-$m_2$ which do not have a complete fan shape or the N-pole regions 821b-$m_2$ are provided as illustrated FIG. 31B.

As illustrated in FIG. 32, the magnetic sheet 810 which is the "first object" is attached to the input surface of the touch panel 401 of the electronic apparatus 400. Here, the other surface 812 (opposite surface of the surface 811) of the magnetic sheet 810 is positioned so as to face the input surface side of the touch panel 401. When a certain position on the touch panel 401 of the electronic apparatus 400 is determined as a region which is to receive a rotation input operation (input through a rotation operation), for example, the electronic apparatus 400 displays the region on the touch panel 401, for example, so that a user positions the surface 812 of the magnetic sheet 810 on the region. Alternatively, the electronic apparatus 400 may detect a region on the touch panel 401 on which the magnetic sheet 810 is attached and receive a rotation input operation on the detected region. In this case, the surface 812 of the magnetic sheet 810 may be positioned on an arbitrary region on the touch panel 401 which can receive a rotation input operation. Also, a user may be able to specify a region on the touch panel 401 which is to receive a rotation input operation. In this case, the electronic apparatus 400 is configured to detect a specified region on the touch panel 401 and the surface 812 of the magnetic sheet 810 is positioned on the specified region inputted by the user. The user selects any magnetic sheet 820-$m_2$ and disposes the magnetic sheet 820-$m_2$ so that a surface 822-$m_2$ of the selected magnetic sheet 820-$m_2$ (selected object) faces outward and the surface 821-$m_2$ of the magnetic sheet 820-$m_2$ is in contact with the surface 811 of the magnetic sheet 810. Here, the magnetic sheet 820-$m_2$ is layered on the magnetic sheet 810 so that the central axis O1 and the central axis O2 are superposed on or close to each other.

A user touches the surface 822-$m_2$ of the magnetic sheet 820-$m_2$, which is layered on the magnetic sheet 810, with the finger and performs an operation for changing a relative positional relation between the surface 811 and the surface 821-$m_2$ while keeping the surface 811 and the surface 821-$m_2$ in contact with or close to each other. In the example of FIG. 32, the relative positional relation between the surface 811 and the surface 821-$m_2$ is changed (rotated) in the axial directions R1 and R2. Accordingly, the input operation (rotation input operation) with respect to the touch panel 401 is performed and shearing stress in the axial directions R1 and R2 received by the user from the magnetic sheet 820-$m_2$ periodically varies. As a result, the user perceives bumpy feeling in a direction substantially orthogonal to the surface 821-$m_2$. The magnetization patterns of the regions 821$a$-$m_2$ and 821$b$-$m_2$ vary depending on a magnetic sheet 820-$m_2$, as described above. Accordingly, the maximum value of shearing stress received by a user from the magnetic sheet 820-$m_2$ and/or a period of the shearing stress vary/varies depending on a combination between the magnetic sheet 810 and a selected magnetic sheet 820-$m_2$ and bumpy feeling perceived by the user also varies depending on the combination. That is, a user perceives different bumpy feeling depending on a selected magnetic sheet 820-$m_2$ even in a use of the same magnetic sheet 810. In other words, a user can perceive different tactile senses only by changing magnetic sheets 820-$m_2$. As illustrated in FIG. 31C, for example, in a certain rotation input operation with respect to the touch panel 401, a user can smoothly perform the rotation input operation without perceiving bumpy feeling, that is, without perceiving any click feeling when selecting the magnetic sheet 820-1; the user can perform the same rotation input operation while perceiving small-interval bumpy feeling (W-step bumpy feeling, for example), that is, while perceiving W-step click feeling when selecting the magnetic sheet 820-2; and the user can perform the same rotation input operation while perceiving wide-interval bumpy feeling (W'-step bumpy feeling, for example), that is, while perceiving W'-step click feeling when selecting the magnetic sheet 820-3.

Characteristics of Present Embodiment

In the present embodiment, a user performing information input can be allowed to perceive bumpy feeling when he/she performs the information input into a touch panel. Further, different bumpy feeling can be presented by changing the "second object" even though the "first object" is not changed. An image may be displayed from the touch panel 401 or sound outputted from the speaker of the electronic apparatus 400 may be changed in response to such an input operation. Also, when stage lights are controlled through input to a touch panel, for example, the use of a "second object" providing click feeling can realize up-tempo presentation because the lights can be discretely controlled in stages. Changing to a "second object" providing no click feeling enables smooth gradation adjustment of the lighting from the up-tempo presentation, thus realizing instant switch to slow presentation.

Modification 1 of Sixth Embodiment

Different operation feeling may be presented to a user not by changing a "second object" but by changing a "first object". A "force sense presenting object" according to Modification 1 includes a plurality of pieces of "first objects" which are disposed on an input surface of a touch panel and a "second object" which is worn, gripped, or supported by an "acting subject" performing an input operation with respect to the touch panel. The "first object" includes a "first surface", and the "first surface" is preliminarily magnetized with a "first texture" including S-pole regions and N-pole regions. Here, a magnetization pattern of the "first texture" varies depending on a "first object". That is, magnetization patterns of the "first textures" are mutually different among a plurality of pieces of "first objects". The "second object" includes a "second surface", and the "second surface" is preliminarily magnetized with a "second texture" including S-pole regions and N-pole regions.

An "acting subject" wears, grips, or supports the "second object" and performs an operation for changing a relative positional relation between a "first surface" of a "selected object" and the "second surface" of the "second object" and/or an action for changing the relative positional relation between the "first surface" of the "selected object" and the "second surface" while keeping the "first surface" of the "selected object" disposed on an input surface and the "second surface" of the "second object" in contact with or close to each other. The "selected object" of Modification 1 is selected from a plurality of pieces of "first objects". The input operation with respect to the touch panel is thus performed and shearing stress received by the "acting subject" from the "selected object" periodically varies. Accordingly, the "acting subject" perceives bumpy feeling. A maximum value of this shearing stress and/or a period of the shearing stress and bumpy feeling vary/varies depending on a "selected object".

Modification 2 of Sixth Embodiment

Both of a "first object" and a "second object" may be selectable. A "force sense presenting object" according to Modification 2 includes a plurality of pieces of "first objects" which are disposed on an input surface of a touch panel and a plurality of pieces of "second objects" which are worn, gripped, or supported by an "acting subject" performing an input operation with respect to the touch panel. The "first object" includes a "first surface", and the "first surface" is preliminarily magnetized with a "first texture" including S-pole regions and N-pole regions. Here, a magnetization pattern of the "first texture" varies depending on a "first object". The "second object" includes a "second surface", and the "second surface" is preliminarily magnetized with a "second texture" including S-pole regions and N-pole regions. Here, a magnetization pattern of the "second texture" varies depending on a "second object".

An "acting subject" wears, grips, or supports a "second selected object" and performs an operation for changing a relative positional relation between a "first surface" of a "first selected object" and a "second surface" of the "second selected object" and/or an action for changing the relative positional relation between the "first surface" of the "first selected object" and the "second surface" of the "second selected object" while keeping the "first surface" of the "first selected object" disposed on an input surface and the "second surface" of the "second selected object" in contact with or close to each other. A "first selected object" is selected from a plurality of pieces of "first objects" and a "second selected object" is selected from a plurality of pieces of "second objects". The input operation with respect to the touch panel is thus performed and shearing stress received by the "acting subject" from the "second selected object" periodically varies. Accordingly, the "acting subject" perceives bumpy feeling. A maximum value of this shearing stress and/or a period of the shearing stress and bumpy feeling vary/varies depending on a combination between a "first selected object" and a "second selected object".

Modification 3 of Sixth Embodiment

If magnetic force sufficiently acts between a magnetic sheet used as the "first object" and a magnetic sheet used as the "second object", the relative positional relation between surfaces (first surface and second surface) of these magnetic sheets may be changed in a state that these two magnetic sheets are not in contact with each other. A magnetic sheet magnetized with a texture which includes periodical nearly-checkered regions magnetized to the S pole and periodical nearly-checkered regions magnetized to the N pole may be used as the "first object" and/or the "second object".

Seventh Embodiment

The principles of the second embodiment are applied also in a seventh embodiment. In the present embodiment as well, the principles of the second embodiment are applied to an input interface of a touch panel and bumpy feeling is presented to a user in information input to the touch panel without using any electromagnets, as is the case with the fourth embodiment. Especially, a pattern of a "first texture" varies depending on a position and different bumpy feeling is presented depending on a position on a "first texture" with/to which a "second surface" of a "second object" is brought into contact or close, in the present embodiment.

A "force sense presenting object" according to the present embodiment includes a "first object" which is disposed on an input surface of a touch panel and a plurality of pieces of "second objects" which are worn, gripped, or supported by an "acting subject" performing an input operation with respect to the touch panel. The "first object" includes a "first surface", and the "first surface" is preliminarily magnetized with a "first texture" including S-pole regions and N-pole regions. The "first texture" includes "first regions" and "second regions" whose magnetization patterns are different from each other. The "first region" and the "second region" are regions different from each other. The "second object" includes a "second surface", and the "second surface" is preliminarily magnetized with a "second texture" including S-pole regions and N-pole regions.

An "acting subject" wears, grips, or supports the "second object" and performs an operation for changing a relative positional relation between the "first surface" and the "second surface" and/or an action for changing the relative positional relation between the "first surface" and the "second surface" while keeping the "first region" or the "second region" of the "first object" disposed on an input surface and the "second surface" in contact with or close to each other. An input operation with respect to a touch panel is thus performed and shearing stress received by the "acting subject" from the "second object" periodically varies. Accordingly, the "acting subject" perceives bumpy feeling. A maximum value of this shearing stress and/or a period of the shearing stress and bumpy feeling vary/varies depending on whether the "first region" or the "second region" is in contact with or close to the "second surface". That is, bumpy feeling perceived by the acting subject by performing the operation for changing the relative positional relation between the "first region" and the "second surface" and/or the action for changing the relative positional relation of the same while keeping the "first region" and the "second surface" in contact with or close to each other is different from bumpy feeling perceived by the acting subject by performing the operation for changing the relative positional relation between the "second region" and the "second surface" and/or the action for changing the relative positional relation of the same while keeping the "second region" and the "second surface" in contact with or close to each other. In other words, a maximum value of shearing stress and/or a period of the shearing stress received by the acting subject by performing the operation for changing the relative positional relation between the "first region" and the "second surface" and/or the action for changing the relative positional relation of the same while keeping the "first region" and the "second surface" in contact with or close to each other is different from a maximum value of shearing stress and/or a period of the shearing stress received by the acting subject by performing the operation for changing the relative positional relation between the "second region" and the "second surface" and/or the action for changing the relative positional relation of the same while keeping the "second region" and the "second surface" in contact with or close to each other. Accordingly, different bumpy feeling can be presented depending on an operation position.

Specific examples of the present embodiment are described below with reference to the accompanying drawings.

<Slider Type>

FIG. 33A to FIG. 33D illustrate a slider-type "force sense presenting object" according to the present embodiment. The "force sense presenting object" according to the present embodiment includes a magnetic sheet 910 (first object) and a magnetic sheet 920 (second object).

One surface 911 (first surface) of the magnetic sheet 910 is magnetized with a texture (first texture) including a region 913-1 (first region) and a region 913-2 (second region) that are different from each other. Belt-like regions 911a-1 magnetized to the S pole and belt-like regions 911b-1 magnetized to the N pole are periodically arranged in an alternate manner on the region 913-1. In this example, the belt-like regions 911a-1 and 911b-1 which extend in the direction D1 are alternately repeatedly arranged in the direction XA which is substantially orthogonal to the direction D1. Belt-like regions 911a-2 magnetized to the S pole and belt-like regions 911b-2 magnetized to the N pole are periodically arranged in an alternate manner on the region 913-2. In this example, the belt-like regions 911a-2 and 911b-2 which extend in the direction D1 are alternately repeatedly arranged in the direction XA which is substantially orthogonal to the direction D1. Here, magnetization patterns are different from each other between the region 913-1 and the region 913-2. In the present embodiment, the widths in the direction XA of the region 911a-1 and the region 911b-1 belonging to the region 913-1 are different from the widths in the direction XA of the region 911a-2 and the region 911b-2 belonging to the region 913-2. The widths in the direction XA of the region 911a-1 and the region 911b-1 are both 3 mm in the example of FIG. 33A. On the other hand, the widths in the direction XA of the region 911a-2 and the region 911b-2 are both 6 mm.

One surface 921 (second surface) of the magnetic sheet 920 is magnetized with a texture (second texture) including S-pole regions 921a and N-pole regions 921b. The belt-like regions 921a magnetized to the S pole and the belt-like regions 921b magnetized to the N pole are periodically arranged in an alternate manner on the surface 921. In the example, the belt-like regions 921a and 921b which extend in the direction D2 are alternately repeatedly arranged in the direction XA which is substantially orthogonal to the direction D2. The widths in the direction XA of the region 921a and the region 921b are both 6 mm in the example of FIG. 33B.

The difference between the region 913-1 and the region 913-2 magnetizing the magnetic sheet 910 (FIG. 33A) can be expressed by a relation between the region 921a (S pole) and the region 921b (N pole) magnetizing the magnetic sheet 920 (FIG. 33B) as well. That is, an area ratio of the regions 921a (S pole) (FIG. 33B) with respect to the regions 911b-1 (N pole) (FIG. 33A) of the region 913-1 is different from an area ratio of the regions 921a (S pole) with respect to the regions 911b-2 (N pole) (FIG. 33A) of the region 913-2. In a similar manner, an area ratio of the regions 921b (N pole) with respect to the regions 911a-1 (S pole) of the region 913-1 is different from an area ratio of the regions 921b (N pole) with respect to the regions 911a-2 (S pole) of the region 913-2.

The magnetic sheet 910 is attached to the input surface of the touch panel 401 of the electronic apparatus 400 as is the case with the sixth embodiment. A user disposes the magnetic sheet 920 so that a surface 922 of the magnetic sheet 920 faces outward and the surface 921 of the magnetic sheet 920 is in contact with the surface 911 of the magnetic sheet 910. Here, the magnetic sheet 920 is layered on the magnetic sheet 910 in a direction in which the longitudinal direction D1 of the regions 911a and 911b of the magnetic sheet 910 follows the longitudinal direction D2 of the regions 921a and 921b of the magnetic sheet 920.

A user touches the surface 922 of the magnetic sheet 920, which is layered on the magnetic sheet 910, with the finger and performs an operation (slide operation) for changing a relative positional relation between the surface 911 and the surface 921 while keeping the surface 911 and the surface 921 in contact with or close to each other. In the present embodiment, the widths in the direction XA of the region 911a-1 and the region 911b-1 that belong to the region 913-1 are different from the widths in the direction XA of the region 911a-2 and the region 911b-2 that belong to the region 913-2. Therefore, a maximum value of shearing stress and/or a period of the shearing stress received from the magnetic sheet 920 by a user performing an operation for changing a relative positional relation between the region 913-1 and the surface 921 while keeping the region 913-1 and the surface 921 in contact with or close to each other (FIG. 33C) are/is different from a maximum value of shearing stress and/or a period of the shearing stress received from the magnetic sheet 920 by the user performing an operation for changing a relative positional relation between the region 913-2 and the surface 921 while keeping the region 913-2 and the surface 921 in contact with or close to each other (FIG. 33D). Accordingly, the user perceives different bumpy feeling from the magnetic sheet 920 between the state that the surface 921 is in contact with or close to the region 913-1 (FIG. 33C) and the state that the surface 921 is in contact with or close to the region 913-2 (FIG. 33D).

<Dial Type>

FIG. 34A, FIG. 34B, FIG. 35A, and FIG. 35B illustrate a dial-type "force sense presenting object" according to the present embodiment. The "force sense presenting object" according to the present embodiment includes a magnetic sheet 1010 (first object) and a magnetic sheet 1020 (second object).

Figure 34B:
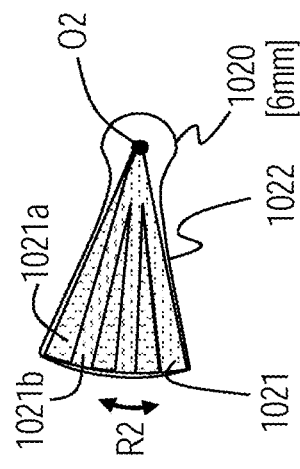
FIG. 34A and FIG. 34B are diagrams illustrating a magnetized magnetic sheet.
Figure 34A:
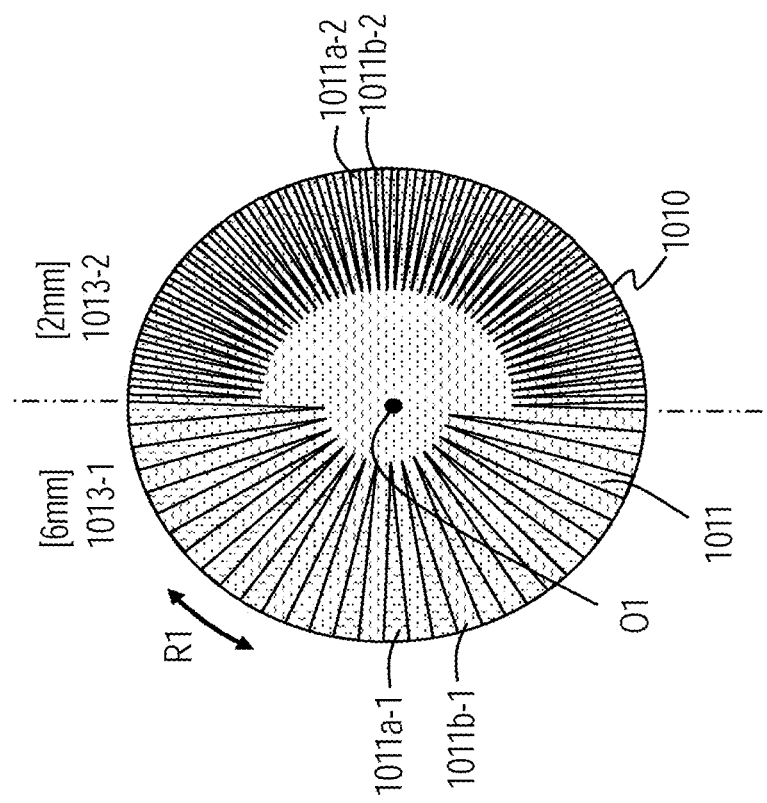

The magnetic sheet 1010 has a substantially discoid shape (FIG. 34A). One surface 1011 (first surface) of the magnetic sheet 1010 is magnetized with a texture (first texture) including a region 1013-1 (first region) and a region 1013-2 (second region) that are different from each other. Regions 1011a-1 and regions 1011b-1 are periodically arranged in an alternate manner on the region 1013-1 along the axial direction R around the central axis O1 of the magnetic sheet 1010. Regions 1011a-2 and regions 1011b-2 are periodically arranged in an alternate manner on the region 1013-2 in the axial direction R1 around the central axis O1 of the magnetic sheet 1010. Here, magnetization patterns are different from each other between the region 1013-1 and the region 1013-2. The lengths of arcs corresponding to each region 1011a-1 and each region 1011b-1 that belong to the region 1013-1 are different from the lengths of arcs corresponding to each region 1011a-2 and each region 1011b-2 that belong to the region 1013-2 in the circumference of the magnetic sheet 1010 in the present embodiment. In the circumference of the magnetic sheet 1010, the length of an arc corresponding to each region 1011a-1 belonging to the region 1013-1 and the length of an arc corresponding to each region 1011b-1 belonging to the region 1013-1 are both 6 mm in the example of FIG. 34A. On the other hand, in the circumference of the magnetic sheet 1010, the length of an arc corresponding to each region 1011a-2 belonging to the region 1013-2 and the length of an arc corresponding to each region 1011b-2 belonging to the region 1013-2 are both 2 mm.

The magnetic sheet 1020 has a plate shape whose plate surface is in a nearly fan shape (FIG. 34B). One surface 1021 (second surface) of the magnetic sheet 1020 is magnetized with a texture (second texture) including S-pole regions 1021a and N-pole regions 1021b. On the surface 1021, regions 1021a and regions 1021b are periodically arranged in an alternate manner along the axial direction R2 around the central axis O2 of the magnetic sheet 1020. In the arc-like circumference of the magnetic sheet 1020, the length of an arc corresponding to the region 1021a and the length of an arc corresponding to each region 1021b are both 6 mm in the example of FIG. 34B.

The difference between the region 1013-1 and the region 1013-2 magnetizing the magnetic sheet 1010 (FIG. 34A) can be expressed by a relation between the region 1021a (S pole) and the region 1021b (N pole) magnetizing the magnetic sheet 1020 (FIG. 34B) as well. That is, an area ratio of the regions 1021a (S pole) (FIG. 34B) with respect to the regions 1011b-1 (N pole) (FIG. 34A) of the region 1013-1 is different from an area ratio of the regions 1021a (S pole)

with respect to the regions 1011b-2 (N pole) (FIG. 34A) of the region 1013-2. In a similar manner, an area ratio of the region 1021b (N pole) with respect to the region 1011a-1 (S pole) of the region 1013-1 is different from an area ratio of the region 1021b (N pole) with respect to the region 1011a-2 (S pole) of the region 1013-2.

Figure 35A:
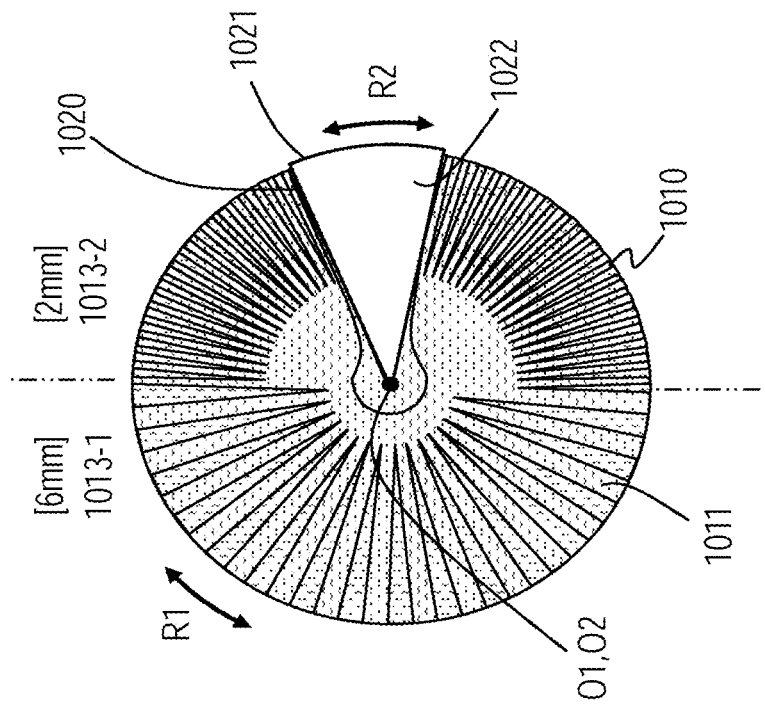
FIG. 35A and FIG. 35B are diagrams illustrating a magnetized magnetic sheet.
Figure 35B:
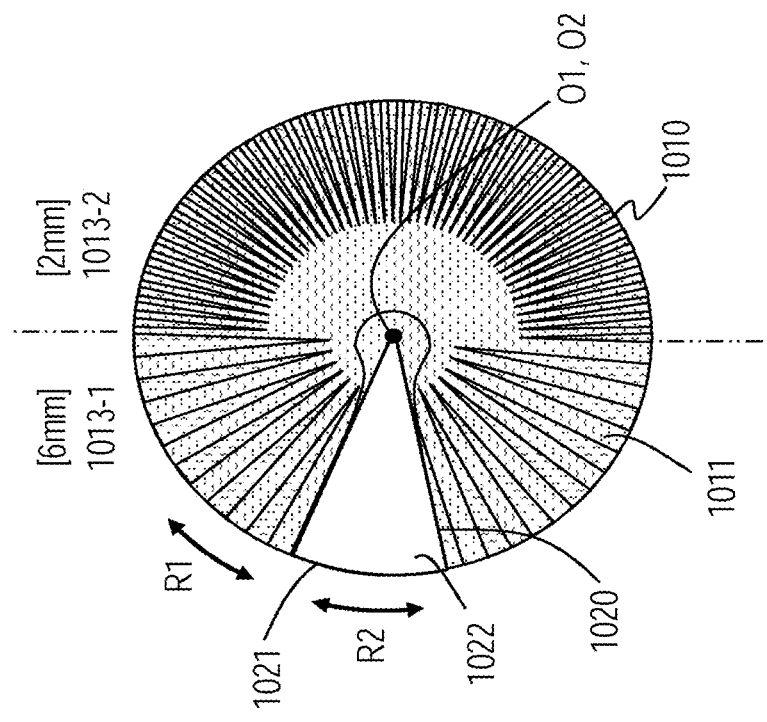

The magnetic sheet 1010 is attached to the input surface of the touch panel 401 of the electronic apparatus 400 as is the case with the sixth embodiment. A user disposes the magnetic sheet 1020 so that a surface 1022 of the magnetic sheet 1020 faces outward and the surface 1021 of the magnetic sheet 1020 is in contact with the surface 1011 of the magnetic sheet 1010. Here, the magnetic sheet 1020 is layered on the magnetic sheet 1010 so that the central axis O1 and the central axis O2 are superposed on or close to each other (FIG. 35A and FIG. 35B).

A user touches the surface 1022 of the magnetic sheet 1020, which is layered on the magnetic sheet 1010, with the finger and performs an operation (rotation operation in the axial direction R2) for changing a relative positional relation between the surface 1011 and the surface 1021 while keeping the surface 1011 and the surface 1021 in contact with or close to each other. In the present embodiment, the lengths of arcs of each region 1011a-1 and each region 1011b-1 that belong to the region 1013-1 are different from the lengths of arcs of each region 1011a-2 and each region 1011b-2 that belong to the region 1013-2. Therefore, a maximum value of shearing stress and/or a period of the shearing stress received from the magnetic sheet 1020 by a user performing an operation for changing a relative positional relation between the region 1013-1 and the surface 1021 while keeping the region 1013-1 and the surface 1021 in contact with or close to each other (FIG. 35A) are/is different from a maximum value of shearing stress and/or a period of the shearing stress received from the magnetic sheet 1020 by the user performing an operation for changing a relative positional relation between the region 1013-2 and the surface 1021 while keeping the region 1013-2 and the surface 1021 in contact with or close to each other (FIG. 35B). Accordingly, the user perceives different bumpy feeling from the magnetic sheet 1020 between the state that the surface 1021 is in contact with or close to the region 1013-1 (FIG. 35A) and the state that the surface 1021 is in contact with or close to the region 1013-2 (FIG. 35B).

Characteristics of Present Embodiment

In the present embodiment, different bumpy feeling can be presented depending on a position on the "first texture" with/to which the "second object" is brought into contact or close.

Modification 1 of Seventh Embodiment

Figure 36C:
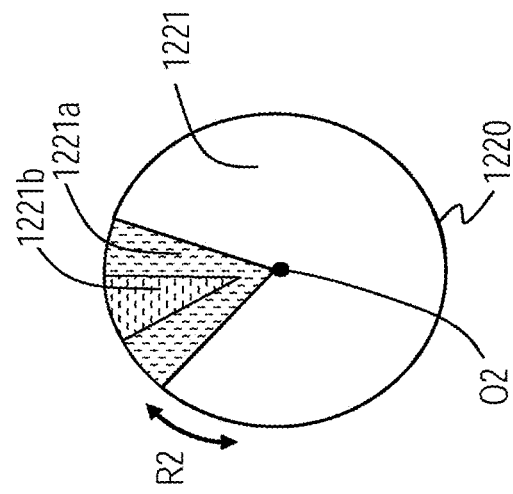
FIG. 36A to FIG. 36C are diagrams illustrating a magnetized magnetic sheet.
Figure 36B:
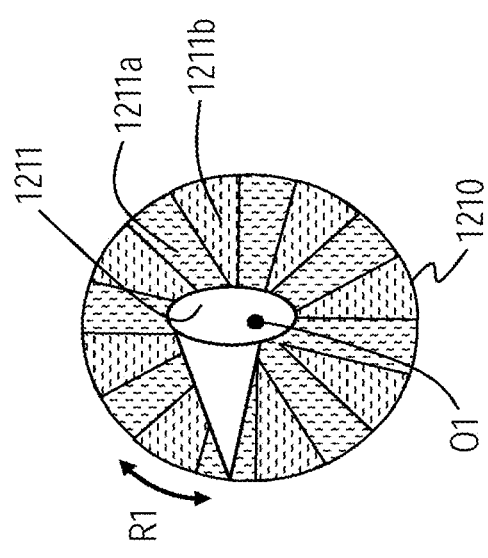
Figure 36A:
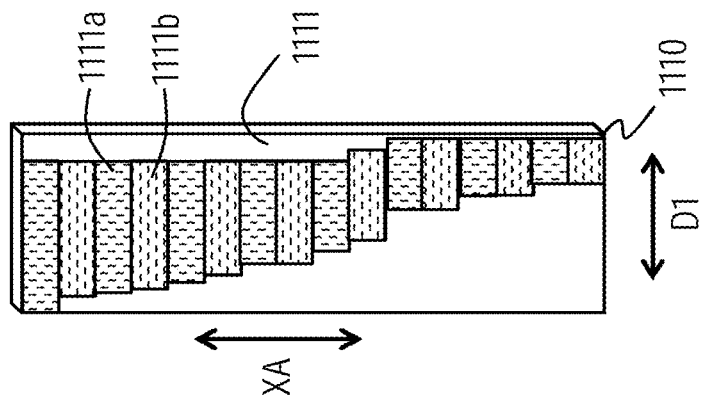

Belt-like regions 1111a magnetized to the S pole and belt-like regions 1111b magnetized to the N pole may be periodically arranged in an alternate manner on a surface 1111 (first surface) of the magnetic sheet 1110 (first object), as illustrated in FIG. 36A. The widths of these regions 1111a and 1111b (widths in the direction XA) are all the same as each other. However, the lengths of all the regions 1111a and 1111b (lengths in the D1 direction) are not the same as each other. The magnetic sheet 920 (second object) (FIG. 33B) may be disposed so that the surface 921 (second surface) of the magnetic sheet 920 is in contact with the surface 1111 of the magnetic sheet 1110 and a user may touch the surface 922 of the magnetic sheet 920 layered on the magnetic sheet 1110 and perform an operation for changing a relative positional relation between the surface 1111 and the surface 921 while keeping the surface 1111 and the surface 921 in contact with or close to each other. Even such a configuration can change an area ratio of the regions 921a (S pole) on the surface 921 (FIG. 33B) with respect to the regions 1111b (N pole) on the surface 1111 (first surface) of the magnetic sheet 1110 (first object) (FIG. 36A) with/to which the surface 921 (second surface) of the magnetic sheet 920 (second object) is brought into contact or close (and an area ratio of the regions 921b (N pole) with respect to the regions 1111a (S pole)). Accordingly, different bumpy feeling can be presented depending on a position on the "first texture" with/to which the "second object" is brought into contact or close.

Further, a texture (first texture) including S-pole regions 1211a and N-pole regions 1211b whose lengths in the direction from the central axis O1 toward the outside (radial direction) are uneven may be provided on one surface 1211 (first surface) of a magnetic sheet 1210 (first object) having a substantially discoid shape, as illustrated in FIG. 36B. Here, the region 1211a and the region 1211b are repeatedly arranged along the axial direction R1 around the central axis O1 of the magnetic sheet 1210. Further, the region 1221a and the region 1221b may be repeatedly arranged along the axial direction R2 around the central axis O2 of a magnetic sheet 1220, which has a substantially discoid shape, only on a nearly fan-shaped region which is a part of one surface 1221 (second surface) of the magnetic sheet 1220 (second object), as illustrated in FIG. 36C. The magnetic sheet 1220 (second object) may be disposed so that the surface 1221 of the magnetic sheet 1220 is in contact with the surface 1211 of the magnetic sheet 1210 and a user may touch the magnetic sheet 1220 layered on the magnetic sheet 1210 and perform an operation for changing a relative positional relation between the surface 1211 and the surface 1221 while keeping the surface 1211 and the surface 1221 in contact with or close to each other. Accordingly, different bumpy feeling can be presented depending on a position on the "first texture" with/to which a region, which is magnetized to the S pole or the N pole, of the "second object" is brought into contact or close.

Modification 2 of Seventh Embodiment

A "first texture" may further include a region which has a different magnetization pattern as well as a "first region" and a "second region". That is, the "first texture" may include three or more different regions whose magnetization patterns are different from each other.

In the sixth embodiment and modifications thereof, the "first texture" may include the "first region" and the "second region" whose magnetization patterns are different from each other or may include three or more different regions whose magnetization patterns are different from each other.

If magnetic force sufficiently acts between a magnetic sheet used as the "first object" and a magnetic sheet used as the "second object", a relative positional relation between surfaces (a first surface and a second surface) of these magnetic sheets may be changed in a state that these two magnetic sheets are not in contact with each other. A magnetic sheet magnetized with a texture which includes periodical nearly-checkered regions magnetized to the S pole and periodical nearly-checkered regions magnetized to the N pole may be used as the "first object" and/or the "second object".

Ninth Embodiment

In the sixth and seventh embodiments and modifications thereof, a "first magnet" which is in contact with or close to the "first object" and a "second magnet" which is in contact with or close to the "second object" may be further provided. In this case, when the "first magnet" and the "second magnet" are brought close to each other, an "acting subject" perceives a force sense based on attractive force or repulsive force between the "first magnet" and the "second magnet", from the "second object".

<Example for Slider Type>

FIG. 37A illustrates an example in which magnets 1331 and 1332 (first magnets) are disposed near the slider-type magnetic sheet 710 (first object) described in the sixth embodiment. FIG. 37B illustrates an example in which a magnet 1333 (second magnet) is disposed to be in contact with the surface 721-$m_2$ side of the magnetic sheet 720-$m_2$ (second object). The magnets 1331, 1332, and 1333 in this example have a substantially discoid shape. One surface 1331a of the magnet 1331 is on one magnetic pole (the S pole or the N pole) and the other surface 1331b is on the other magnetic pole (the N pole or the S pole). In a similar manner, one surface 1332a of the magnet 1332 is on one magnetic pole and the other surface 1332b is on the other magnetic pole. One surface 1333a of the magnet 1333 is on one magnetic pole and the other surface 1333b is on the other magnetic pole. The magnets 1331, 1332, and 1333 are permanent magnets such as a neodymium magnet and a ferrite magnet, for example.

Figure 38:
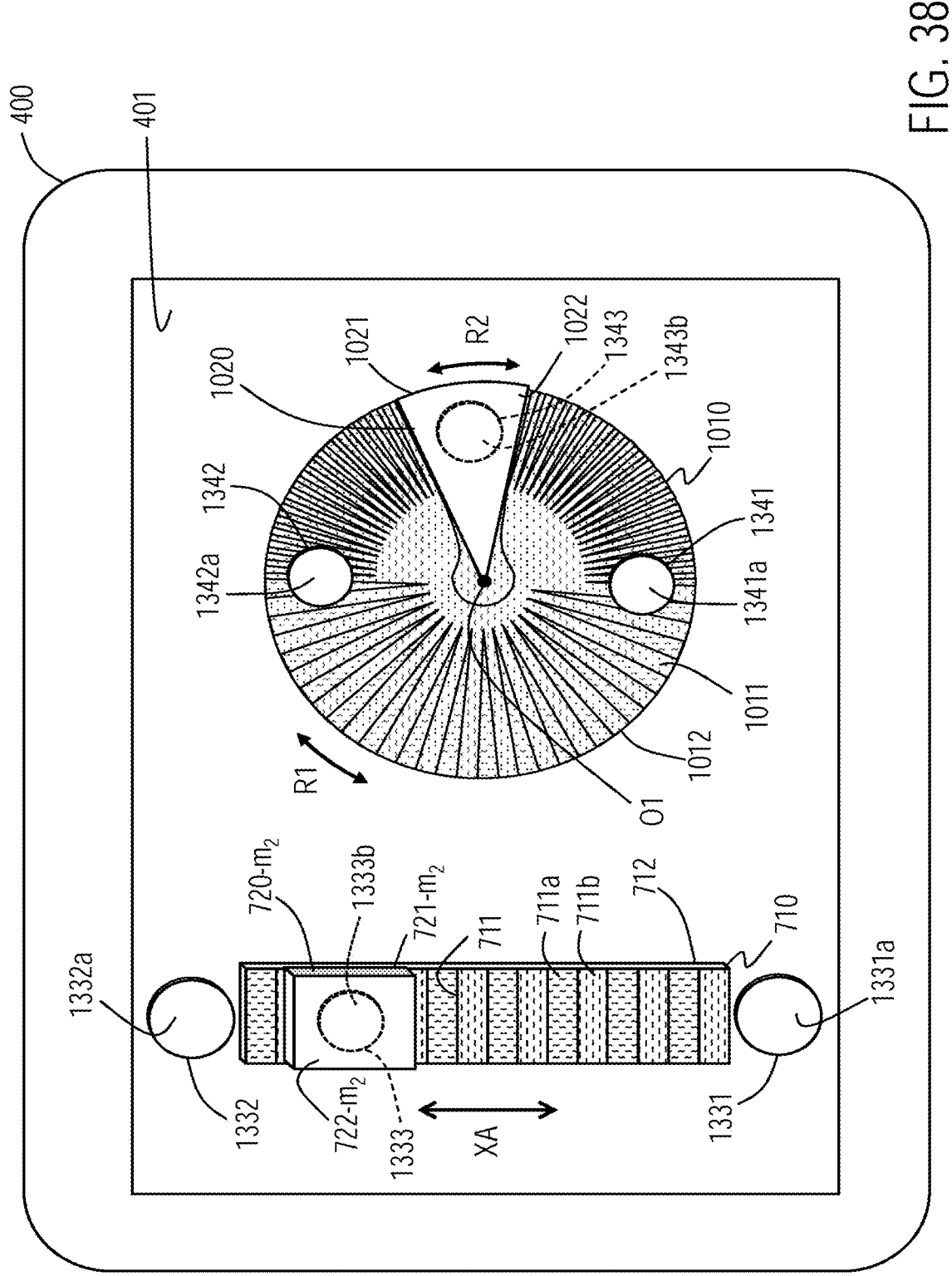
FIG. 38 is a diagram illustrating an input device according to an embodiment.

As illustrated in FIG. 38, the magnets 1331 and 1332 and the magnetic sheet 710 are disposed on the input surface of the touch panel 401. The magnets 1331 and 1332 are respectively disposed on both end sides (both end sides in the direction XA) of the magnetic sheet 710 in this example. Here, the surface 712 of the magnetic sheet 710 and the surfaces 1331b and 1332b of the magnets 1331 and 1332 are positioned so as to face the input surface side of the touch panel 401. The magnetic sheet 720-$m_2$ is disposed so that the surface 722-$m_2$ of the magnetic sheet 720-$m_2$ faces outward and the surface 721-$m_2$ of the magnetic sheet 720-$m_2$ is close to the surface 711 of the magnetic sheet 710. A user touches the surface 722-$m_2$ of the magnetic sheet 720-$m_2$ which is layered on the magnetic sheet 710 and performs an operation (slide operation in the XA direction) for changing a relative positional relation between the surface 711 and the surface 721-$m_2$ while keeping the surface 711 and the surface 721-$m_2$ in contact with or close to each other. Accordingly, the user perceives bumpy feeling as the one described above. Further, the user perceives a force sense based on attractive force or repulsive force between the magnet 1333 and the magnet 1331 depending on the distance between the magnet 1333 and the magnet 1331. In a similar manner, the user perceives a force sense based on attractive force or repulsive force between the magnet 1333 and the magnet 1332 depending on the distance between the magnet 1333 and the magnet 1332.

<Example for Dial Type>

FIG. 37C illustrates an example in which magnets 1341 and 1342 (first magnets) are disposed in a contact manner on positions on the circumference side on the surface 1011 of the dial-type magnetic sheet 1010 (first object) described in the seventh embodiment. FIG. 37D illustrates an example in which a magnet 1343 (second magnet) is disposed in a contact manner on a position on the circumference side on the surface 1021 of the magnetic sheet 1020 (second object). The magnets 1341, 1342, and 1343 in this example also have a substantially discoid shape. One surface 1341a of the magnet 1341 is on one magnetic pole (the S pole or the N pole) and the other surface 1341b is on the other magnetic pole (the N pole or the S pole). In a similar manner, one surface 1342a of the magnet 1342 is on one magnetic pole and the other surface 1342b is on the other magnetic pole. One surface 1343a of the magnet 1343 is on one magnetic pole and the other surface 1343b is on the other magnetic pole. The magnets 1341, 1342, and 1343 are permanent magnets such as a neodymium magnet and a ferrite magnet, for example.

As illustrated in FIG. 38, the magnetic sheet 1010 is disposed on the input surface of the touch panel 401. The surface 1012 of the magnetic sheet 1010 is positioned so as to face the input surface side of the touch panel 401. The magnetic sheet 1020 is disposed so that the surface 1022 of the magnetic sheet 1020 faces outward and the surface 1021 of the magnetic sheet 1020 is close to the surface 1011 of the magnetic sheet 1010. A user touches the surface 1022 of the magnetic sheet 1020 which is layered on the magnetic sheet 1010 and performs an operation (rotation operation in the R1 direction) for changing a relative positional relation between the surface 1011 and the surface 1021 while keeping the surface 1011 and the surface 1021 in contact with or close to each other. Accordingly, the user perceives bumpy feeling as the one described above. Further, the user perceives a force sense based on attractive force or repulsive force between the magnet 1343 and the magnet 1341 depending on the distance between the magnet 1343 and the magnet 1341. In a similar manner, the user perceives a force sense based on attractive force or repulsive force between the magnet 1343 and the magnet 1342 depending on the distance between the magnet 1343 and the magnet 1342.

Characteristics of Present Embodiment

In the present embodiment, a force sense based on attractive force or repulsive force between the "first magnet" and the "second magnet" as well as bumpy feeling can be presented. A magnitude of a force sense can be changed depending on the magnitudes of magnetic force of the "first magnet" and the "second magnet". Thus, more varieties of force senses can be fed back in response to information input to the touch panel 401.

Ninth Embodiment

In the present embodiment, the "second object" described in the above-described sixth to eighth embodiments and modifications thereof is mechanically positioned on the "first object".

<Example for Slider Type>

Figure 39C:
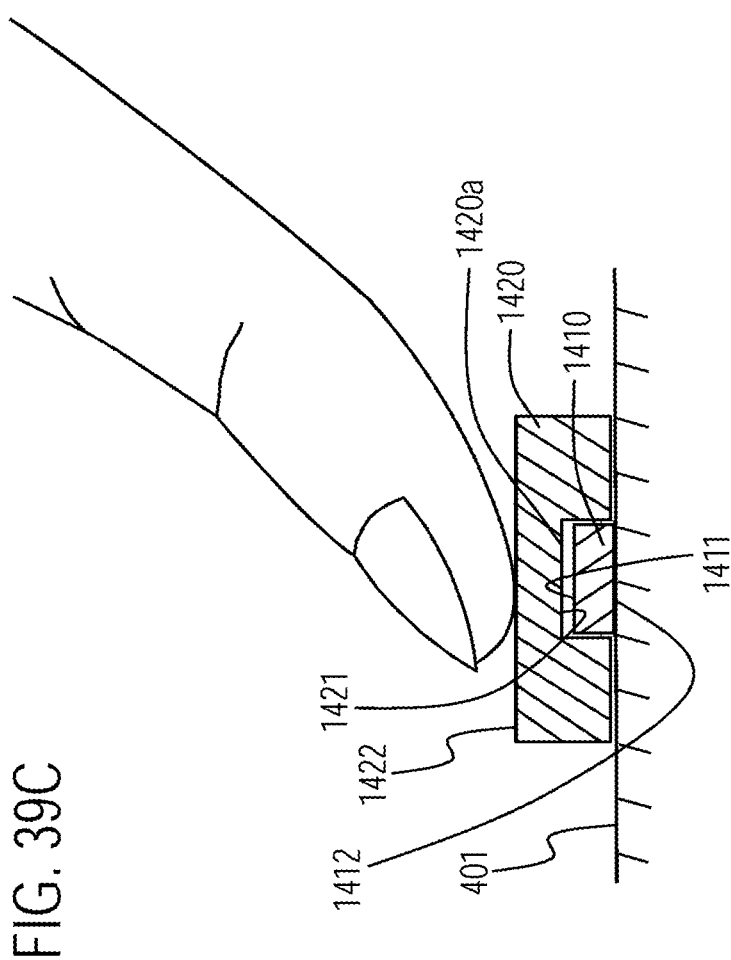
FIG. 39A to FIG. 39D are diagrams illustrating magnetic sheets supported by a mechanical structure.
Figure 39D:
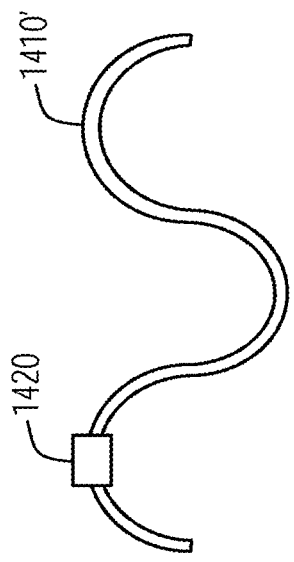
Figure 39A:
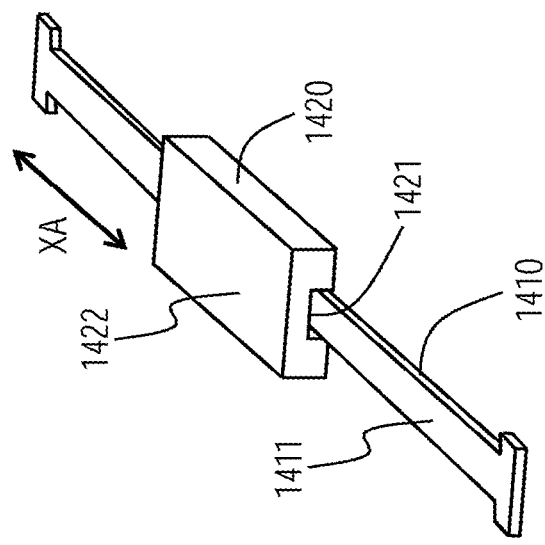
Figure 39B:
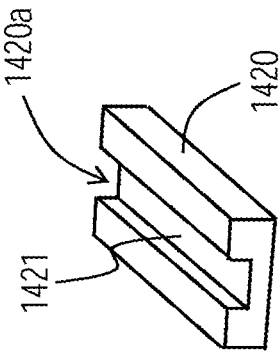

As illustrated in FIG. 39A to FIG. 39C, a "force sense presenting object" may include a rail-shaped (belt-like) magnetic sheet 1410 (first object) and a magnetic sheet 1420 (second object) on which a groove 1420a is formed. One surface 1411 (first surface) of the magnetic sheet 1410 is magnetized with a texture (first texture) including S-pole regions and N-pole regions as the one described above. A bottom surface 1421 (second surface) in the inside of the groove 1420a of the magnetic sheet 1420 is magnetized with a texture (second texture) including S-pole regions and N-pole regions as the one described above.

As illustrated in FIG. 39C, the magnetic sheet 1410 is disposed on the input surface of the touch panel 401. Here, a surface 1412 of the magnetic sheet 1410 is positioned so as to face the input surface side of the touch panel 401. A part of the magnetic sheet 1410 is positioned in the inside of the groove 1420*a* of the magnetic sheet 1420. Accordingly, the magnetic sheet 1420 is disposed so that the surface 1422 of the magnetic sheet 1420 faces outward and the surface 1421 of the magnetic sheet 1420 is in contact with or close to the surface 1411 of the magnetic sheet 1410. A user touches the surface 1422 of the magnetic sheet 1420 which is layered on the magnetic sheet 1410 and performs an operation (slide operation in the XA direction) for changing a relative positional relation between the surface 1411 and the surface 1421 while keeping the surface 1411 and the surface 1421 in contact with or close to each other. At this time, the magnetic sheet 1420 slides in the XA direction in a state that the magnetic sheet 1420 is supported by inner walls of the groove 1420*a* thereof.

Here, a curved rail-shaped magnetic sheet 1410' (first object) may be used instead of the linear magnetic sheet 1410, as illustrated in FIG. 39D.

<Example for Dial Type>

The "force sense presenting object" illustrated in FIG. 40A to FIG. 40F includes a magnetic sheet 1510 (first object) and a magnetic sheet 1520 (second object) that have a substantially discoid shape, rotation support portions 1514 and 1524 that have a cylindrical rotating shaft, and a substantially prismatic support portion 1530.

Regions magnetized to the S pole and regions magnetized to the N pole are periodically arranged on one surface 1511 (first surface) of the magnetic sheet 1510 in an alternate manner along the axial direction R1 around the central axis O1 of the magnetic sheet 1510. Further, the rotation support portion 1514 is attached to the surface 1511 of the magnetic sheet 1510 so that an axial center of the rotating shaft of the rotation support portion 1514 is substantially accorded with the central axis O1. The axial center of the rotating shaft of the rotation support portion 1514 and the surface 1511 are substantially orthogonal to each other and the rotating shaft of the rotation support portion 1514 is protruded outward from the surface 1511 (FIG. 40A and FIG. 40E).

Regions magnetized to the S pole and regions magnetized to the N pole are periodically arranged on one surface 1521 (second surface) of the magnetic sheet 1520 in an alternate manner along the axial direction R2 around the central axis O2 of the magnetic sheet 1520. Further, a through hole 1523 is provided to the magnetic sheet 1520 along the central axis O2. The rotation support portion 1524 is further attached on the circumference side of the other surface 1522 of the magnetic sheet 1520. The axial center of the rotating shaft of the rotation support portion 1524 and the surface 1522 are substantially orthogonal to each other and the rotating shaft of the rotation support portion 1524 is protruded outward from the surface 1522 (FIG. 40B, FIG. 40C, and FIG. 40E).

As illustrated in FIG. 40E and FIG. 40F, the magnetic sheet 1510 is disposed on the input surface of the touch panel 401. Here, the other surface 1512 (an opposite surface of the surface 1511) of the magnetic sheet 1510 is positioned so as to face the input surface side of the touch panel 401. The surface 1521 side of the magnetic sheet 1520 is positioned on the surface 1511 side of the magnetic sheet 1510 and the rotating shaft of the rotation support portion 1514 penetrates through the through hole 1523 of the magnetic sheet 1520. Accordingly, the magnetic sheet 1520 is supported rotatably around the R1 direction with respect to the magnetic sheet 1510 in a state that the surface 1521 of the magnetic sheet 1520 is in contact with or close to the surface 1511 of the magnetic sheet 1510. The support portion 1530 is further positioned on the other surface 1522 (opposite surface of the surface 1521) side of the magnetic sheet 1520.

An end of the rotating shaft of the rotation support portion 1514 penetrating through the through hole 1523 is inserted into a hole provided close to the center of the support portion 1530 and rotatably supports the support portion 1530. Further, an end of the rotation support portion 1524 is inserted into a hole provided close to the end portion of the support portion 1530 and rotatably supports the support portion 1530. A user touches the support portion 1530 and rotates the support portion 1530 in the directions R1 and R2 around the central axes O1 and O2. Accordingly, a relative positional relation between the surface 1511 and the surface 1521 is changed.

Characteristics of Present Embodiment

In the present embodiment, the "second object" is mechanically positioned on the "first object", improving operability.

Tenth Embodiment

In the present embodiment, the "second object" described in the above-described sixth to eighth embodiments and modifications thereof is positioned on the "first object" by utilizing magnetic force.

In the slider type, a "first texture" includes a "first repetitive region" in which an S-pole region and an N-pole region are repeatedly arranged along a specific "first line" included in a "first surface" and a "first support region" that includes an S-pole belt-like region and an N-pole belt-like region which extend along (substantially parallel to) the "first line" and are adjacent to each other. A "second texture" includes a "second repetitive region" in which an S-pole region and an N-pole region are repeatedly arranged along a specific "second line" included in a "second surface" and a "second support region" that includes an N-pole belt-like region and an S-pole belt-like region which extend along the "second line" and are adjacent to each other. The "first line" and the "second line" may be a straight line or may be a curved line. Here, the "second line" has a shape following that of the "first line". For example, if the "first line" is a substantially straight line, the "second line" is preferably a substantially straight line as well. If the "first line" is a curved line, the "second line" is preferably a curved line whose curvature radius is substantially the same as that of the "first line". A relative positional relation of the "second object" with respect to the "first object" can be changed along the "first line" while the "second object" is kept supported by the "first object" with magnetic attraction force between the "first support region" and the "second support region".

In the dial type, a "first texture" includes a "first repetitive region", in which an S-pole region and an N-pole region are repeatedly arranged along an axial direction around a "first axis" which is substantially orthogonal to a "first surface", and a "first support region" that includes S-pole annular regions and N-pole annular regions which are provided about the "first axis" and are adjacent to each other. A "second texture" includes a "second repetitive region", in which an S-pole region and an N-pole region are repeatedly arranged along an axial direction around a "second axis" which is substantially orthogonal to a "second surface", and a "second support region" that includes N-pole annular regions and S-pole annular regions which are provided about the "second axis" and are adjacent to each other. The "second object" can rotate about the "first axis" with respect to the "first object" while being kept supported by the "first object" with magnetic attraction force between the "first support region" and the "second support region".

The configuration according to the present embodiment is exemplified below with reference to the accompanying drawings.

<Example for Slider Type>

Figure 41A:
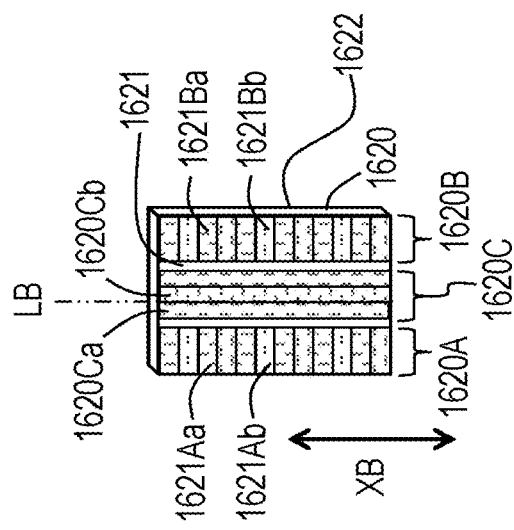
FIG. 41A to FIG. 41C are diagrams illustrating magnetic sheets positioned by magnetic force.

One surface 1611 (first surface) of a magnetic sheet 1610 is preliminarily magnetized with a texture (first texture) as illustrated in FIG. 41A. This texture includes repetitive regions 1610A and 1610B (first repetitive regions) which extend along the direction XA and a support region 1610C (first support region). In the repetitive region 1610A, an S-pole region 1611Aa and an N-pole region 1611Ab are repeatedly arranged in an alternate manner along a specific straight line LA (first line) included in the surface 1611. In the repetitive region 1610B, an S-pole region 1611Ba and an N-pole region 1611Bb are repeatedly arranged in an alternate manner along the straight line LA. The straight line LA is a straight line extending along the direction XA. The support region 1610C includes an S-pole belt-like region 1610Ca and N-pole belt-like regions 1610Cb. The S-pole belt-like region 1610Ca and the N-pole belt-like regions 1610Cb extend along the straight line LA and are adjacent to each other. It is sufficient that a total number of the belt-like regions 1610Ca and the belt-like regions 1610Cb is two or greater and it is preferable that the total number is three or greater.

Figure 41B:
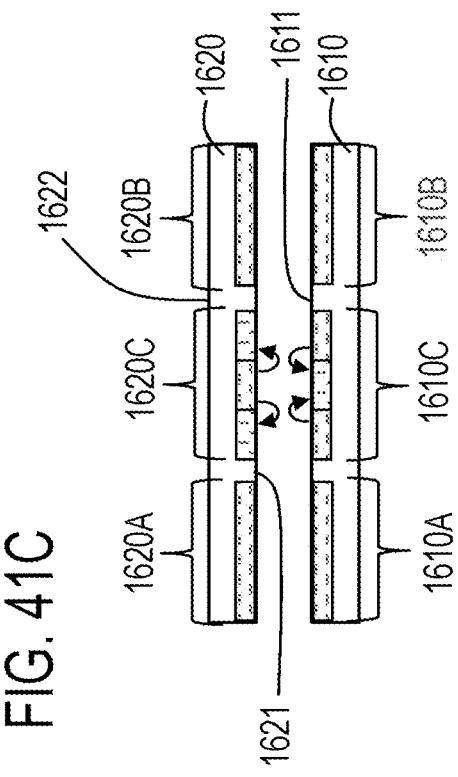

One surface 1621 (second surface) of a magnetic sheet 1620 is preliminarily magnetized with a texture (second texture) as illustrated in FIG. 41B. This texture includes repetitive regions 1620A and 1620B (second repetitive regions) which extend along the direction XB and a support region 1620C (second support region). In the repetitive region 1620A, an S-pole region 1621Aa and an N-pole region 1621Ab are repeatedly arranged in an alternate manner along a specific straight line LB (second line) included in the surface 1621. In the repetitive region 1620B, an S-pole region 1621Ba and an N-pole region 1621Bb are repeatedly arranged in an alternate manner along the straight line LB. The straight line LB is a straight line extending along the direction XB. The support region 1620C includes S-pole belt-like regions 1620Ca and an N-pole belt-like region 1620Cb. The S-pole belt-like regions 1620Ca and the N-pole belt-like region 1620Cb extend along the straight line LB and are adjacent to each other. It is sufficient that a total number of the belt-like regions 1620Ca and the belt-like regions 1620Cb is two or greater and it is preferable that the total number is three or greater. The configuration is preferably employed that the belt-like region 1620Ca (S pole) is opposed to the belt-like region 1620Cb (N pole) and the belt-like regions 1620Cb (N pole) are opposed to the belt-like regions 1620Ca (S pole) when the support region 1610C is allowed to face the support region 1620C.

Figure 41C:
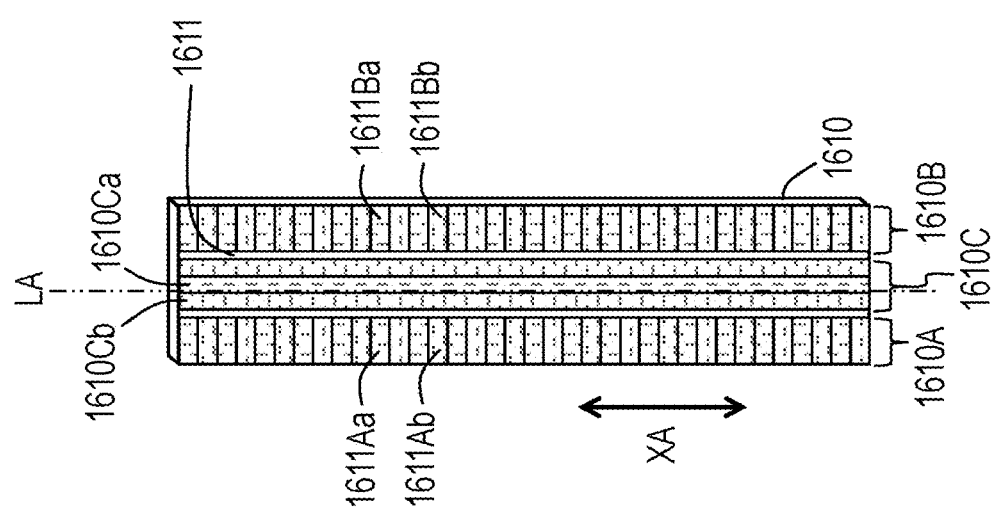

The magnetic sheet 1610 is disposed on the input surface of the touch panel 401. At this time, the surface 1611 of the magnetic sheet 1610 is positioned so as to face outward. Further, the magnetic sheet 1620 is disposed so that a surface 1622 of the magnetic sheet 1620 faces outward and the surface 1621 of the magnetic sheet 1620 is in contact with or close to the surface 1611 of the magnetic sheet 1610. The magnetic sheets 1610 and 1620 are disposed so that the repetitive regions 1610A and 1610B and the support region 1610C are respectively opposed to the repetitive regions 1620A and 1620B and the support region 1620C. At this time, the magnetic sheets 1610 and 1620 are disposed so that the above-mentioned straight line LA (first line) and straight line LB (second line) are accorded with or approximated with each other. Accordingly, slide operation input is enabled. A user touches the surface 1622 of the magnetic sheet 1620 which is layered on the magnetic sheet 1610 and performs an operation (slide operation in the XA direction) for changing a relative positional relation between the surface 1611 and the surface 1621 while keeping the surface 1611 and the surface 1621 in contact with or close to each other. Here, magnetic attraction force is generated between the support region 1610C and the support region 1620C based on a magnetic field in a direction from the belt-like regions 1610Cb of the support region 1610C to the belt-like region 1610Ca and a magnetic field in a direction from the belt-like region 1620Cb of the support region 1620C to the belt-like regions 1620Ca (FIG. 41C). Accordingly, the relative positional relation of the magnetic sheet 1620 with respect to the magnetic sheet 1610 can be changed along the straight line LA while the magnetic sheet 1620 is kept supported by the magnetic sheet 1610 with the magnetic attraction force between the support region 1610C and the support region 1620C (FIG. 41C). The magnetic attraction force between the support region 1610C and the support region 1620C hardly affects bumpy feeling presented based on the repetitive regions 1610A, 1610B, 1620A, and 1620B.

<Example for Dial Type>

Figure 42A:
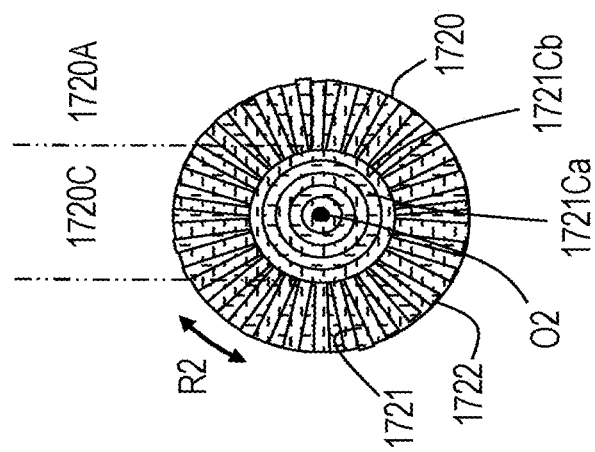
FIG. 42A and FIG. 42B are diagrams illustrating a magnetic sheet positioned by magnetic force.

One surface 1711 (first surface) of a magnetic sheet 1710 is preliminarily magnetized with a texture (first texture) as illustrated in FIG. 42A. This texture includes the central axis O1 (first axis) which is substantially orthogonal to the surface 1711, a support region 1710C (first support region) which is provided around the central axis O1, and a repetitive region 1710A (first repetitive region) which is provided around the support region 1710C. The support region 1710C is a region which is surrounded by an approximate circle centering on the central axis O1 and includes S-pole annular regions 1711Ca and N-pole annular regions 1711Cb that center on the central axis O1 and are provided adjacent to each other. It is sufficient that a total number of the annular regions 1711Ca and 1711Cb is two or greater and it is preferable that the total number is three or greater. In the repetitive region 1710A, an S-pole region 1711Aa and an N-pole region 1711Ab are repeatedly arranged in an alternate manner along the axial direction R1 around the central axis O1.

Figure 42B:
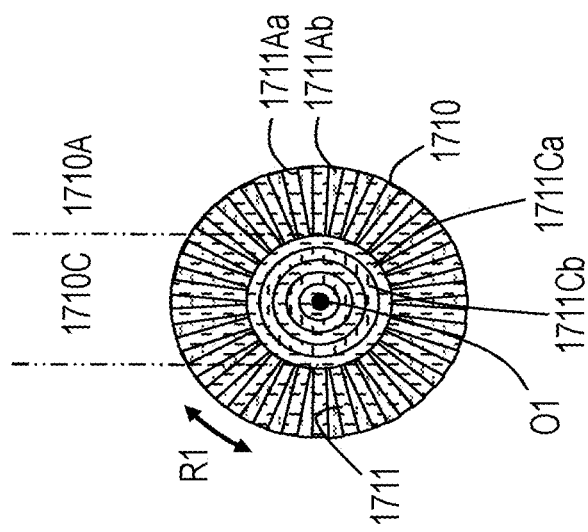

One surface 1721 (second surface) of a magnetic sheet 1720 is preliminarily magnetized with a texture (second texture) as illustrated in FIG. 42B. This texture includes the central axis O2 (second axis) which is substantially orthogonal to the surface 1721, a support region 1720C (second support region) which is provided around the central axis O2, and a repetitive region 1720A (second repetitive region) which is provided around the support region 1720C. The support region 1720C is a region which is surrounded by an approximate circle centering on the central axis O2 and includes S-pole annular regions 1721Ca and N-pole annular regions 1721Cb that center on the central axis O2 and are provided adjacent to each other. The configuration is employed that the annular regions 1711Ca (S pole) are opposed to the annular regions 1721Cb (N pole) and the annular regions 1711Cb (N pole) are opposed to the annular regions 1721Ca (S pole) when the support region 1710C is allowed to face the support region 1720C. It is sufficient that a total number of the annular regions 1721Ca and 1721Cb is two or greater and it is preferable that the total number is three or greater.

The magnetic sheet 1710 is disposed on the input surface of the touch panel 401. At this time, the surface 1711 of the magnetic sheet 1710 is positioned so as to face outward.

Further, the magnetic sheet 1720 is disposed so that a surface 1722 (opposite surface of the surface 1721) of the magnetic sheet 1720 faces outward and the surface 1721 of the magnetic sheet 1720 is in contact with or close to the surface 1711 of the magnetic sheet 1710. The magnetic sheets 1710 and 1720 are disposed so that the repetitive region 1710A and the support region 1710C are respectively opposed to the repetitive region 1720A and the support region 1720C. At this time, the magnetic sheets 1710 and 1720 are disposed so that the above-mentioned central axis O1 (first axis) and the central axis O2 (second axis) are accorded with or approximated with each other. Accordingly, rotation operation input is enabled. A user touches the surface 1722 of the magnetic sheet 1720 which is layered on the magnetic sheet 1710 and performs an operation (rotation operation about the central axes O1 and O2) for changing a relative positional relation between the surface 1711 and the surface 1721 while keeping the surface 1711 and the surface 1721 in contact with or close to each other. The magnetic sheet 1720 can be rotated about the central axes O1 and O2 with respect to the magnetic sheet 1710 while being kept supported by the magnetic sheet 1710 with magnetic attraction force between the support region 1710C and the support region 1720C. The magnetic attraction force between the support region 1710C and the support region 1720C hardly affects bumpy feeling presented based on the repetitive regions 1710A and 1720A.

Characteristics of Present Embodiment

In the present embodiment, the "second object" is positioned on the "first object" by utilizing magnetic force, improving operability. Here, magnetization patterns of the S pole and the N pole on the "first repetitive region" and the "second repetitive region" are not limited to those exemplified in the present embodiment, but magnetization patterns of the S pole and the N pole may be periodical nearly-checkered magnetization patterns as those described above or magnetization patterns may vary depending on a position.

Other Modifications and so Forth

The present invention is not limited to the above-described embodiments.

For example, it is hard to magnetize an accurate fan-shaped region with a magnet having a predetermined diameter as described in the exemplification of the dial-type "force sense presenting object" in the sixth embodiment. However, a magnetic pole of the magnet for magnetization is inverted every time one region is magnetized, and an S-pole region and an N-pole region are thus alternately magnetized, being able to magnetize a region, which has an ideal fan shape to some extent. For example, magnetization of one belt-like S-pole region 1811*a* which passes through the central axis O and magnetization of one belt-like N-pole region 1811*b* which passes through the central axis O are alternately repeated, being able to magnetize a region, which has an ideal fan shape to some extent, on a surface 1811 of a magnetic sheet 1810 having a discoid shape, as illustrated in FIG. 43A. Even in this case, a region Z1 which is magnetized at the end has a belt-like shape. In a similar manner, magnetization of one belt-like S-pole region 1821*a* which passes through a position deviated from the central axis O (deviated by 1 mm, for example) and magnetization of one belt-like N-pole region 1821*b* which passes through this position are alternately repeated, being able to magnetize a region, which has an ideal fan shape to some extent, on a surface 1821 of a magnetic sheet 1820 having a discoid shape, as illustrated in FIG. 43B. Even in this case, a region Z2 which is magnetized at the end has a belt-like shape.

Here, the examples in which a region on a surface of a magnetic sheet is magnetized to a desired magnetic pole without any gaps have been described. However, if an area ratio of a region, which is not (cannot be) magnetized, with respect to a magnetized region is small enough to be ignored, there may be a partial region (gap) which is not magnetized to a desired magnetic pole on a part of a region (an end part of the region, for example) and desired bumpy feeling can be presented in this case as well. For instance, in the example, illustrated in FIG. 31B, of the case using a discoid magnetic sheet which is magnetized without any gaps which are not magnetized to a desired magnetic pole, desired bumpy feeling can be presented even when a magnetic sheet 820-3 on which gaps, which are not magnetized to a desired magnetic pole, are formed on an edge portion on a circumference side thereof as illustrated FIG. 43C is used instead of the magnetic sheet 820-3 which is the right drawing in FIG. 31B. For example, a gap on a boundary portion between a region 821*a*-3 and a region 821*b*-3 on a circumferential portion of the magnetic sheet 820-3 in FIG. 43C is formed when a surface of a discoid magnetic sheet is magnetized in a radial fashion from the central axis by changing a relative position between the surface of the magnetic sheet and the magnetic pole of a magnet, with the magnet having a magnetic pole of a predetermined diameter, so that the magnetic pole of the magnet does not protrude from the surface of the magnetic sheet. Even when there is such a gap, desired bumpy feeling can be presented. Further, a gap in the region 821*a*-3 and a gap in the region 821*b*-3 on the circumferential portion of the magnetic sheet 820-3 in FIG. 43C are formed when a surface of a discoid magnetic sheet is magnetized in a plurality of belt-like shapes in a radial fashion from a central axis by changing a relative position between the surface of the magnetic sheet and a magnetic pole of a magnet with the magnet having a magnetic pole whose diameter is smaller than the length of a circumferential portion of one region, so that the magnetic pole of the magnet does not protrude from the surface of the magnetic sheet, for example. Even when there are such gaps, desired bumpy feeling can be presented. However, a gap on a circumferential portion as that in FIG. 43C is not formed by devising magnetization such that magnetization is performed while changing a relative position between the surface of the magnetic sheet and the magnetic pole of the magnet along the circumferential portion, for example.

Further, the "first object", the "second object", the "base object", the "first contact object", the "second contact object", and so on may be composed of a magnetic body other than a magnetic sheet. The "first object", the "second object", the "base object", the "first contact object", the "second contact object", and so on may be electromagnet. Further, the above-described embodiments have shown the example in which a stripe texture and/or a checker texture magnetizes a magnetic body. However, a texture having another pattern may magnetize a magnetic body as long as bumpy feeling can be presented based on the above-described principles. Furthermore, the cutter component of the cutting plotter is replaced with the magnetization component and this cutting plotter is driven so as to magnetize a magnetic sheet in the first embodiment. However, instead of the cutting plotter, other devices in which a head can be moved in a planar direction such as a pen printer may be used. That is, a component such as a pen attached to a head of such a device may be replaced with the magnetization component and this device may be driven to magnetize a magnetic sheet.

Further, a conductive member may be provided on an opposite surface of the "second surface" of the "second object". For example, a conductive film may be provided on the surface 722-$m_2$ side of the magnetic sheet 720-$m_2$ illustrated in FIG. 30B and on the surface 822-$m_2$ side of the magnetic sheet 820-$m_2$ illustrated in FIG. 31B. Accordingly, the "second object" is easily detected by an electrostatic capacitance sensor of the touch panel 401.

Further, in the "force sense presenting object" illustrated in FIG. 40A to FIG. 40F, the rotation support portions 1514 and 1524 and the support portion 1530 may be made of a conductive member and these portions may be electrically connected with each other by providing conductive members on the surfaces thereof. In this case, a user contacts the outside of the support portion 1530 and rotates the support portion 1530 in the directions R1 and R2 around the central axes O1 and O2, whereby the user operates a conductive body connecting the two conductive bodies (rotation support portions 1514 and 1524). Such movement of the rotation support portions 1514 and 1524 is inputted into the touch panel 401, being able to make the electronic apparatus 400 recognize an input of a rotation ("rotate") command.

DESCRIPTION OF REFERENCE NUMERALS 1 magnetization device
11 magnetization component
210, 220, 230, 240, 250, 260, 410, . . . , 1710, 720, . . . , 1720 magnetic sheet
310, 310' base object
341, 342 sheet
401 touch panel
420 glove
430 stylus pen
500 computer mouse
600 floor
640 shoe
650 white cane

What is claimed is:

1. A force sense presenting object for performing operation input and force sense presentation on a touch panel, the force sense presenting object comprising:
a first object that is a magnetic sheet that is disposed with one plate surface of two plate surfaces thereof allowed to face an input surface side of the touch panel, a first surface which is the opposite plate surface of the one plate surface of the two plate surfaces of the magnetic sheet being preliminarily magnetized with a first texture including a first repetitive region in which a plurality of S-pole regions and a plurality of N-pole regions are repeatedly and periodically arranged in an alternate manner; and
a second object that includes a magnetic sheet that is disposed with a second surface being one plate surface of two plate surfaces thereof in parallel with and contact with or in parallel with and close to the first surface of the first object, the second surface being preliminarily magnetized with a second texture including a second repetitive region in which a plurality of S-pole regions and a plurality of N-pole regions are repeatedly and periodically arranged in an alternate manner, and the second object being worn, gripped, or supported by an acting subject performing an input operation with respect to the touch panel.

2. The force sense presenting object according to claim 1, wherein
an acting subject, the acting subject performing the input operation with respect to the touch panel including the input surface on which the first object is disposed, wears, grips, or supports the second object and performs an operation for changing a relative positional relation between the first surface and the second surface and/or an action for changing the relative positional relation between the first surface and the second surface while keeping the first surface and the second surface in parallel with and contact with or in parallel with and close to each other, and thereby the input operation with respect to the touch panel is performed and the acting subject is allowed to perceive periodic bumpy feeling and/or shearing stress received by the acting subject from the second object is periodically changed.

3. A force sense presenting object for performing operation input and force sense presentation on a touch panel, the force sense presenting object comprising:
a first object that is a magnetic sheet that is disposed with one plate surface thereof allowed to face an input surface side of the touch panel, a first surface which is the other plate surface of the one plate surface being preliminarily magnetized with a first texture including a first repetitive region in which an S-pole region and an N-pole region are repeatedly arranged; and
a plurality of pieces of second objects each including a magnetic sheet that is disposed with a second surface being one plate surface thereof allowed to face the first surface side of the first object, the second surface being preliminarily magnetized with a second texture including a second repetitive region in which an S-pole region and an N-pole region are repeatedly arranged, and each of the second objects being worn, gripped, or supported by an acting subject performing an input operation with respect to the touch panel, wherein
a magnetization pattern of the second repetitive region of the second texture varies depending on a second object among the plurality of pieces of second objects,
an acting subject, the acting subject performing the input operation with respect to the touch panel including the input surface on which the first object is disposed, wears, grips, or supports a selected object, the selected object being selected from the plurality of pieces of second objects, and performs an operation for changing a relative positional relation between the first surface and the second surface of the selected object and/or an action for changing the relative positional relation between the first surface and the second surface of the selected object while keeping the first surface and the second surface of the selected object in contact with or close to each other, and thereby the input operation with respect to the touch panel is performed and the acting subject is allowed to perceive bumpy feeling and/or shearing stress received by the acting subject from the selected object is periodically changed, and
the bumpy feeling varies depending on the selected object and/or a maximum value of the shearing stress and/or a period of the shearing stress vary/varies depending on the selected object.

4. A force sense presenting object for performing operation input and force sense presentation on a touch panel, the force sense presenting object comprising:
a plurality of pieces of first objects each being a magnetic sheet that is disposed with one plate surface thereof allowed to face an input surface side of the touch panel, a first surface which is the other plate surface of the one plate surface being preliminarily magnetized with a first texture including a first repetitive region in which an S-pole region and an N-pole region are repeatedly arranged; and a plurality of pieces of second objects each including a magnetic sheet that is disposed with a second surface being one plate surface thereof allowed to face the first surface side of the first object, the second surface being preliminarily magnetized with a second texture including a second repetitive region in which an S-pole region and an N-pole region are repeatedly arranged, and each of the second objects being worn, gripped, or supported by an acting subject performing an input operation with respect to the touch panel, wherein a magnetization pattern of the first repetitive region of the first texture varies depending on a first object among the plurality of pieces of first objects, a magnetization pattern of the second repetitive region of the second texture varies depending on a second object among the plurality of pieces of second objects, an acting subject, the acting subject performing the input operation with respect to the touch panel including the input surface on which a first selected object, the first selected object being selected from the plurality of pieces of first objects, is disposed, wears, grips, or supports a second selected object, the second selected object being selected from the plurality of pieces of second objects, and performs an operation for changing a relative positional relation between the first surface of the first selected object and the second surface of the second selected object and/or an action for changing the relative positional relation between the first surface of the first selected object and the second surface of the second selected object while keeping the first surface of the first selected object and the second surface of the second selected object in contact with or close to each other, and thereby the input operation with respect to the touch panel is performed and the acting subject is allowed to perceive bumpy feeling and/or shearing stress received by the acting subject from the second selected object is periodically changed, and the bumpy feeling varies depending on a combination between the first selected object and the second selected object and/or a maximum value of the shearing stress and/or a period of the shearing stress vary/varies depending on a combination between the first selected object and the second selected object.

5. A force sense presenting object comprising:
a first object that includes a first surface, the first surface being preliminarily magnetized with a first texture including an S-pole region and an N-pole region, and is disposed on an input surface of a touch panel; and a second object that includes a second surface, the second surface being preliminarily magnetized with a second texture including an S-pole region and an N-pole region, and is worn, gripped, or supported by an acting subject performing an input operation with respect to the touch panel, wherein the first texture includes a first region and a second region, the first region and the second region being respectively provided with magnetization patterns which are different from each other, an acting subject, the acting subject performing the input operation with respect to the touch panel including the input surface on which the first object is disposed, wears, grips, or supports the second object and performs an operation for changing a relative positional relation between the first surface and the second surface and/or an action for changing the relative positional relation between the first surface and the second surface while keeping the first region or the second region and the second surface in contact with or close to each other, and thereby the input operation with respect to the touch panel is performed and the acting subject is allowed to perceive bumpy feeling and/or shearing stress received by the acting subject from the second object is periodically changed, the bumpy feeling perceived by the acting subject by performing the operation for changing the relative positional relation and/or the action for changing the relative positional relation while keeping the first region and the second surface in contact with or close to each other is different from the bumpy feeling perceived by the acting subject by performing the operation for changing the relative positional relation and/or the action for changing the relative positional relation while keeping the second region and the second surface in contact with or close to each other, and/or a maximum value of the shearing stress and/or a period of the shearing stress received by the acting subject by performing the operation for changing the relative positional relation and/or the action for changing the relative positional relation while keeping the first region and the second surface in contact with or close to each other is different from a maximum value of the shearing stress and/or a period of the shearing stress received by the acting subject by performing the operation for changing the relative positional relation and/or the action for changing the relative positional relation while keeping the second region and the second surface in contact with or close to each other.

6. The force sense presenting object according to any one of claims 1, 2, 3, and 4, comprising:
a first magnet that is in contact with or close to the first object and preliminarily positioned with respect to the first object so that position of the first magnet with respect to the first object does not change; and a second magnet that is in contact with or close to the second object and preliminarily positioned with respect to the second object so that position of the second magnet with respect to the second object does not change, wherein when the second magnet that is preliminarily positioned with respect to the second object is brought close to the first magnet by movement of the second object performed by the acting subject, the acting subject perceives a force sense, the force sense being based on attractive force or repulsive force between the first magnet and the second magnet, from the second object.

7. A force sense presenting object comprising:
a first object that includes a first surface, the first surface being preliminarily magnetized with a first texture including an S-pole region and an N-pole region, and is disposed on an input surface of a touch panel; and a second object that includes a second surface, the second surface being preliminarily magnetized with a second texture including an S-pole region and an N-pole region, and is worn, gripped, or supported by an acting subject performing an input operation with respect to the touch panel, wherein the force sense presenting object is used for performing slide operation input and force sense presentation on the touch panel, the first object is a magnetic sheet that is disposed with one plate surface thereof allowed to face an input surface side of the touch panel, the first surface is the other plate surface of the magnetic sheet, the first texture includes a first repetitive region in which an S-pole region and an N-pole region are repeatedly arranged along a specific first line included in the first surface, the second object includes a magnetic sheet that is disposed with the second surface thereof, the second surface being one plate surface, allowed to face a first surface side of the first object, the second texture includes a second repetitive region in which an S-pole region and an N-pole region are repeatedly arranged along a specific second line included in the second surface, and the first object is disposed on the touch panel and the second object is disposed on the first object so that the first line of the first object and the second line of the second object are accorded or approximated with each other, thereby enabling the slide operation input.

8. A force sense presenting object comprising:

a first object that includes a first surface, the first surface being preliminarily magnetized with a first texture including an S-pole region and an N-pole region, and is disposed on an input surface of a touch panel; and a second object that includes a second surface, the second surface being preliminarily magnetized with a second texture including an S-pole region and an N-pole region, and is worn, gripped, or supported by an acting subject performing an input operation with respect to the touch panel, wherein the force sense presenting object is used for performing rotation operation input and force sense presentation on the touch panel, the first object is a magnetic sheet that is disposed with one plate surface thereof allowed to face an input surface side of the touch panel, the first surface is the other plate surface of the magnetic sheet, the first texture includes a first repetitive region in which an S-pole region and an N-pole region are repeatedly arranged along an axial direction around a first axis which is substantially orthogonal to the first surface, the second object includes a magnetic sheet that is disposed with the second surface thereof, the second surface being one plate surface, allowed to face a first surface side of the first object, the second texture includes a second repetitive region in which an S-pole region and an N-pole region are repeatedly arranged along an axial direction around a second axis which is substantially orthogonal to the second surface, the first object is disposed on the touch panel and the second object is disposed on the first object so that the first axis of the first object and the second axis of the second object are accorded or approximated with each other, thereby enabling the rotation operation input, and the rotation operation input is input operation with a dial.

9. A force sense presenting object comprising:

a first object that includes a first surface, the first surface being preliminarily magnetized with a first texture including an S-pole region and an N-pole region, and is disposed on an input surface of a touch panel; and a second object that includes a second surface, the second surface being preliminarily magnetized with a second texture including an S-pole region and an N-pole region, and is worn, gripped, or supported by an acting subject performing an input operation with respect to the touch panel, wherein the first texture includes a first repetitive region in which an S-pole region and an N-pole region are repeatedly arranged along a specific first line included in the first surface and a first support region that includes an S-pole belt-like region and an N-pole belt-like region, the S-pole belt-like region and the N-pole belt-like region extending along the first line and being adjacent to each other, the second texture includes a second repetitive region in which an S-pole region and an N-pole region are repeatedly arranged along a specific second line included in the second surface and a second support region that includes an N-pole belt-like region and an S-pole belt-like region, the N-pole belt-like region and the S-pole belt-like region extending along the second line and being adjacent to each other, the second line has a shape following that of the first line, and a relative positional relation of the second object with respect to the first object can be changed along the first line while the second object is kept supported by the first object with magnetic attraction force between the first support region and the second support region.

10. A force sense presenting object comprising:

a first object that includes a first surface, the first surface being preliminarily magnetized with a first texture including an S-pole region and an N-pole region, and is disposed on an input surface of a touch panel; and a second object that includes a second surface, the second surface being preliminarily magnetized with a second texture including an S-pole region and an N-pole region, and is worn, gripped, or supported by an acting subject performing an input operation with respect to the touch panel, wherein the first texture includes a first repetitive region in which an S-pole region and an N-pole region are repeatedly arranged along an axial direction around a first axis, the first axis being substantially orthogonal to the first surface, and a first support region that includes an S-pole annular region and an N-pole annular region, the S-pole annular region and the N-pole annular region being provided about the first axis and being adjacent to each other, the second texture includes a second repetitive region in which an S-pole region and an N-pole region are repeatedly arranged along an axial direction around a second axis, the second axis being substantially orthogonal to the second surface, and a second support region that includes an N-pole annular region and an S-pole annular region, the N-pole annular region and the S-pole annular region being provided about the second axis and being adjacent to each other, and the second object can rotate about the first axis with respect to the first object while being kept supported by the first object with magnetic attraction force between the first support region and the second support region.

11. A force sense presenting object for performing operation input and force sense presentation by an input device which is gripped by an acting subject, the force sense presenting object comprising:

a first object that is a magnetic sheet, a first surface which is a plate surface of two plate surfaces thereof being preliminarily magnetized with a first texture including a first repetitive region in which a plurality of S-pole regions and a plurality of N-pole regions are repeatedly and periodically arranged in an alternate manner; and a second object that is a magnetic sheet one plate surface of two plate surfaces thereof being attached or provided toward the input device side, and disposed with a second surface being the opposite plate surface of the one plate surface of the two plate surfaces in parallel with and contact with or in parallel with and close to the first surface of the first object, the second surface being preliminarily magnetized with a second texture including a second repetitive region in which a plurality of S-pole regions and a plurality of N-pole regions are repeatedly and periodically arranged in an alternate manner.

12. The force sense presenting object according to claim 11, wherein an acting subject, the acting subject operating the input device to which the second object is attached or provided, performs an operation for changing a relative positional relation between the first surface and the second surface and/or an action for changing the relative positional relation between the first surface and the second surface while keeping the first surface and the second surface in parallel with and contact with or in parallel with and close to each other, and thereby an input operation with respect to the input device is performed and the acting subject is allowed to perceive periodic bumpy feeling and/or shearing stress received by the acting subject from the input device is periodically changed.

13. A force sense presenting object for performing operation input and force sense presentation on a touch panel, the force sense presenting object comprising:

a first object that is a magnetic sheet that is disposed with one plate surface thereof allowed to face an input surface side of the touch panel, a first surface which is the other plate surface of the one plate surface being preliminarily magnetized with a first texture including a first repetitive region in which an S-pole region and an N-pole region are repeatedly arranged; and a plurality of pieces of second objects each including a magnetic sheet that is disposed with a second surface being one plate surface thereof allowed to face the first surface side of the first object, the second surface being preliminarily magnetized with a second texture including a second repetitive region in which an S-pole region and an N-pole region are repeatedly arranged, and each of the second objects being worn, gripped, or supported by an acting subject performing an input operation with respect to the touch panel, wherein a magnetization pattern of the second repetitive region of the second texture varies depending on a second object among the plurality of pieces of second objects.

14. A force sense presenting object for performing operation input and force sense presentation on a touch panel, the force sense presenting object comprising:

a plurality of pieces of first objects each being a magnetic sheet that is disposed with one plate surface thereof allowed to face an input surface side of the touch panel, a first surface which is the other plate surface of the one plate surface being preliminarily magnetized with a first texture including a first repetitive region in which an S-pole region and an N-pole region are repeatedly arranged; and a plurality of pieces of second objects each including a magnetic sheet that is disposed with a second surface being one plate surface thereof allowed to face the first surface side of the first object, the second surface being preliminarily magnetized with a second texture including a second repetitive region in which an S-pole region and an N-pole region are repeatedly arranged, and each of the second objects being worn, gripped, or supported by an acting subject performing an input operation with respect to the touch panel, wherein a magnetization pattern of the first repetitive region of the first texture varies depending on a first object among the plurality of pieces of first objects, and magnetization pattern of the second repetitive region of the second texture varies depending on a second object among the plurality of pieces of second objects.

\* \* \* \* \*